US012483853B2

(12) United States Patent
Seefeldt et al.

(10) Patent No.: US 12,483,853 B2
(45) Date of Patent: Nov. 25, 2025

(54) FREQUENCY DOMAIN MULTIPLEXING OF SPATIAL AUDIO FOR MULTIPLE LISTENER SWEET SPOTS

(71) Applicant: Dolby Laboratories Licensing Corporation, San Francisco, CA (US)

(72) Inventors: Alan J. Seefeldt, Alameda, CA (US); C. Phillip Brown, Castro Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 237 days.

(21) Appl. No.: 18/255,251

(22) PCT Filed: Dec. 2, 2021

(86) PCT No.: PCT/US2021/061504

§ 371 (c)(1),
(2) Date: May 31, 2023

(87) PCT Pub. No.: WO2022/119988

PCT Pub. Date: Jun. 9, 2022

(65) Prior Publication Data

US 2024/0107255 A1 Mar. 28, 2024

Related U.S. Application Data

(60) Provisional application No. 63/260,529, filed on Aug. 24, 2021, provisional application No. 63/120,963, filed on Dec. 3, 2020.

(51) Int. Cl.
*H04S 7/00* (2006.01)

(52) U.S. Cl.
CPC .......... *H04S 7/303* (2013.01); *H04R 2499/13* (2013.01); *H04S 2420/07* (2013.01)

(58) Field of Classification Search
CPC .. H04S 7/303; H04S 2420/07; H04R 2499/13
(Continued)

(56) References Cited

U.S. PATENT DOCUMENTS 6,668,061 B1 12/2003 Abel
7,263,193 B2 8/2007 Abel
(Continued)

FOREIGN PATENT DOCUMENTS

EP 3275213 B1 12/2019
WO 2016180493 W 11/2016
(Continued)

OTHER PUBLICATIONS

Arteaga, D., et al., An Ambisonics Decoder for irregular 3D loudspeaker arrays, Audio Engineering Society (AES) 134th Convention, Paper 8918, May 4-7, 2013, Rome, Italy.
(Continued)

*Primary Examiner* — Vivian C Chin
*Assistant Examiner* — Douglas J Suthers

(57) ABSTRACT

Some methods involve receiving, by a control system configured for implementing a plurality of Tenderers, audio data and listening configuration data for a plurality of listening configurations, each listening configuration of the plurality of listening configurations corresponding to a listening position and a listening orientation in an audio environment, and rendering, by each Tenderer and according to the listening configuration data, the received audio data to obtain a set of Tenderer-specific loudspeaker feed signals for a corresponding listening configuration. Each Tenderer may be configured to render the audio data for a different listening configuration. Some such methods may involve decomposing each set of renderer-specific loudspeaker feed signals into a Tenderer-specific set of frequency bands and combining the renderer-specific frequency bands of each Tenderer
(Continued)

600 to produce an output set of loudspeaker feed signals. Some such methods may involve outputting the output set of loudspeaker feed signals to a plurality of loudspeakers.

16 Claims, 37 Drawing Sheets

(58) Field of Classification Search
USPC .......................................................... 381/302
See application file for complete search history.

(56) References Cited

U.S. PATENT DOCUMENTS

| | | | |
|---|---|---|---|
| 10,779,084 | B2 | 9/2020 | Arteaga |
| 2007/0274527 | A1 | 11/2007 | Abel |
| 2013/0142341 | A1 | 6/2013 | Del Galdo |
| 2015/0078595 | A1 | 3/2015 | Shintani |
| 2015/0244869 | A1 | 8/2015 | Cartwright |
| 2015/0248889 | A1 | 9/2015 | Dickins et al. |
| 2017/0195815 | A1 | 7/2017 | Christoph |
| 2018/0098173 | A1 | 4/2018 | Van Brandenburg |
| 2018/0098175 | A1* | 4/2018 | Buerger .................. H04S 7/303 |
| 2020/0059724 | A1 | 2/2020 | Walther |

FOREIGN PATENT DOCUMENTS

| | | | |
|---|---|---|---|
| WO | 2019193248 | A1 | 10/2019 |
| WO | 2021/021682 | A1 | 2/2021 |
| WO | 2021021707 | A1 | 2/2021 |
| WO | 2021/127286 | A1 | 6/2021 |

OTHER PUBLICATIONS

Del Gado, G., et al., Efficient Methods for High Quality Merging of Spatial Audio Streams in Directional Audio Coding, Audio Engineering Society (AES) Convention Paper 7733, May 7-10, 2010, Munich, Germany.
Hess, Wolfgang, Head-Tracking Techniques for Virtual Acoustics Applications, AES Convention Paper 8782 presented at the 133rd Convention, Oct. 2012.
Pulkki, Ville "Virtual Sound Source Positioning Using Vector Base Amplitude Panning" J. Audio Eng. Soc., vol. 45, No. 6, Jun. 1997.
Shi, G., et al., Spatial Calibration of Surround Sound Systems including Listener Position Estimate, Audio Engineering Society (AES) 137th Convention, Paper 9110, Oct. 9-12, 2014, Los Angeles, California, United States.
U.S. Appl. No. 62/992,068, filed Mar. 19, 2020. Per MPEP 609. 04(A), the unpublished application is not provided.

* cited by examiner

1800a

1800b

FREQUENCY DOMAIN MULTIPLEXING OF SPATIAL AUDIO FOR MULTIPLE LISTENER SWEET SPOTS

CROSS-REFERENCE TO RELATED APPLICATIONS

This application is a U.S. National Stage application under U.S.C. 371 of International Application No. PCT/US2021/061504. filed on Dec. 2 2021, which claims priority of U.S. Provisional Application No. 63/260,529 filed Aug. 24, 2021 and U.S. Provisional Application No. 63/120,963 filed Dec. 3, 2020, each of which is hereby incorporated by reference in its entirety

TECHNICAL FIELD

The disclosure pertains to systems and methods for rendering audio for playback by some or all speakers (for example, each activated speaker) of a set of speakers.

BACKGROUND

Audio devices are widely deployed in many homes, vehicles and other environments. Although existing systems and methods for controlling audio devices provide benefits, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device that is either a single-purpose audio device or a multi-purpose audio device (e.g., a smart speaker or other audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device (e.g., a smart speaker) that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via methods. Some such methods may involve audio data processing. For example, some methods may involve receiving, by a control system that is configured for implementing a plurality of renderers, audio data. Some such methods may involve receiving, by the control system, listening configuration data for a plurality of listening configurations. Each listening configuration of the plurality of listening configurations may correspond to a listening position and a listening orientation in an audio environment. Some such methods may involve rendering, by each renderer of the plurality of renderers and according to the listening configuration data, the audio data to obtain a set of renderer-specific loudspeaker feed signals for a corresponding listening configuration. Each renderer may be configured to render the audio data for a different listening configuration.

Some such methods may involve decomposing, by the control system and for each renderer, each set of renderer-specific loudspeaker feed signals into a renderer-specific set of frequency bands. Some such methods may involve combining, by the control system, the renderer-specific set of frequency bands of each renderer to produce an output set of loudspeaker feed signals. Some such methods may involve outputting, by the control system, the output set of loudspeaker feed signals to a plurality of loudspeakers.

In some examples, decomposing each set of renderer-specific loudspeaker feed signals into each renderer-specific set of frequency bands may involve analyzing, by an analysis filterbank associated to each renderer, the renderer-specific set of loudspeaker feed signals to produce a global set of frequency bands and selecting a subset of frequency bands of the global set of frequency bands to produce the renderer-specific set of frequency bands. The subset of frequency bands of the global set of frequency bands may be selected such that when combining the renderer-specific set of frequency bands for all renderers of the plurality of renderers, each frequency band of the global set of frequency bands is represented only once in the output set of loudspeaker feed signals.

Combining the renderer-specific set of frequency bands may involve synthesizing, by a synthesis filterbank, the output set of loudspeaker feed signals in a time domain. In some examples, the analysis filterbank may be a Short-time Discrete Fourier Transform (STDFT) filterbank, a Hybrid Complex Quadrature Mirror (HCQMF) filterbank or a Quadrature Mirror (QMF) filterbank.

In some examples, each of the renderer-specific sets of frequency bands may be uniquely associated with one renderer of the plurality of renderers and uniquely associated with one listening configuration of the plurality of listening configurations. In some implementations, each listening configuration may correspond with a listening position and a listening orientation of a person. In some such examples, the listening position may correspond with the person's head position and the listening orientation may correspond with the person's head orientation.

According to some examples, the audio data may be, or may include, spatial channel-based audio data and/or spatial object-based audio data. In some instances, the audio data may have one of the following formats: stereo, Dolby 3.1.2, Dolby 5.1, Dolby 5.1.2, Dolby 7.1, Dolby 7.1.2, Dolby 7.1.4, Dolby 9.1, Dolby 9.1.6 or Dolby Atmos audio format. In some instances, the rendering may involve performing dual-balance amplitude panning in a time domain or cross-talk cancellation in a frequency domain.

Some methods may involve receiving, by a control system, audio data and receiving, by the control system, listening configuration data for a plurality of listening configurations. Each listening configuration may, for example, correspond to a listening position and a listening orientation. Some such methods may involve analyzing, by an analysis filterbank implemented via the control system, the audio data to produce a global set of frequency bands corresponding to the audio data. Some such methods may involve selecting, by the control system and for each renderer of a plurality of renderers implemented by the control system, a subset of the global set of frequency bands to produce a renderer-specific set of frequency bands for each renderer.

Some such methods may involve rendering, by each renderer of the plurality of renderers and according to the listening configuration data, the renderer-specific set of frequency bands to obtain a set of renderer-specific loudspeaker feed signals for a corresponding listening configuration. In some such examples, each renderer may be configured to render frequency bands of the renderer-specific set of frequency bands for a different listening configuration. Some such methods may involve combining, by the control system, sets of renderer-specific loudspeaker feed signals of each renderer of the plurality of renderers, to produce an output set of loudspeaker feed signals. Some such methods may involve outputting, by the control system, the output set of loudspeaker feed signals to a plurality of loudspeakers of an audio environment.

Some such methods may involve transforming, by a synthesis filterbank, the output set of loudspeaker feed signals from a frequency domain to a time domain. In some such examples, the analysis filterbank may be a Short-time Discrete Fourier Transform (STDFT) filterbank, a Hybrid Complex Quadrature Mirror (HCQMF) filterbank or a Quadrature Mirror (QMF) filterbank.

In some examples, each renderer-specific set of loudspeaker feed signals may be uniquely associated with one renderer of the plurality of renderers. In some examples, each renderer-specific set of loudspeaker feed signals may be uniquely associated with one listening configuration of the plurality of listening configurations. According to some examples, the listening configuration may be, or may include, a listening position and/or a listening orientation of a person in the audio environment. In some instances, the listening position may correspond to the person's head position. In some examples, the listening orientation may correspond to the person's head orientation.

In some implementations, the listening position and the listening orientation may be relative to an audio environment coordinate system. In some implementations, the listening position and the listening orientation may be relative to a coordinate system that corresponds with a person within the audio environment (e.g., corresponding to a position and an orientation of the person's head). In some instances, the listening position may be relative to a position of one or more loudspeakers in the audio environment.

According to some implementations, the listening configuration data may correspond to sensor data obtained from one or more sensors in the audio environment. In some examples, the sensors may be, or may include, a camera, a movement sensor and/or a microphone.

According to some examples, the audio data may be, or may include, spatial channel-based audio data and/or spatial object-based audio data. In some instances, the audio data may have one of the following formats: stereo, Dolby 3.1.2, Dolby 5.1, Dolby 5.1.2, Dolby 7.1, Dolby 7.1.2, Dolby 7.1.4, Dolby 9.1, Dolby 9.1.6 or Dolby Atmos audio format. In some examples, combining the sets of loudspeaker feed signals may involve multiplexing each of the sets of renderer-specific loudspeaker feed signals.

In some instances, the rendering may involve performing dual-balance amplitude panning in a time domain or cross-talk cancellation in a frequency domain. In some instances, the rendering may involve performing cross-talk cancellation in a frequency domain.

In some examples, the rendering may involve producing a plurality of data structures. Each data structure may, for example, include a set of renderer-specific speaker activations for a corresponding listening configuration and corresponding to each of a plurality of points in a two-dimensional space or a three-dimensional space. According to some such examples, the combining may involve combining the plurality of data structures into a single data structure.

Some implementations may involve a method for rendering audio data in a vehicle. Some such methods may involve receiving, by a control system, audio data and receiving, by the control system, sensor signals indicating the presence of a plurality of persons in a vehicle. Some such methods may involve estimating, by the control system and based at least in part on the sensor signals, a plurality of listening configurations relative to a plurality of loudspeakers in the vehicle. Each listening configuration may, for example, correspond to a listening position and a listening orientation of a person of the plurality of persons.

Some such methods may involve rendering, by the control system, received audio data for each listening configuration of the plurality of listening configurations, to produce an output set of loudspeaker feed signals. Some such methods may involve providing, by the control system, the output set of loudspeaker feed signals to the plurality of loudspeakers.

In some examples, rendering of the audio data may be performed by a plurality of renderers. In some instances, each renderer of the plurality of renderers may be configured to render the audio data for a different listening configuration to obtain a set of renderer-specific loudspeaker feed signals. In some such examples, the method may involve decomposing, by the control system and for each renderer, each set of renderer-specific loudspeaker feed signals into a renderer-specific set of frequency bands. Some such methods may involve combining, by the control system, the renderer-specific set of frequency bands of each renderer to produce an output set of loudspeaker feed signals. Some such methods may involve outputting, by the control system, the output set of loudspeaker feed signals.

In some examples, decomposing the set of renderer-specific loudspeaker feed signals into the renderer-specific set of frequency bands may involve analyzing, by an analysis filter bank associated with each renderer, the set of renderer-specific loudspeaker feed signals, to produce a global set of frequency bands. Some such methods may involve selecting a subset of the global set of frequency bands to produce the renderer-specific set of frequency bands. In some examples, the subset of the global set of frequency bands may be selected such that when combining the renderer-specific frequency bands of each of the plurality of renderers, each frequency band of the global set of frequency bands is represented only once in the output set of loudspeaker feed signals.

According to some examples, combining the plurality of renderer-specific frequency bands may involve synthesizing, by a synthesis filterbank, the output set of loudspeaker feed signals in the time domain. In some examples, the analysis filter bank may be a Short-time Discrete Fourier Transform (STDFT) filter bank, a Hybrid Complex Quadrature Mirror (HCQMF) filter bank or a Quadrature Mirror (QMF) filter bank.

In some examples, each of the renderer-specific sets of frequency bands may be uniquely associated with one renderer of the plurality of renderers. In some examples, each of the renderer-specific sets of frequency bands may be uniquely associated with one listening configuration of the plurality of listening configurations. According to some examples, the rendering may involve performing dual-balance amplitude panning in the time domain or cross-talk cancellation in the frequency domain. In some implementations, combining the renderer-specific sets of frequency bands may involve multiplexing the renderer-specific sets of frequency bands.

According to some implementations, rendering of the audio data may be performed by a plurality of renderers. In some such examples, each renderer may be configured to render the audio data for a different listening configuration of the plurality of listening configurations. According to some such examples, a method may involve analyzing, by an analysis filter bank implemented by the control system, received audio to produce a global set of frequency bands of the received audio data. Some such methods may involve selecting, by the control system and for each renderer of the plurality of renderers, a subset of the global set of frequency bands to produce a renderer-specific set of frequency bands for each renderer. Some such methods may involve rendering, by each renderer of the plurality of renderers, the renderer-specific set of frequency bands to obtain a set of loudspeaker feed signals for a corresponding listening configuration. Some such methods may involve combining sets of loudspeaker feed signals from each renderer to produce an output set of loudspeaker feed signals. Some such methods may involve outputting the output set of loudspeaker feed signals.

According to some examples, combining the set of loudspeaker feed signals may involve synthesizing, by a synthesis filter bank, the output set of loudspeaker feed signals in a time domain. In some examples, the synthesis filter bank may be a Short-time Discrete Fourier Transform (STDFT), a Hybrid Complex Quadrature Mirror (HCQMF) or a Quadrature Mirror (QMF) filter bank.

In some instances, each renderer-specific set of frequency bands may be uniquely associated with one renderer. In some examples, each renderer-specific set of frequency bands may be uniquely associated with one listening configuration. According to some examples, a listening position may correspond to a head position. In some examples, a listening orientation may correspond to a head orientation.

According to some examples, the audio data may be, or may include, spatial channel-based audio data and/or spatial object-based audio data. In some instances, the audio data may have one of the following formats: stereo, Dolby 3.1.2, Dolby 5.1, Dolby 5.1.2, Dolby 7.1, Dolby 7.1.2, Dolby 7.1.4, Dolby 9.1, Dolby 9.1.6 or Dolby Atmos audio format. In some instances, the rendering may involve performing dual-balance amplitude panning in a time domain or cross-talk cancellation in a frequency domain. In some examples, combining the set of loudspeaker feed signals from each renderer may involve multiplexing the set of loudspeaker feed signals from each renderer.

According to some implementations, the sensor signals may include signals from one or more seat sensors. The seat sensors may, for example, include one or more cameras, one or more belt sensors, one or more headrest sensors, one or more seat back sensors, one or more seat bottom sensors and/or one or more elbow rest sensors.

Some methods also may involve selecting a rendering mode of a plurality of rendering modes. In some examples, each rendering mode of the plurality of rendering modes may be based on a respective listening configuration of a plurality of listening configurations.

In some examples, at least one listening configuration may be associated with an identity of a person. In some such examples, at least one such listening configuration may be stored in a memory of the vehicle.

According to some examples, the rendering may involve generating, for each renderer, a set of coefficients corresponding with a listening configuration. In some such examples, the coefficients may be used for the rendering. In some examples, the coefficients may be panner coefficients.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some examples, the apparatus may be one of the above-referenced audio devices. However, in some implementations the apparatus may be another type of device, such as a mobile device, a laptop, a server, a vehicle, etc. For example, a vehicle control system may be configured to perform at least some of the disclosed methods. An audio device control system may be configured to perform at least some of the disclosed methods.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION OF EMBODIMENTS

Figure 1:
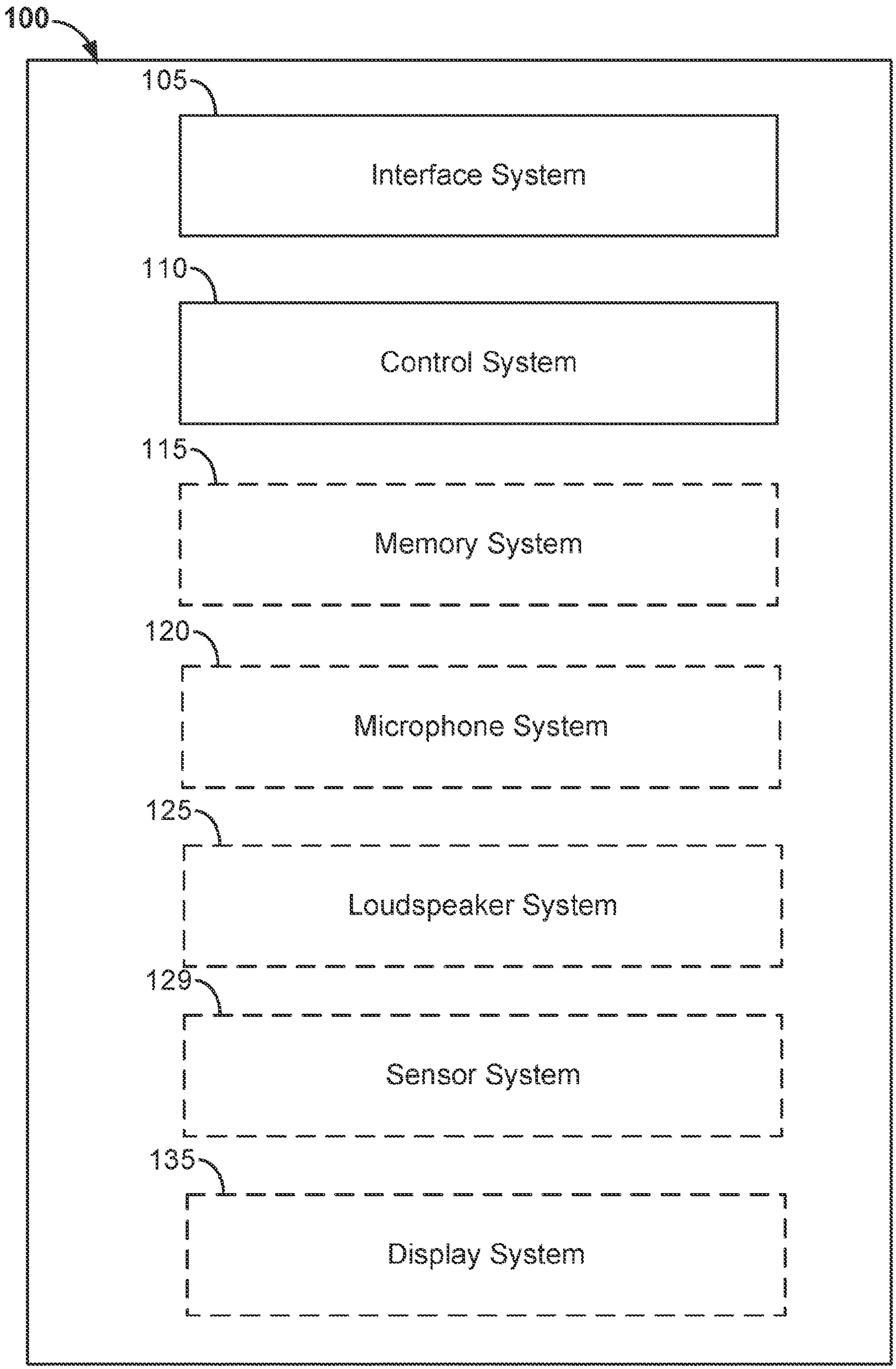
FIG. 1 is a block diagram that shows examples of components of an apparatus capable of implementing various aspects of this disclosure.

FIG. 1 is a block diagram that shows examples of components of an apparatus capable of implementing various aspects of this disclosure. According to some examples, the apparatus 100 may be, or may include, a smart audio device that is configured for performing at least some of the methods disclosed herein. In other implementations, the apparatus 100 may be, or may include, another device that is configured for performing at least some of the methods disclosed herein, such as a laptop computer, a cellular telephone, a tablet device, a smart home hub, etc. In some such implementations the apparatus 100 may be, or may include, a server. In some implementations the apparatus 100 may be configured to implement what may be referred to herein as an "orchestrating device" or an "audio session manager."

In this example, the apparatus 100 includes an interface system 105 and a control system 110. The interface system 105 may, in some implementations, be configured for communication with one or more devices that are executing, or configured for executing, software applications. Such software applications may sometimes be referred to herein as "applications" or simply "apps." The interface system 105 may, in some implementations, be configured for exchanging control information and associated data pertaining to the applications. The interface system 105 may, in some implementations, be configured for communication with one or more other devices of an audio environment. The audio environment may, in some examples, be a home audio environment. In other examples, the audio environment may be another type of environment, such as an office environment, a vehicle environment, a park or other outdoor environment, etc. The interface system 105 may, in some implementations, be configured for exchanging control information and associated data with audio devices of the audio environment. The control information and associated data may, in some examples, pertain to one or more applications with which the apparatus 100 is configured for communication.

The interface system 105 may, in some implementations, be configured for receiving audio program streams. The audio program streams may include audio signals that are scheduled to be reproduced by at least some speakers of the environment. The audio program streams may include spatial data, such as channel data and/or spatial metadata. The interface system 105 may, in some implementations, be configured for receiving input from one or more microphones in an environment.

The interface system 105 may include one or more network interfaces and/or one or more external device interfaces (such as one or more universal serial bus (USB) interfaces). According to some implementations, the interface system 105 may include one or more wireless interfaces. The interface system 105 may include one or more devices for implementing a user interface, such as one or more microphones, one or more speakers, a display system, a touch sensor system and/or a gesture sensor system. In some examples, the interface system 105 may include one or more interfaces between the control system 110 and a memory system, such as the optional memory system 115 shown in FIG. 1. However, the control system 110 may include a memory system in some instances.

The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 110 may reside in more than one device. For example, a portion of the control system 110 may reside in a device within one of the environments depicted herein and another portion of the control system 110 may reside in a device that is outside the environment, such as a server, a mobile device (e.g., a smartphone or a tablet computer), etc. In other examples, a portion of the control system 110 may reside in a device within one of the environments depicted herein and another portion of the control system 110 may reside in one or more other devices of the environment. For example, control system functionality may be distributed across multiple smart audio devices of an environment, or may be shared by an orchestrating device (such as what may be referred to herein as a smart home hub) and one or more other devices of the environment. The interface system 105 also may, in some such examples, reside in more than one device.

In some implementations, the control system 110 may be configured for performing, at least in part, the methods disclosed herein. Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 115 shown in FIG. 1 and/or in the control system 110. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 110 of FIG. 1.

In some examples, the apparatus 100 may include the optional microphone system 120 shown in FIG. 1. The optional microphone system 120 may include one or more microphones. In some implementations, one or more of the microphones may be part of, or associated with, another device, such as a speaker of the speaker system, a smart audio device, etc. In some examples, the apparatus 100 may not include a microphone system 120. However, in some such implementations the apparatus 100 may nonetheless be configured to receive microphone data for one or more microphones in an audio environment via the interface system 110.

According to some implementations, the apparatus 100 may include the optional loudspeaker system 125 shown in FIG. 1. The optional loudspeaker system 125 may include one or more loudspeakers, which also may be referred to herein as "speakers." In some examples, at least some loudspeakers of the optional loudspeaker system 125 may be arbitrarily located. For example, at least some speakers of the optional loudspeaker system 125 may be placed in locations that do not correspond to any standard prescribed loudspeaker layout, such as Dolby 5.1, Dolby 5.1.2, Dolby 7.1, Dolby 7.1.4, Dolby 9.1, Hamasaki 22.2, etc. In some such examples, at least some loudspeakers of the optional speaker system 125 may be placed in locations that are convenient to the space (e.g., in locations where there is space to accommodate the loudspeakers), but not in any standard prescribed loudspeaker layout. In some examples, the apparatus 100 may not include a loudspeaker system 125.

In some implementations, the apparatus 100 may include the optional sensor system 129 shown in FIG. 1. The optional sensor system 129 may include one or more cameras, touch sensors, gesture sensors, motion detectors, etc. According to some implementations, the optional sensor system 129 may include one or more cameras. In some implementations, the cameras may be free-standing cameras. In some examples, one or more cameras of the optional sensor system 129 may reside in a smart audio device, which may be a single purpose audio device or a virtual assistant. In some such examples, one or more cameras of the optional sensor system 129 may reside in a TV, a mobile phone or a smart speaker. In some examples, the apparatus 100 may not include a sensor system 129. However, in some such implementations the apparatus 100 may nonetheless be configured to receive sensor data for one or more sensors in an audio environment via the interface system 110.

In some implementations, the apparatus 100 may include the optional display system 135 shown in FIG. 1. The optional display system 135 may include one or more displays, such as one or more light-emitting diode (LED) displays. In some instances, the optional display system 135 may include one or more organic light-emitting diode (OLED) displays. In some examples wherein the apparatus 100 includes the display system 135, the sensor system 129 may include a touch sensor system and/or a gesture sensor system proximate one or more displays of the display system 135. According to some such implementations, the control system 110 may be configured for controlling the display system 135 to present one or more graphical user interfaces (GUIs).

According to some such examples the apparatus 100 may be, or may include, a smart audio device. In some such implementations the apparatus 100 may be, or may include, a wakeword detector. For example, the apparatus 100 may be, or may include, a virtual assistant.

A "sweet spot," as the term is used by audiophiles and recording engineers, refers to a location at which an individual is capable of hearing played-back audio the way it was intended to be heard by the mixer. In the context of stereophonic sound, and assuming equal playback levels by the left and right loudspeaker, the sweet spot may be considered to be a location of a vertex of an equilateral triangle of which the locations of the left and right loudspeakers are the other vertices. In the case of surround sound, the sweet spot may be considered to be the focal point of sound propagating from four or more speakers, e.g., the location at which wave fronts from all speakers arrive simultaneously. In some publications, the sweet spot is referred to as a "reference listening point."

Accordingly, in some examples a sweet spot may be defined according to a canonical loudspeaker layout, such as a left/right speaker stereo layout, a left/right/center/left surround/right surround Dolby 5.1 loudspeaker layout, etc. However, in many audio environments (including but not limited to home audio environments, loudspeakers are not necessarily positioned at locations corresponding to those of a canonical loudspeaker layout.

Figure 2A:
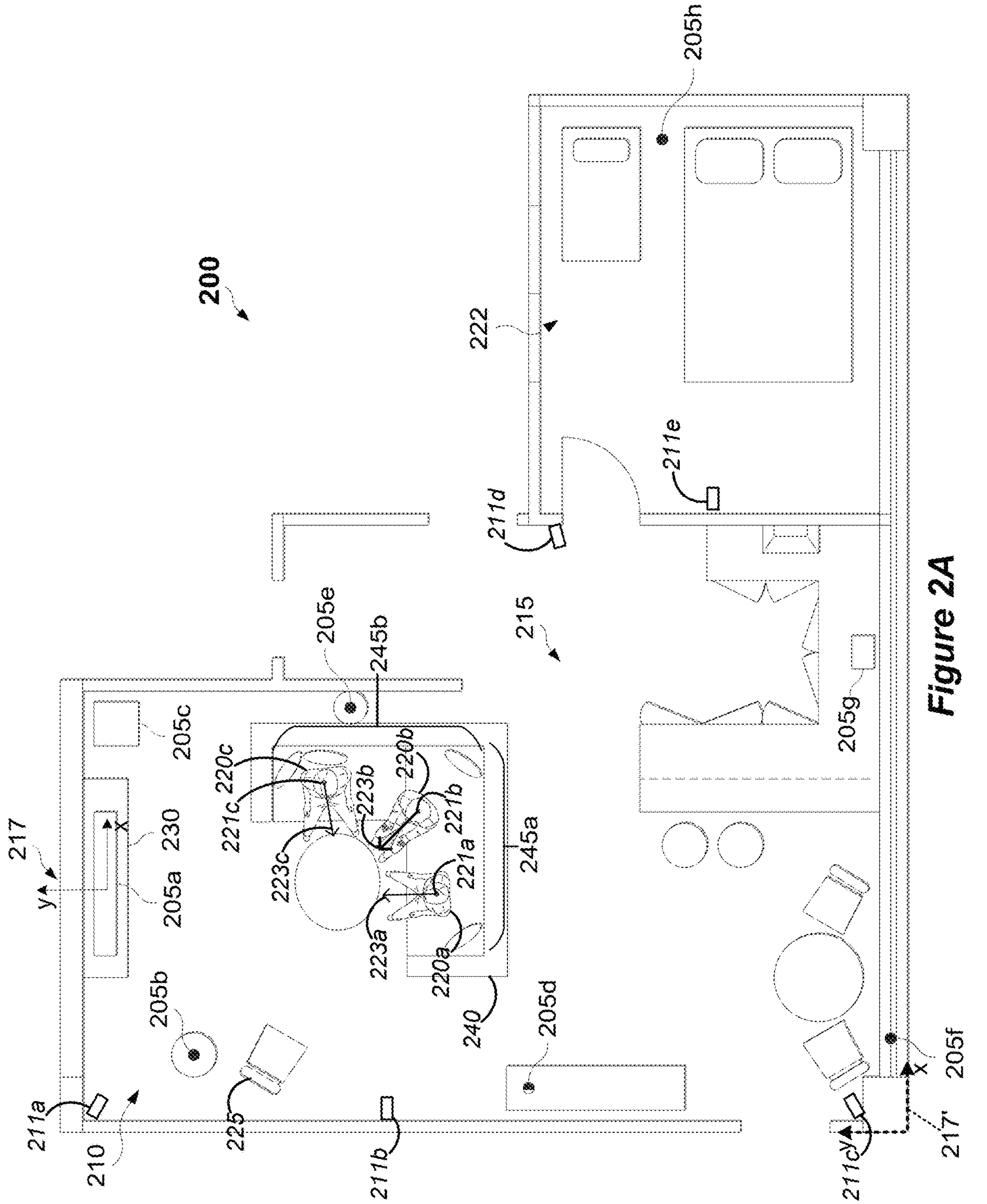
FIG. 2A depicts a floor plan of a listening environment, which is a living space in this example.

FIG. 2A depicts a floor plan of a listening environment, which is a living space in this example. As with other figures provided herein, the types, numbers and arrangements of elements shown in FIG. 2A are merely provided by way of example. Other implementations may include more, fewer and/or different types, numbers and/or arrangements of elements. In other examples, the audio environment may be another type of environment, such as an office environment, a vehicle environment, a park or other outdoor environment, etc. Some detailed examples involving vehicle environments are described below.

According to this example, the audio environment 200 includes a living room 210 at the upper left, a kitchen 215 at the lower center, and a bedroom 222 at the lower right. In the example of FIG. 2A, boxes and circles distributed throughout the living space represent a set of loudspeakers 205*a*, 205*b*, 205*c*, 205*d*, 205*e*, 205*f*, 205*g* and 205*h*, at least some of which may be smart speakers in some implementations. In this example, the loudspeakers 205*a*-205*h* have been placed in locations convenient to the living space, but the loudspeakers 205*a*-205*h* are not in positions corresponding to any standard "canonical" loudspeaker layout such as Dolby 5.1, Dolby 7.1, etc. In some examples, the loudspeakers 205*a*-205*h* may be coordinated to implement one or more disclosed embodiments.

Flexible rendering is a technique for rendering spatial audio over an arbitrary number of arbitrarily-placed loudspeakers, such as the loudspeakers represented in FIG. 2A. With the widespread deployment of smart audio devices (e.g., smart speakers) in the home, as well as other audio devices that are not located according to any standard "canonical" loudspeaker layout, it can be advantageous to implement flexible rendering of audio data and playback of the so-rendered audio data.

Several technologies have been developed to implement flexible rendering, including Center of Mass Amplitude Panning (CMAP) and Flexible Virtualization (FV). Both of these technologies cast the rendering problem as one of cost function minimization, where the cost function includes at least a first term that models the desired spatial impression that the renderer is trying to achieve and a second term that assigns a cost to activating speakers. Detailed examples of CMAP, FV and combinations thereof are described in International Publication No. WO 2021/021707 A1, published on 4 Feb. 2021 and entitled "MANAGING PLAYBACK OF MULTIPLE STREAMS OF AUDIO OVER MULTIPLE SPEAKERS," on page 25, line 8 through page 31, line 27, which are hereby incorporated by reference.

However, the methods involving flexible rendering that are disclosed herein are not limited to CMAP and/or FVbased flexible rendering. Such methods may be implemented by any suitable type of flexible rendering, such as vector base amplitude panning (VBAP). Relevant VBAP methods are disclosed in Pulkki, Ville, "Virtual Sound Source Positioning Using Vector Base Amplitude Panning," in J. Audio Eng. Soc. Vol. 45, No. 6 (June 1997), which is hereby incorporated by reference. Other suitable types of flexible rendering include, but are not limited to, dual-balance panning and Ambisonics-based flexible rendering methods such as those described in D. Arteaga, "An Ambisonics Decoder for Irregular 3-D Loudspeaker Arrays," Paper 8918, (2013 May), which is hereby incorporated by reference.

In some instances, flexible rendering may be performed relative to a coordinate system, such as the audio environment coordinate system 217 that is shown in FIG. 2A. According to this example, the audio environment coordinate system 217 is a two-dimensional Cartesian coordinate system. In this example, the origin of the audio environment coordinate system 217 is within the loudspeaker 205*a* and the x axis corresponds to a long axis of the loudspeaker 205*a*. In other implementations, the audio environment coordinate system 217 may be a three-dimensional coordinate system, which may or may not be a Cartesian coordinate system.

Moreover, the origin of the coordinate system is not necessarily associated with a loudspeaker or a loudspeaker system. In some implementations, the origin of the coordinate system may be in another location of the audio environment 200. The location of the alternative audio environment coordinate system 217' provides one such example. In this example, the origin of the alternative audio environment coordinate system 217' has been selected such that the values of x and y are positive for all locations within the audio environment 200. In some instances, the origin and orientation of a coordinate system may be selected to correspond with the location and orientation of the head of a person within the audio environment 200. In some such implementations, the viewing direction of a person may be along an axis of the coordinate system (e.g., along the positive y axis).

In some implementations, a control system may control a flexible rendering process based, at least in part, on the location (and, in some examples, the orientation) of each participating loudspeaker (e.g., each active loudspeaker and/or each loudspeaker for which audio data will be rendered) in an audio environment. According to some such implementations, the control system may have previously determined the location (and, in some examples, the orientation) of each participating loudspeaker according to a coordinate system, such as the audio environment coordinate system 217, and may have stored corresponding loudspeaker position data in a data structure. Some methods for determining audio device positions are described below.

According to some such implementations, a control system for an orchestrating device (which may, in some instances, be one of the loudspeakers 205*a*-205*h*) may render audio data such that a particular element or area of the audio environment 200, such as the television 230, represents the front and center of the audio environment. Such implementations may be advantageous for some use cases, such as playback of audio for a movie, television program or other content being displayed on the television 230.

However, for other use cases, such as playback of music that is not associated with content being displayed on the television 230, such a rendering method may not be optimal. In such alternative use cases, it may be desirable to render audio data for playback such that the front and center of the rendered sound field correspond with the position and orientation of a person within the audio environment 200.

For example, referring to person 220*a*, it may be desirable to render audio data for playback such that the front and center of the rendered sound field correspond with the viewing direction of the person 220*a*, which is indicated by the direction of the arrow 223*a* from the location of the person 220*a*. In this example, the location of the person 220*a* is indicated by the point 221*a* at the center of the person 220*a*'s head. In some examples, the "sweet spot" of audio data rendered for playback for the person 220*a* may correspond with the point 221*a*. Some methods for determining the position and orientation of a person in an audio environment are described below. In some such examples, the position and orientation of a person may be determined according to the position and orientation of a piece of furniture, such as those of the chair 225.

According to this example, the positions of the persons 220*b* and 220*c* are represented by the points 221*b* and 221*c*, respectively. Here, the fronts of the persons 220*b* and 220*c* are represented by the arrows 223*b* and 223*c*, respectively. The locations of the points 221*a*, 221*b* and 221*c*, as well as the orientations of the arrows 223*a*, 223*b* and 223*c*, may be determined relative to a coordinate system, such as the audio environment coordinate system 217. As noted above, in some examples the origin and orientation of a coordinate system may be selected to correspond with the location and orientation of the head of a person within the audio environment 200.

In some examples, the "sweet spot" of audio data rendered for playback for the person 220*b* may correspond with the point 221*b*. Similarly, the "sweet spot" of audio data rendered for playback for the person 220*c* may correspond with the point 221*c*. One may observe that if the "sweet spot" of audio data rendered for playback for the person 220*a* corresponds with the point 221*a*, this sweet spot will not correspond with the point 221*b* or the point 221*c*.

Moreover, the front and center area of a sound field rendered for the person 220*b* should ideally correspond with the direction of the arrow 223*b*. Likewise, the front and center area of a sound field rendered for the person 220*c* should ideally correspond with the direction of the arrow 223*c*. One may observe that the front and center areas relative to persons 220*a*, 220*b* and 220*c* are all different. Accordingly, audio data rendered via previously-disclosed methods and according to the position and orientation of any one of these people and will not be optimal for the positions and orientations of the other two people.

However, various disclosed implementations are capable of rendering audio data satisfactorily for multiple sweet spots, and in some instances for multiple orientations. Some such methods involve creating two or more different spatial renderings of the same audio content for different listening configurations over a set of common loudspeakers and combining the different spatial renderings by multiplexing the renderings across frequency. In some such examples, the frequency spectrum corresponding to the range of human hearing (e.g., 20 Hz to 20,000 Hz) may be divided into a plurality of frequency bands. According to some such examples, each of the different spatial renderings will be played back via a different set of frequency bands. In some such examples, the rendered audio data corresponding to each set of frequency bands may be combined into a single output set of loudspeaker feed signals. The result may provide spatial audio for each of a plurality of locations, and in some instances for each of a plurality of orientations.

Some such implementations may involve separately rendering spatial audio for two or more people (e.g., both the driver and the front passenger) in a vehicle. According to some examples, the number of listeners and their positions (and, in some instances, their orientations) may be determined according to sensor data. In a vehicle context, the number of listeners and their positions (and, in some instances, their orientations) may be determined according to seat sensor data.

In some implementations, the number of listeners and their positions (and, in some instances, their orientations) may be determined according to data from one or more cameras in an audio environment, such as the audio environment 200 of FIG. 2A. In this example, the audio environment 200 includes cameras 211*a*-211*e*, which are distributed throughout the environment. In some implementations, one or more smart audio devices in the audio environment 200 also may include one or more cameras. The one or more smart audio devices may be single purpose audio devices or virtual assistants. In some such examples, one or more cameras of the optional sensor system 130 may reside in or on the television 230, in a mobile phone or in a smart speaker, such as one or more of the loudspeakers 205*b*, 205*d*, 205*e* or 205*h*. Although cameras 211*a*-211*e* are not shown in every depiction of an audio environment presented in this disclosure, each of the audio environments may nonetheless include one or more cameras in some implementations.

Figure 2B:
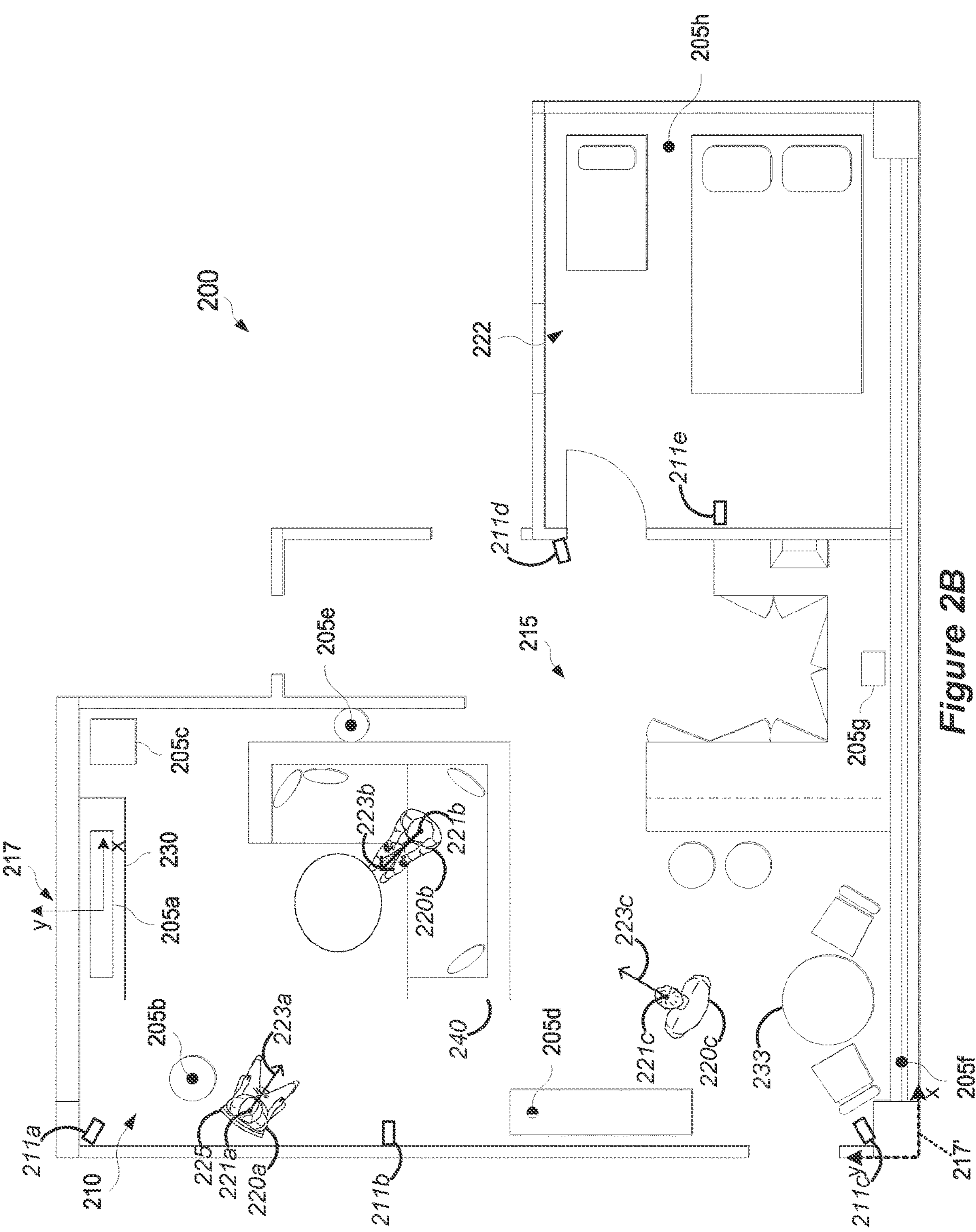
FIG. 2B shows an example of the audio environment of FIG. 2A at a different time.

FIG. 2B shows an example of the audio environment of FIG. 2A at a different time. In this example, the person 220*a* and the person 220*c* have changed positions and orientations. At the time depicted in FIG. 2B, the person 220*a* has moved to the chair 225 and the person 220*c* is standing between the couch 240 and the table 233. In some implementations, the new positions and orientations of the persons 220*a* and 220*c* may be determined and audio signals may be rendered for each of the new positions and orientations. In some examples, the rendered audio signals may be processed and combined as disclosed herein.

Figure 2C:
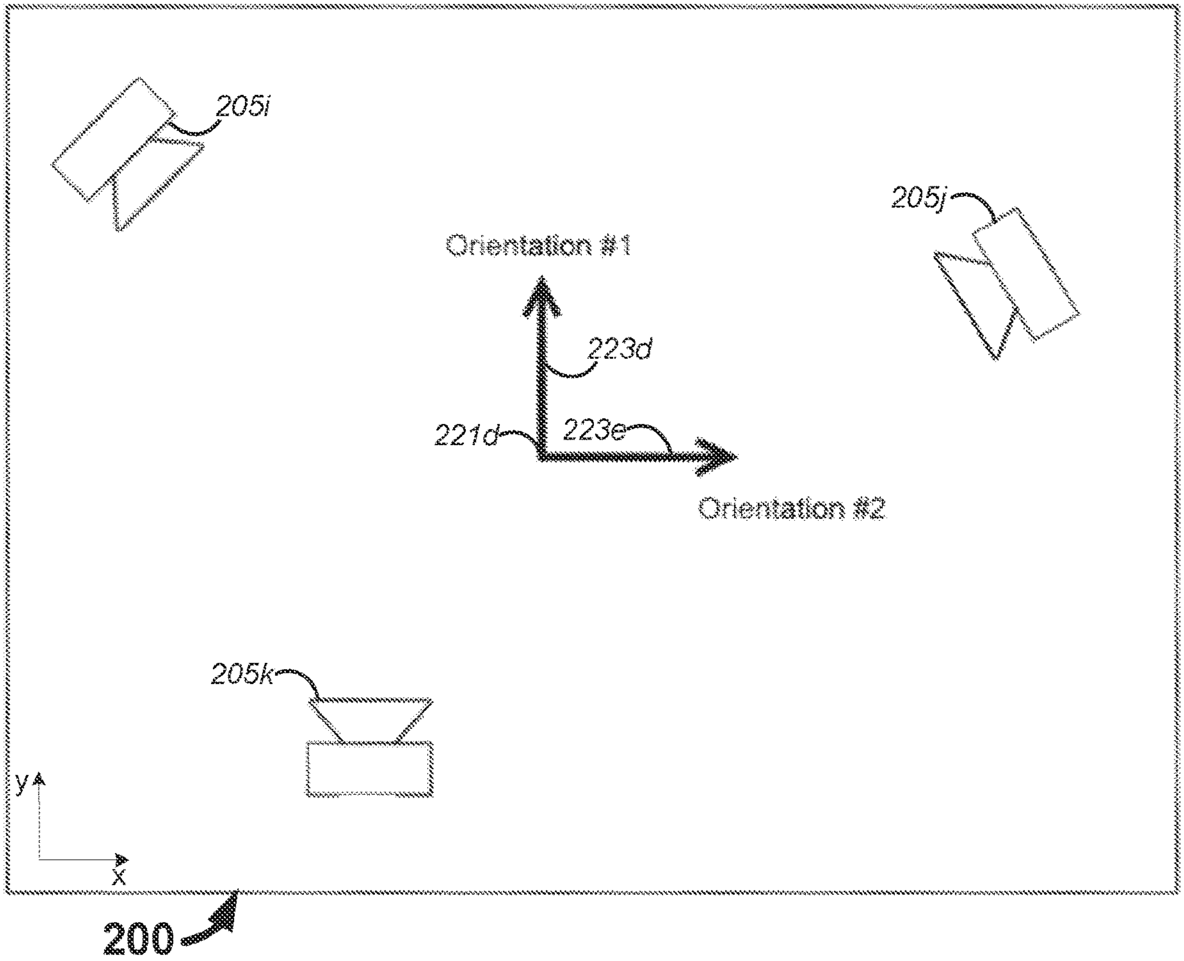
FIG. 2C shows another example of an audio environment.

FIG. 2C shows another example of an audio environment. In this example, the audio environment 200 includes loudspeakers 205*i*, 205*j* and 205*k*. According to this example, a single listening position (corresponding with the point 221*d*) and two listening orientations (corresponding with the arrows 223*d* and 223*e*) are shown. In this example, the two listening orientations are orthogonal to one another. In some implementations, two sets of rendered audio signals may be produced, corresponding to each of the two orientations and to the single position. In some examples, the rendered audio signals may be processed and combined as disclosed herein (e.g., by multiplexing across frequency). Such implementations can provide a more uniform maintenance of spaciousness to a listener, regardless of their orientation in the audio environment 200. Accordingly, such implementations may be desirable for parties or other social gatherings.

Figure 3:
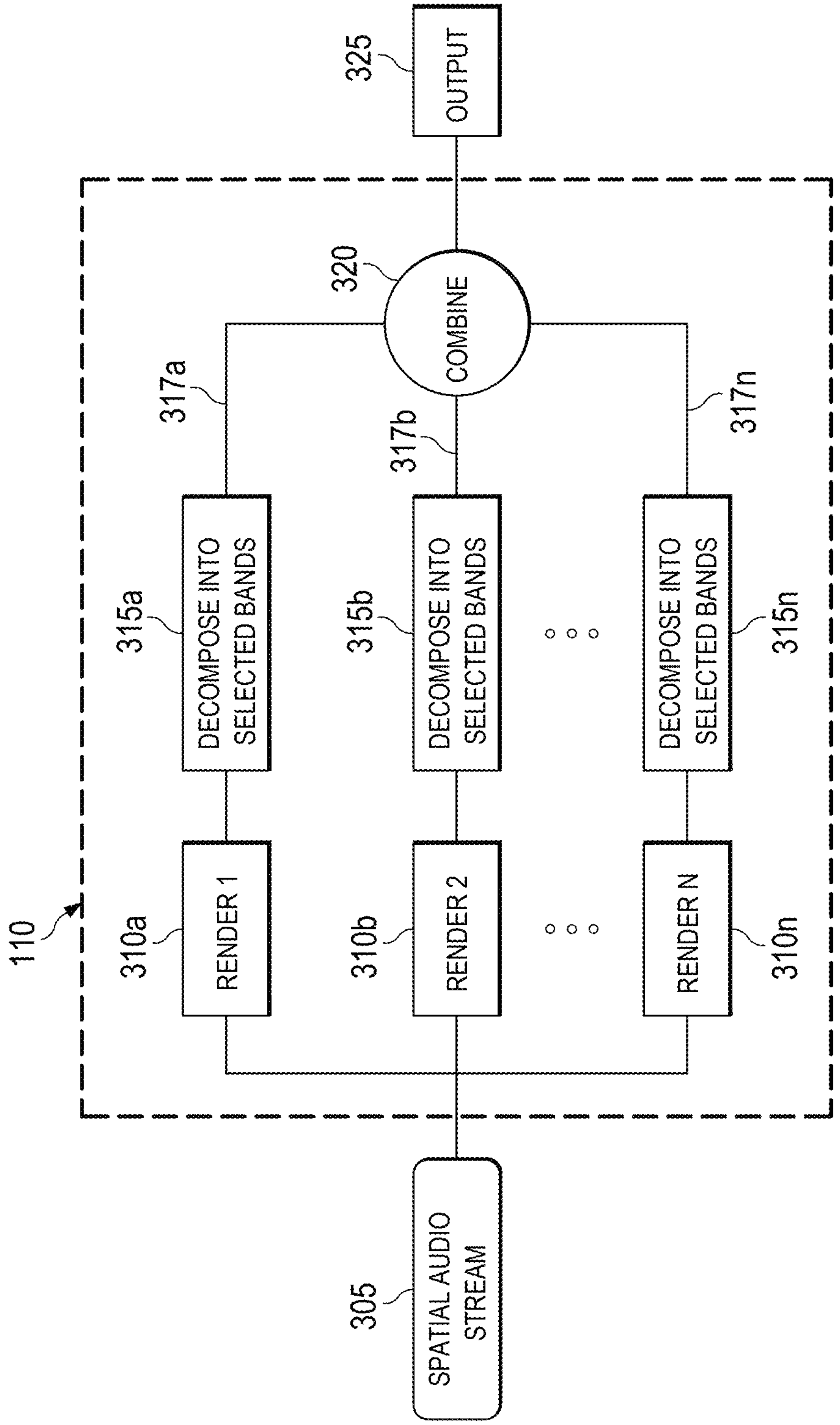
FIG. 3 shows example blocks of one disclosed implementation.

FIG. 3 shows example blocks of one disclosed implementation. As with other figures provided herein, the types, numbers and arrangements of elements shown in FIG. 3 are merely provided by way of example. Other implementations may include more, fewer and/or different types, numbers and/or arrangements of elements. According to some implementations, at least some blocks of FIG. 3 may be implemented via the apparatus 100 or FIG. 1. In this example, elements 310*a*-310*n*, 315*a*-315*n* and 320 are implemented via an instance of the control system 110 of apparatus 100. In some such examples, elements 310*a*-310*n*, 315*a*-315*n* and 320 may be implemented by the control system 110 according to instructions stored on one or more non-transitory computer-readable media, which may in some instances correspond to one or more memory devices of the memory system 115.

In this example, a spatial audio stream 305 is received and rendered by a set of N spatial audio renderers 310*a*-310*n*. In some examples, the spatial audio stream 305 may include audio signals and associated spatial data. The spatial data may indicate an intended perceived spatial position corresponding to an audio signal. According to some examples (e.g., for audio object implementations such as Dolby Atmos™), the spatial data may be, or may include, positional metadata. However, in some instances the intended perceived spatial position may correspond to a channel of the channel-based audio format (e.g., may correspond to a left channel, a right channel, a center channel, etc.). Accordingly, examples of spatial audio streams 305 that may be received by the spatial audio renderers 310*a*-310*n* include stereo, Dolby 5.1, Dolby 7.1 and object-based audio content such as Dolby Atmos.

In this example, N is at least three, meaning that there are at least three spatial audio renderers. However, in some alternative examples N may be two or more. In some examples, one or more of the spatial audio renderers 310*a*-310*n* may operate in the time domain. In some instances, one or more of the spatial audio renderers 310*a*-310*n* may operate in the frequency domain.

According to this example, each of the spatial audio renderers 310*a*-310*n* is configured to render audio data for a single listening configuration. The listening configuration may, for example, be defined according to a coordinate system. A listening configuration may correspond with a listening position (or a listening area) of a person in an audio environment. In some examples, a listening configuration may correspond with a listening orientation of a person in the audio environment. In some examples, the listening configuration may be determined relative to the location (and, in some instances, the orientation) of each loudspeaker of a set of loudspeakers numbering two or more. In some instances, a listening position (or a listening area) may correspond with a position and orientation of a piece of furniture in the audio environment. For example, referring to FIG. 2A, a listening position may correspond with the position and orientation of the chair 225. In some examples, a listening area may correspond with the position and orientation of at least a portion of the couch 240, e.g., with the section 245*a* or the section 245*b*.

In this example, each of the spatial audio renderers 310*a*-310*n* is configured to produce speaker feed signals, which are provided to a corresponding one of the decomposition modules 315*a*-315*n*. In this implementation, each of the decomposition modules 315*a*-315*n* is configured to decompose speaker feed signals into a set of selected frequency bands. For implementations in which one or more of the decomposition modules 315*a*-315*n* is receiving speaker feed signals in the time domain, the decomposition module(s) receiving such speaker feed signals may be configured to transform the speaker feed signals to the frequency domain. In this context, the "frequency bands" produced by the decomposition modules 315*a*-315*n* are frequency-domain representations of the speaker feed signals in each of a set of frequency ranges. However, as noted below, in some examples some or all of the spatial audio renderers 310*a*-310*n*, as well as the corresponding decomposition modules 315*a*-315*n*, may operate in the time domain. In some such examples, the "frequency bands" may be speaker feed signals in the time domain that have been filtered so as to have a desired distribution of energy in selected frequency bands.

According to this example, the combination module 320 is configured to combine the sets of renderer-specific loudspeaker feed signals 317*a*-317*n*, output by each of the decomposition modules 315*a*-315*n*, to produce an output set of loudspeaker feed signals 325. According to some examples, the combination module 320 may be configured to combine (e.g., to add) the renderer-specific loudspeaker feed signals 317*a*-317*n*. The operation of the combination module 320 may be viewed as a multiplexing process. Alternatively, the combined operations of the decomposition modules 315*a*-315*n* and the combination module 320 may be viewed as a multiplexing process. In some examples, the combination module 320 may be configured to transform the combined sets of renderer-specific loudspeaker feed signals 317*a*-317*n* from the frequency domain to the time domain, such that the output set of loudspeaker feed signals 325 is in the time domain. However, in some implementations some or all of the spatial audio renderers 310*a*-310*n*, as well as the corresponding decomposition modules 315*a*-315*n*, may operate in the time domain. In some such examples, some or all of decomposition modules 315*a*-315*n* may implement comb filters in the time domain. In some examples, some or all of decomposition modules 315*a*-315*n* may implement finite impulse response (FIR) or infinite impulse response (IIR) filters in the time domain. In some examples, the output set of loudspeaker feed signals 325 may be provided to a set of loudspeakers in the audio environment. According to some implementations, the output set of loudspeaker feed signals 325 may be played back by the set of loudspeakers.

In some instances, each set of frequency bands produced by each of the decomposition modules 315*a*-315*n* may be a renderer-specific set of frequency bands: a different renderer-specific set of frequency bands may, for example, be selected specifically for each of the spatial audio renderers 310*a*-310*n*. According to some implementations, these sets of renderer-specific frequency bands may be advantageously selected such that the output set of loudspeaker feed signals 325 includes all frequencies in the audible range, or all frequencies in the range of frequencies included in the spatial audio stream 305.

In one such example, the spatial audio stream 305 may include (and/or the output set of loudspeaker feed signals 325 may represent) audio data in frequencies ranging from $F_{min}$ to $F_{max}$. In this example, the combined sets of frequency bands of the renderer-specific loudspeaker feed signals 317*a*-317*n* (in other words, the frequency bands of the output set of loudspeaker feed signals 325) may include adjacent frequency bands $B_1$ through $B_X$ ranging from $F_{min}$ to $F_{max}$, inclusive, where X is an integer corresponding to the total number of frequency bands. In some such examples, the decomposition module 315*a* may produce a set of frequency bands $B_1$, $B_{1+N}$, $B_{1+2N}$, etc. In some such examples, the decomposition module 315*b* may produce a set of frequency bands $B_2$, $B_{2+N}$, $B_{2+2N}$, etc. In some such examples, the decomposition module 315*c* may produce a set of frequency bands $B_3$, $B_{3+N}$, $B_{3+2N}$, etc.

For example, in an implementation in which there are 4 spatial audio renderers and 64 frequency bands, the decomposition module 315*a* may produce a set of frequency bands $B_1$, $B_5$, $B_9$, $B_{13}$, $B_{17}$, $B_{21}$, $B_{25}$, $B_{29}$, $B_{33}$, $B_{37}$, $B_{41}$, $B_{45}$, $B_{49}$, $B_{53}$, $B_{57}$, and $B_{61}$. In one such example, the decomposition module 315*b* may produce a set of frequency bands $B_2$, $B_6$, $B_{10}$, $B_{14}$, $B_{18}$, $B_{22}$, $B_{26}$, $B_{30}$, $B_{34}$, $B_{38}$, $B_{42}$, $B_{46}$, $B_{50}$, $B_{54}$, $B_{58}$, and $B_{62}$. In one such example, the decomposition module 315*c* may produce a set of frequency bands $B_3$, $B_7$, $B_{11}$, $B_{15}$, $B_{19}$, $B_{23}$, $B_{27}$, $B_{31}$, $B_{35}$, $B_{39}$, $B_{43}$, $B_{47}$, $B_{51}$, $B_{55}$, $B_{59}$, and $B_{63}$. In one such example, the decomposition module 315*d* may produce a set of frequency bands $B_4$, $B_8$, $B_{12}$, $B_{16}$, $B_{20}$, $B_{24}$, $B_{28}$, $B_{32}$, $B_{36}$, $B_{40}$, $B_{44}$, $B_{48}$, $B_{52}$, $B_{56}$, $B_{60}$, and $B_{64}$. In some such examples, the output set of loudspeaker feed signals 325 includes all 64 frequency bands, $B_1$-$B_{64}$. The foregoing is one example of what may be referred to as a "non-overlapping" implementation, in which each of the sets of renderer-specific frequency bands include different frequency bands.

However, in some alternative examples there may be one or more overlapping or non-unique frequency bands produced by the decomposition modules 315*a*-315*n*. In some such examples, one or more of the lowest-frequency bands may be produced by two or more of the decomposition modules 315*a*-315*n*. For instance, in one example similar to the foregoing example, the decomposition module 315*d* may produce a set of frequency bands $B_1$, $B_4$, $B_8$, $B_{12}$, $B_{16}$, $B_{20}$, $B_{24}$, $B_{28}$, $B_{32}$, $B_{36}$, $B_{40}$, $B_{44}$, $B_{48}$, $B_{52}$, $B_{56}$, $B_{60}$, and $B_{64}$. The decomposition modules 315*a*-315*c* may produce the sets of frequency bands indicated in the foregoing paragraph. One may observe that in such examples the output set of loudspeaker feed signals 325 includes two contributions for the frequency band $B_1$. Some such implementations may involve matching the playback amplitude of overlapping frequency bands to that of the non-overlapping example described above, in which only one set of frequency bands produced by the decomposition modules 315*a*-315*d* included the frequency band $B_1$. For example, some such implementations may involve selecting the level for both instances of the frequency band $B_1$ such that overall sound pressure level in the frequency band $B_1$ is the same in the overlapping case as in the non-overlapping case.

Figure 4:
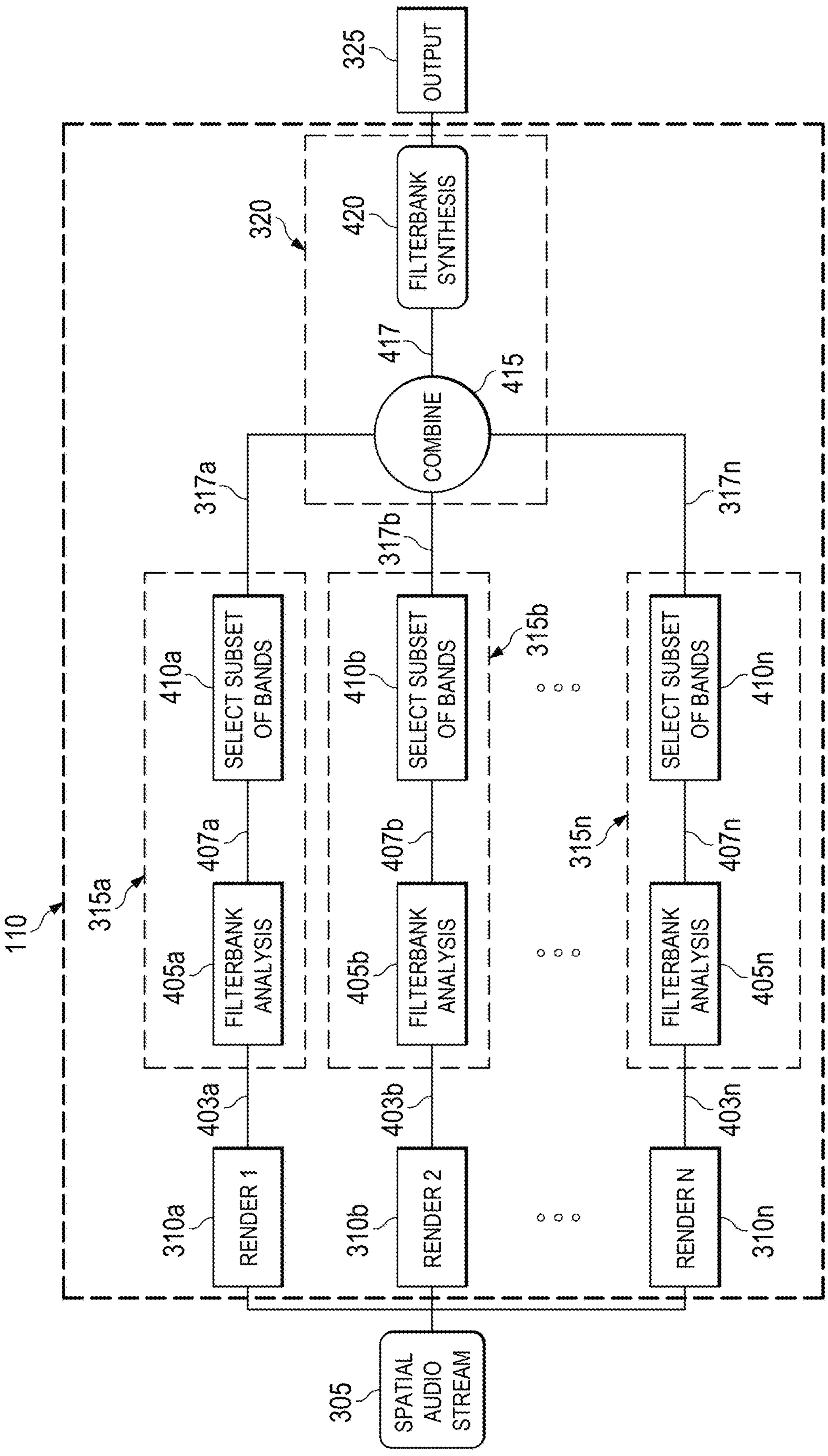
FIG. 4 shows example blocks of another disclosed implementation.

FIG. 4 shows example blocks of another disclosed implementation. As with other figures provided herein, the types, numbers and arrangements of elements shown in FIG. 4 are merely provided by way of example. Other implementations may include more, fewer and/or different types, numbers and/or arrangements of elements. According to some implementations, at least some blocks of FIG. 4 may be implemented via the apparatus 100 or FIG. 1. In this example, elements 310*a*-310*n*, 315*a*-315*n* and 320 are implemented via an instance of the control system 110 of apparatus 100. In some such examples, elements 310*a*-310*n*, 315*a*-315*n* and 320 may be implemented by the control system 110 according to instructions stored on one or more non-transitory computer-readable media, which may in some instances correspond to one or more memory devices of the memory system 115.

In this example, a spatial audio stream 305 is received and rendered by a set of N spatial audio renderers 310*a*-310*n*. According to this example, the spatial audio stream 305 and the spatial audio renderers 310*a*-310*n* are as described above with reference to FIG. 3, so these descriptions will not be repeated here.

According to this implementation, each of the spatial audio renderers 310*a*-310*n* is configured to produce speaker feed signals, which are provided to a corresponding one of the decomposition modules 315*a*-315*n*. In this implementation, each of the decomposition modules 315*a*-315*n* includes a corresponding one of the filterbank analysis blocks 405*a*-405*n*, each of which is configured to decompose speaker feed signals 403*a*-403*n* from a corresponding one of the spatial audio renderers 310*a*-310*n* into one of the global sets of frequency bands 407*a*-407*n*. The filterbank analysis blocks 405*a*-405*n* may be configured to implement a Short-time Discrete Fourier Transform (STDFT) filterbank, a Hybrid Complex Quadrature Mirror (HCQMF) filterbank, a Quadrature Mirror (QMF) filterbank, or another type of filterbank. According to some examples, the global set of frequency bands may correspond to the adjacent frequency bands $B_1$ through $B_X$ that are described above with reference to FIG. 3.

According to this example, each of the decomposition modules 315*a*-315*n* includes a corresponding one of the frequency band selection blocks 410*a*-410*n*, each of which is configured to select a renderer-specific set of frequency bands from the global set of frequency bands produced by a corresponding one of the filterbank analysis blocks 405*a*-405*n*. The renderer-specific set of frequency bands may, for example, be as described above with reference to FIG. 3. However, other implementations may provide different renderer-specific sets of frequency bands. For implementations in which one or more of the decomposition modules 315*a*-315*n* is receiving speaker feed signals in the time domain, the decomposition module(s) receiving such speaker feed signals may be configured to transform the speaker feed signals to the frequency domain.

According to this example, the combination module 320 includes a combination block 415 that is configured to combine the renderer-specific loudspeaker feed signals 317*a*-317*n*, output by each of the decomposition modules 315*a*-315*n*, to produce an output set of loudspeaker feed signals 417 in the frequency domain. In some examples, the combination block 415 may be configured to combine the renderer-specific loudspeaker feed signals 317*a*-317*n* via a multiplexing process. In this example, the combination module 320 also includes a filterbank synthesis block 420 that is configured to transform the output set of loudspeaker feed signals 417 from the frequency domain to the time domain, such that the output set of loudspeaker feed signals 325 is in the time domain. In some examples, the output set of loudspeaker feed signals 325 may be provided to a set of loudspeakers in the audio environment. According to some implementations, the output set of loudspeaker feed signals 325 may be played back by the set of loudspeakers.

Figure 5:
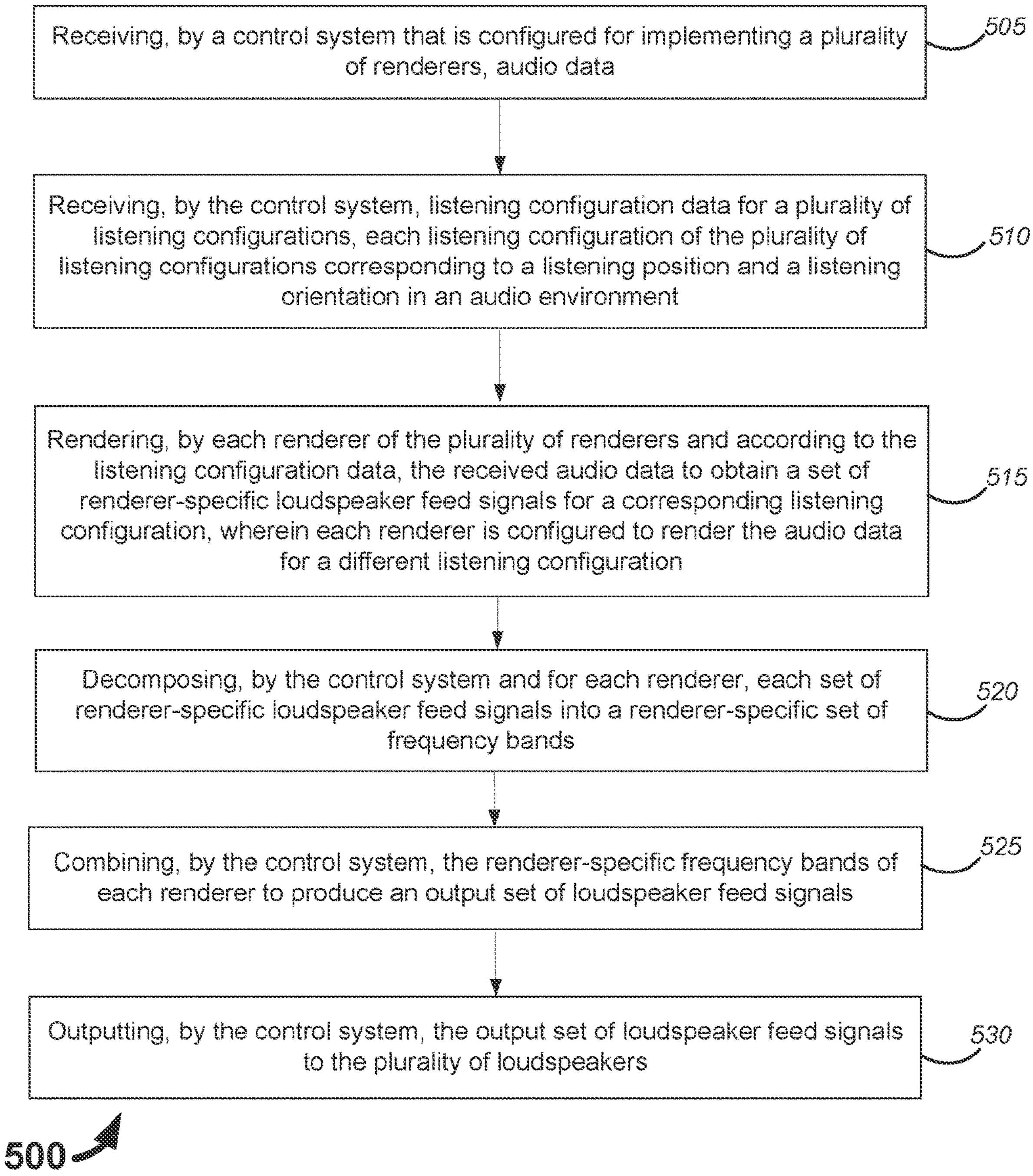
FIG. 5 is a flow diagram that outlines one example of a method that may be performed by an apparatus or system such as those shown in FIGS. 1-4.

FIG. 5 is a flow diagram that outlines one example of a method that may be performed by an apparatus or system such as those shown in FIGS. 1-4. The blocks of method 500, like other methods described herein, are not necessarily performed in the order indicated. Moreover, such methods may include more or fewer blocks than shown and/or described. The blocks of method 500 may be performed by one or more devices, which may be (or may include) a control system such as the control system 110 shown in FIGS. 1, 3 and 4, and described above, or one of the other disclosed control system examples.

In this implementation, block 505 involves receiving, by a control system that is configured for implementing a plurality of renderers, audio data. In some examples, the audio data may include audio signals and associated spatial data, e.g., as described above with reference to the spatial audio stream 305 of FIG. 3 or FIG. 4. Accordingly, in some examples the audio data may include spatial channel-based audio data and/or spatial object-based audio data. In some instances, the audio data may have one of the following audio formats: stereo, Dolby 3.1.2, Dolby 5.1, Dolby 5.1.2, Dolby 7.1, Dolby 7.1.2, Dolby 7.1.4, Dolby 9.1, Dolby 9.1.6 or Dolby Atmos™.

According to this example, block 510 involves receiving, by the control system, listening configuration data for a plurality of listening configurations. In this example, each listening configuration corresponds to a listening position and a listening orientation in an audio environment. Each listening configuration may, for example, correspond with a listening position and a listening orientation of a person in the audio environment. The listening position may, for example, correspond with the person's head position. The listening orientation may, for example, correspond with the person's head orientation. For example, the listening positions and orientations may correspond with the positions and orientations of the persons 220*a*-220*c* that are shown in FIGS. 2A and 2B. In the example shown in FIG. 2C, block 510 may involve receiving listening configuration data for two listening configurations corresponding to the same listening position and two different listening orientations.

According to this implementation, block 515 involves rendering, by each renderer of the plurality of renderers and according to the listening configuration data, the received audio data to obtain a set of renderer-specific loudspeaker feed signals for a corresponding listening configuration. In this example, each renderer is configured to render the audio data for a different listening configuration. In some implementations, one or more renderers may operate in the time domain, e.g., to perform dual-balance amplitude panning in the time domain. According to some implementations, one or more renderers may operate in the frequency domain, e.g., to perform cross-talk cancellation in the frequency domain. In some examples, block 515 may be performed by the spatial audio renderers 310*a*-310*n* of FIG. 3 or FIG. 4.

In this example, block 520 involves decomposing, by the control system and for each renderer, each set of renderer-specific loudspeaker feed signals into a renderer-specific set of frequency bands. In some examples, the "frequency bands" produced in block 520 may be frequency-domain representations of the renderer-specific loudspeaker feed signals in each frequency range of a set of frequency ranges. However, as noted elsewhere herein, in some examples the "frequency bands" may be speaker feed signals in the time domain that have been filtered in block 520 so as to have a desired distribution of energy in selected frequency bands. In some examples, block 520 may be performed by the decomposition modules 315*a*-315*n* of FIG. 3 or FIG. 4. In some "non-overlapping" implementations, each of the sets of renderer-specific frequency bands may include different frequency bands. However, in some "overlapping" implementations, one or more frequency bands may be included in two or more of the sets of renderer-specific frequency bands.

According to this implementation, block 525 involves combining, by the control system, the renderer-specific frequency bands of each renderer to produce an output set of loudspeaker feed signals. In some examples, block 525 may involve adding the renderer-specific sets of frequency bands. The combining process of block 525 may be regarded as a process of multiplexing the renderer-specific sets of frequency bands. However, some may consider the operation of block 520 and the combining process of block 525, taken together, to be a process of multiplexing the renderer-specific sets of frequency bands. According to some implementations, block 525 may involve transforming, by a synthesis filterbank, the output set of loudspeaker feed signals from the frequency domain to the time domain. In this example, block 530 involves outputting, by the control system, the output set of loudspeaker feed signals to a plurality of loudspeakers.

In some examples, decomposing each set of renderer-specific loudspeaker feed signals into each renderer-specific set of frequency bands may involve analyzing, by an analysis filterbank associated to each renderer, the renderer-specific set of loudspeaker feed signals to produce a global set of frequency bands. The analysis filterbank may, for example, be a Short-time Discrete Fourier Transform (STDFT) filterbank, a Hybrid Complex Quadrature Mirror (HCQMF) filterbank or a Quadrature Mirror (QMF) filterbank. The global set of frequency bands may, for example, include adjacent frequency bands $B_1$ through $B_X$, inclusive, where X is an integer corresponding to the total number of frequency bands.

In some examples, decomposing each set of renderer-specific loudspeaker feed signals into each renderer-specific set of frequency bands may involve selecting a subset of frequency bands of the global set of frequency bands to produce the renderer-specific set of frequency bands. According to some implementations, each of the renderer-specific sets of frequency bands may be uniquely associated with one renderer of the plurality of renderers and uniquely associated with one listening configuration of the plurality of listening configurations. In some examples, the subset of the global set of frequency bands may be selected such that when combining the renderer-specific frequency bands for all renderers of the plurality of renderers, each frequency band of the global set of frequency bands is represented only once in the output set of loudspeaker feed signals.

In some implementations, some or all of the renderers depicted in FIGS. 3 and 4 may utilize different strategies to perform their rendering and may, in some instances, operate in different signal domains. For example, one renderer might perform dual-balance amplitude panning in the time domain, while another might employ cross-talk cancellation implemented in the frequency domain. However, the speaker feeds from each renderer must ultimately be in a common domain (e.g., the time domain or the frequency domain) before being combined with the output of one or more other renderers.

Further efficiencies may be achieved when all renderers operate on the output from the same filterbank. One such example will now be described.

Figure 6A:
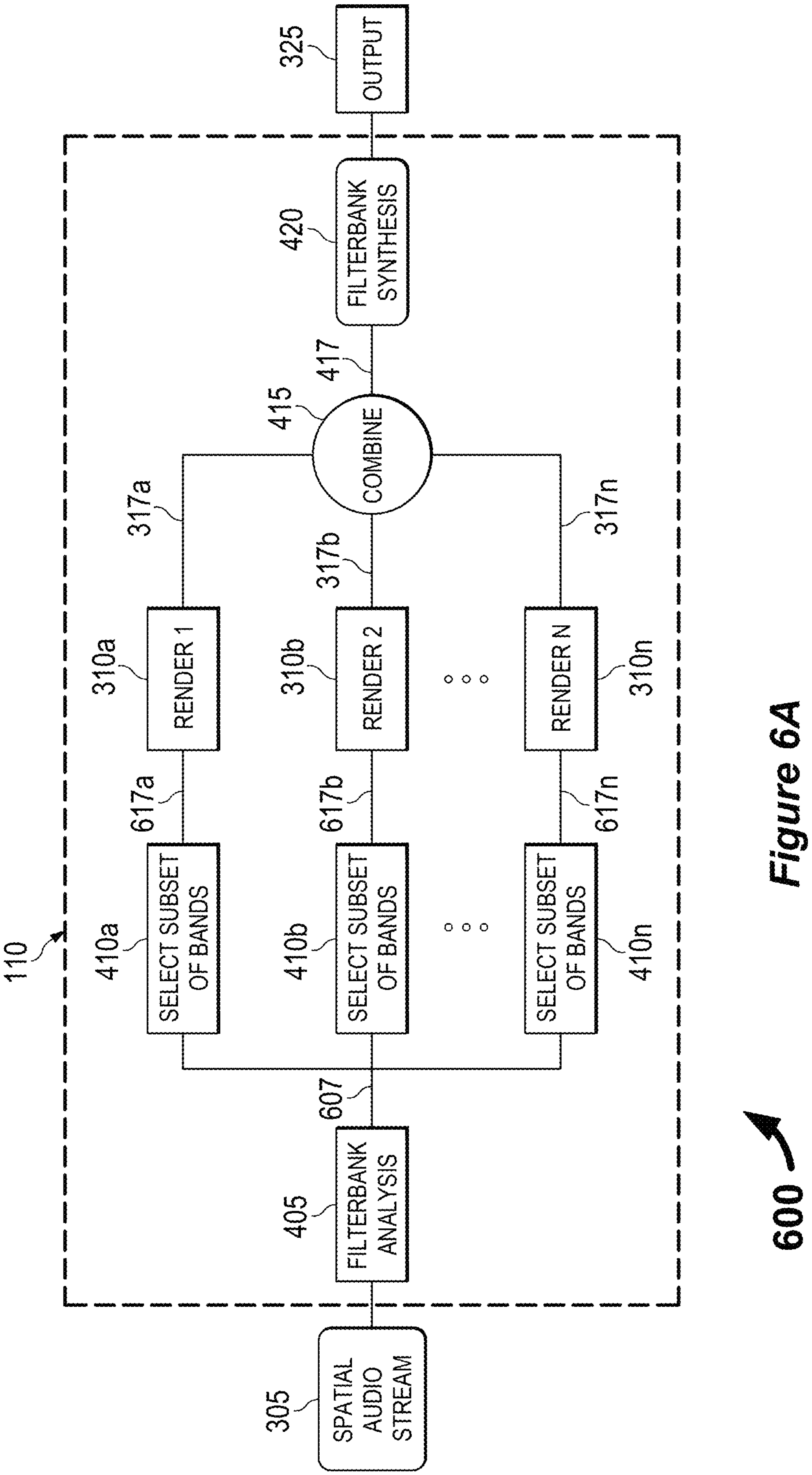
FIG. 6A shows example blocks of another disclosed implementation.

FIG. 6A shows example blocks of another disclosed implementation. As with other figures provided herein, the types, numbers and arrangements of elements shown in FIG. 6A are merely provided by way of example. Other implementations may include more, fewer and/or different types, numbers and/or arrangements of elements. In this example, elements 310*a*-310*n*, 405, 410*a*-410*n*, 415 and 420 are implemented via an instance of the control system 110 of apparatus 100. In some such examples, elements 310*a*-310*n*, 405, 410*a*-410*n*, 415 and 420 may be implemented by the control system 110 according to instructions stored on one or more non-transitory computer-readable media, which may in some instances correspond to one or more memory devices of the memory system 115.

In this example, a spatial audio stream 305 is received by the filterbank analysis block 405. Here, only a single instance of the filterbank analysis block 405 is implemented and the filterbank analysis is applied to the input spatial audio stream 305, rather than multiple instances applied to the speaker feeds of each of the spatial audio renderers 310*a*-310*n* as shown in FIGS. 3 and 4. According to this example, the filterbank analysis block 405 produces a global set of frequency bands 607 corresponding to the audio data of the spatial audio stream 305. In this context, the "frequency bands" produced by the filterbank analysis block 405 are frequency-domain representations of the audio data of the spatial audio stream 305 in each frequency range of a set of frequency ranges. In this example, the filterbank analysis block 405 is a single instance of the filterbank analysis blocks 405*a*-405*n* that are described above with reference to FIG. 4, so that description will not be repeated here.

In this implementation, each of the frequency band selection blocks 410*a*-410*n* is configured to select a corresponding one of the renderer-specific sets of frequency bands 617*a*-617*n* from the global set of frequency bands 607 and to provide one of the renderer-specific sets of frequency bands 617*a*-617*n* to a corresponding one of the spatial audio renderers 310*a*-310*n*. Accordingly, for each of the spatial audio renderers 310*a*-310*n* only the renderer-specific frequency bands of the spatial audio stream belonging to its selected subset of bands are processed to produce speakers feeds for those frequency bands, thereby potentially reducing the complexity of operations performed by each of the spatial audio renderers as well.

If the input spatial audio stream 305 includes spatial metadata, in some implementations this spatial metadata will also be provided to the spatial audio renderers 310*a*-310*n*. In some such examples, the spatial metadata may accompany the global set of frequency bands 607 and each of the renderer-specific sets of frequency bands 617*a*-617*n*.

According to this example, the control system 110 is configured to implement the combination block 415 that is described above with reference to FIG. 4, which is configured to combine the renderer-specific loudspeaker feed signals 317*a*-317*n*, output by the spatial audio renderers 310*a*-310*n*, to produce an output set of loudspeaker feed signals 417 in the frequency domain. In some examples, the combination block 415 may be configured to combine the renderer-specific loudspeaker feed signals 317*a*-317*n* via a summation process. In this example, the control system 110 is configured to implement a filterbank synthesis block 420 that is configured to transform the combined sets of renderer-specific loudspeaker feed signals 317*a*-317*n* from the frequency domain to the time domain, such that the output set of loudspeaker feed signals 325 is in the time domain. In some examples, the output set of loudspeaker feed signals 325 may be provided to a set of loudspeakers in the audio environment. According to some implementations, the output set of loudspeaker feed signals 325 may be played back by the set of loudspeakers.

In one example, each of the spatial audio renderers 310*a*-310*n* may be configured to implement Center of Mass Amplitude Panning (CMAP), and Flexible Virtualization (FV), or one or more combinations thereof. In other examples, each of the spatial audio renderers 310*a*-310*n* may be configured to implement vector base amplitude panning (VBAP), dual-balance panning, or another type of flexible rendering. According to some such implementations, each of the spatial audio renderers 310*a*-310*n* may be implemented to operate in the frequency domain using an HCQMF filterbank. Such flexible renderers are inherently adaptable to different listening positions with respect to a common set of loudspeakers, and therefore each of the N renderers may be implemented as a differently configured instantiation of this same core renderer operating in the HCQMF domain. This same HCQMF filterbank is also suitable for multiplexing the renderers across frequency, and therefore the efficient implementation shown in FIG. 6A applies. In some such examples, the HCQMF filterbank may contain 77 frequency bands. However, alternative implementations may involve different types of filterbanks, some of which may have more or fewer frequency bands.

One of the practical considerations in implementing flexible rendering (in accordance with some embodiments) is complexity. In some cases it may not be feasible to perform accurate rendering for each frequency band for each audio object in real-time, given the processing power of a particular device. One challenge is that the audio object positions (which may in some instances be indicated by metadata) of at least some audio objects to be rendered may change many times per second. The complexity may be compounded for some disclosed implementations, because rendering may be performed for each of a plurality of listening configurations.

An alternative approach to reduce complexity at the expense of memory is to use one or more look-up tables (or other such data structures) that include samples (e.g., of speaker activations) in the three dimensional space for all possible object positions. The sampling may or may not be the same in all dimensions, depending on the particular implementation. In some such examples, one such data structure may be created for each of a plurality of listening configurations. Alternatively, or additionally, a single data structure may be created by summation of a plurality of data structures, each of which may correspond to a different one of a plurality of listening configurations.

Figure 6B:
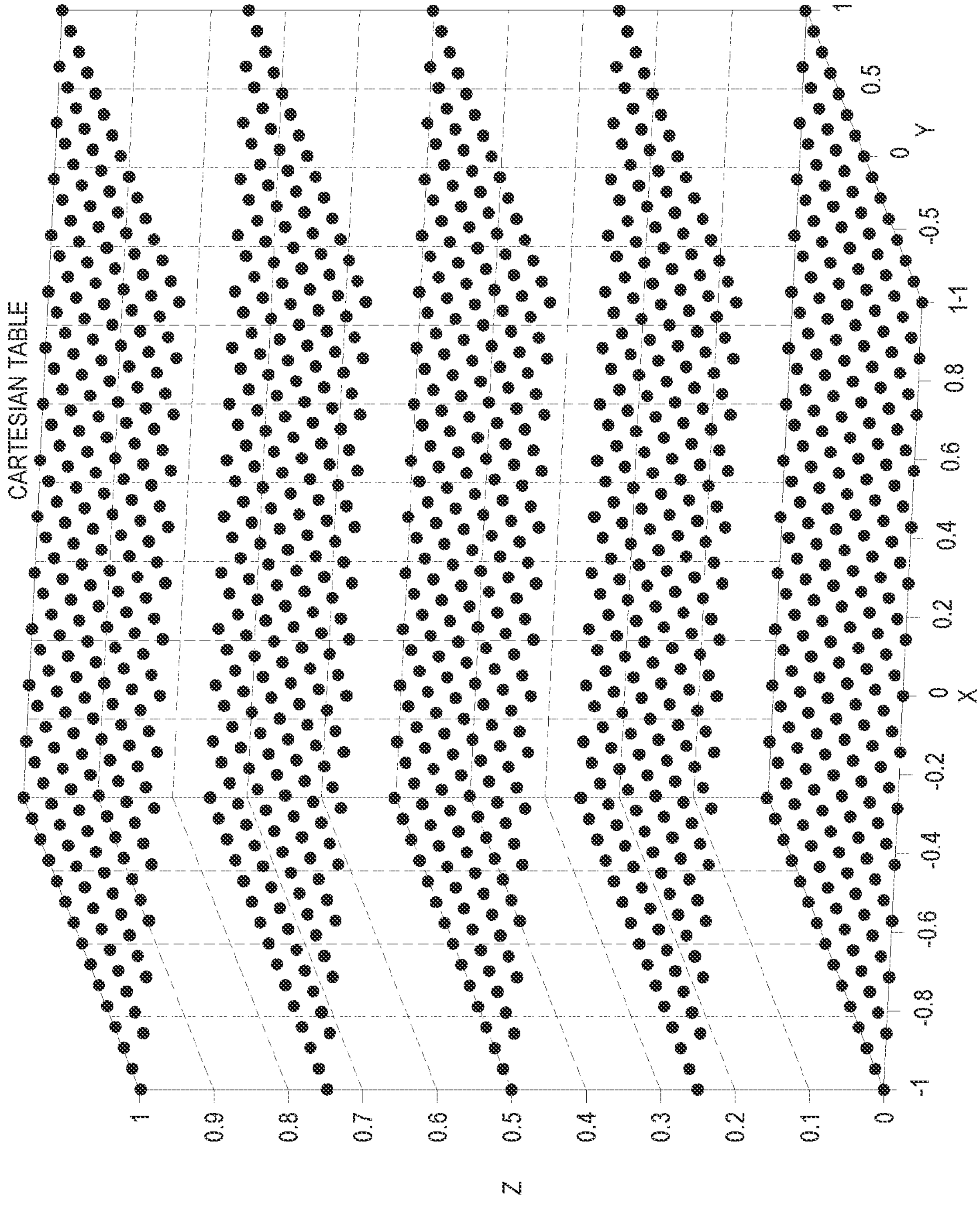
FIG. 6B is a graph of points indicative of speaker activations, in an example embodiment.

FIG. 6B is a graph of points indicative of speaker activations, in an example embodiment. In this example, the x and y dimensions are sampled with 15 points and the z dimension is sampled with 5 points. According to this example, each point represents M speaker activations, one speaker activation for each of M speakers in an audio environment. The speaker activations may be gains or complex values for each of the N frequency bands associated with the filterbank analysis 405 of FIG. 6A. A single data structure may be created by multiplexing the data structures associated with the plurality of listening configurations across these bands. In other words, for each band of the data structure, activations from one of the plurality of listening configurations may be selected. Once this single, multiplexed data structure is created, it may be associated with a single instance of a renderer to achieve functionality that is equivalent to that of FIG. 6A. According to this example, the points shown in FIG. 6B may correspond to speaker activation values for a single data structure that has been created by multiplexing a plurality of data structures, each of which corresponds to a different listening configuration.

Other implementations may include more samples or fewer samples. For example, in some implementations the spatial sampling for speaker activations may not be uniform. Some implementations may involve speaker activation samples in more or fewer x,y planes than are shown in FIG. 6B. Some such implementations may determine speaker activation samples in only one x,y, plane. According to this example, each point represents the M speaker activations for the CMAP, FV, VBAP or other flexible rendering method. In some implementations, a set of speaker activations such as those shown in FIG. 6B may be stored in a data structure, which may be referred to herein as a "table" (or a "cartesian table," as indicated in FIG. 6B).

A desired rendering location will not necessarily correspond with the location for which a speaker activation has been calculated. At runtime, to determine the actual activations for each speaker, some form of interpolation may be implemented. In some such examples, tri-linear interpolation between the speaker activations of the nearest 8 points to a desired rendering location may be used.

Figure 6C:
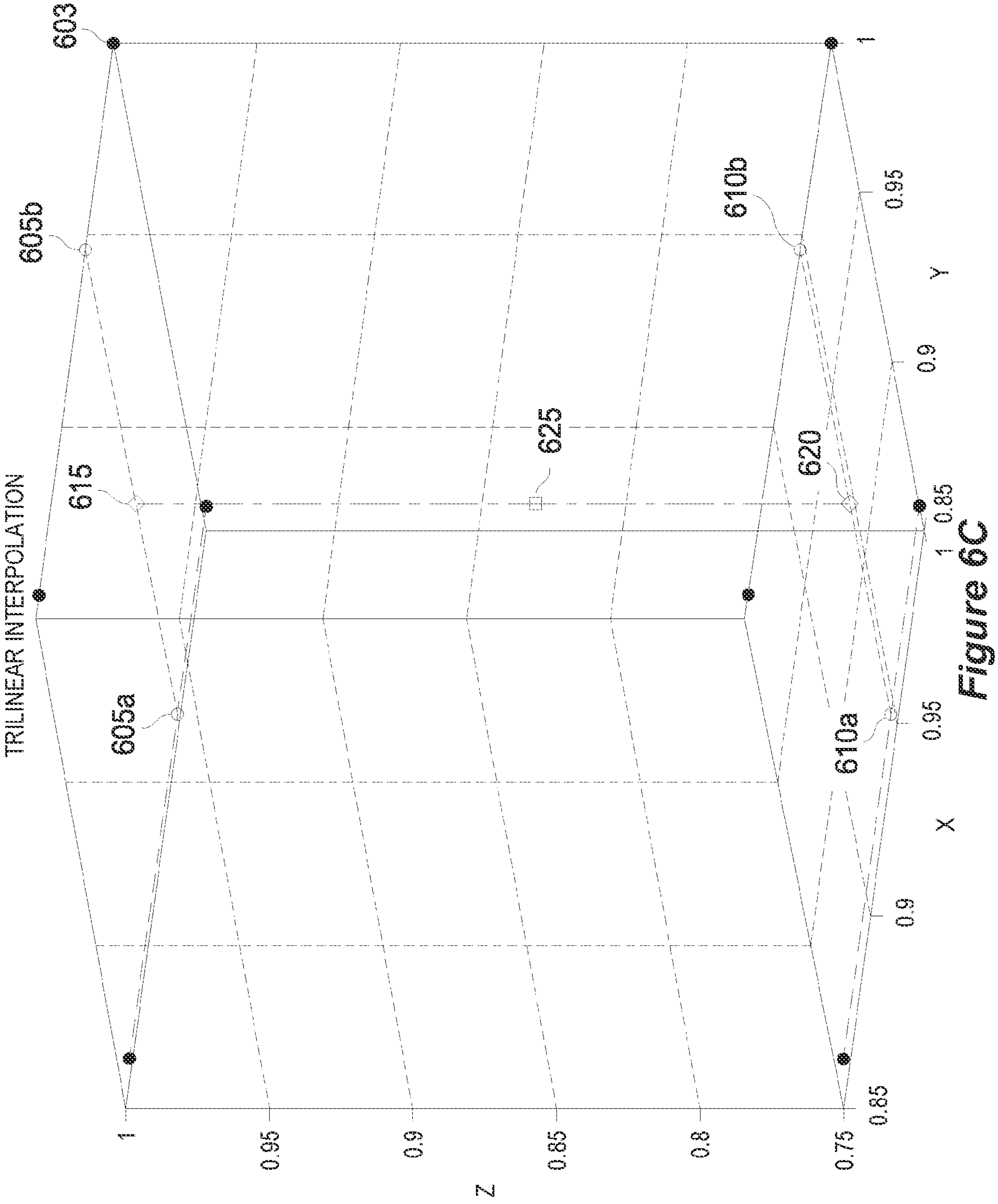
FIG. 6C is a graph of tri-linear interpolation between points indicative of speaker activations according to one example.

FIG. 6C is a graph of tri-linear interpolation between points indicative of speaker activations according to one example. According to this example, the solid circles 603 at or near the vertices of the rectangular prism shown in FIG. 6C correspond to locations of the nearest 8 points to a desired rendering location for which speaker activations have been calculated. In this instance, the desired rendering location is a point within the rectangular prism that is presented in FIG. 6C. In this example, the process of successive linear interpolation includes interpolation of each pair of points in the top plane to determine first and second interpolated points 605*a* and 605*b*, interpolation of each pair of points in the bottom plane to determine third and fourth interpolated points 610*a* and 610*b*, interpolation of the first and second interpolated points 605*a* and 605*b* to determine a fifth interpolated point 615 in the top plane, interpolation of the third and fourth interpolated points 610*a* and 610*b* to determine a sixth interpolated point 620 in the bottom plane, and interpolation of the fifth and sixth interpolated points 615 and 620 to determine a seventh interpolated point 625 between the top and bottom planes.

Although tri-linear interpolation is an effective interpolation method, one of skill in the art will appreciate that tri-linear interpolation is just one possible interpolation method that may be used in implementing aspects of the present disclosure, and that other examples may include other interpolation methods. For example, some implementations may involve interpolation in more or fewer x,y, planes than are shown in FIG. 6B. Some such implementations may involve interpolation in only one x,y, plane. In some implementations, a speaker activation for a desired rendering location will simply be set to the speaker activation of the nearest location to the desired rendering location for which a speaker activation has been calculated.

Figure 7:
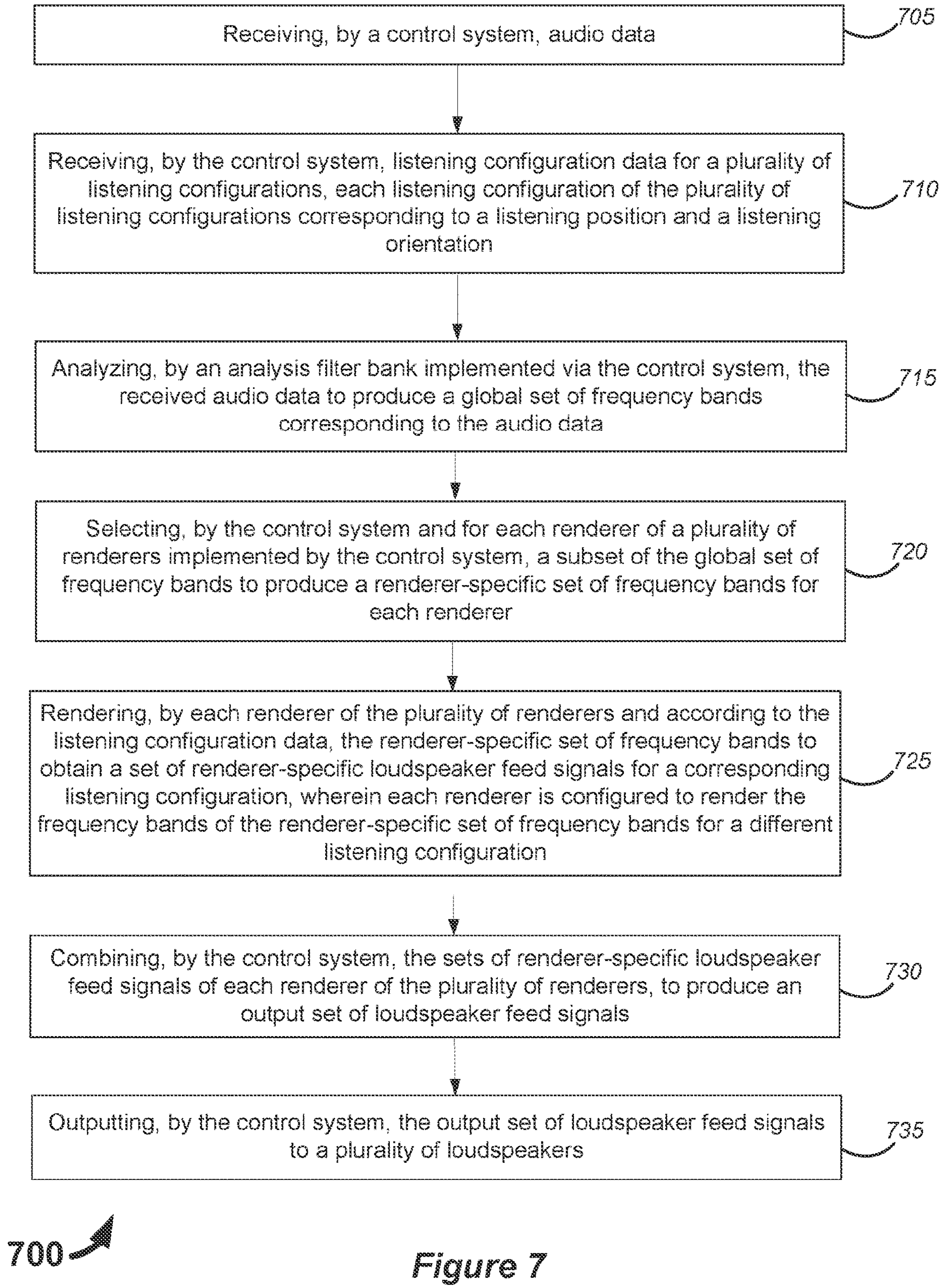
FIG. 7 is a flow diagram that outlines another example of a method that may be performed by an apparatus or system such as those disclosed herein.

FIG. 7 is a flow diagram that outlines another example of a method that may be performed by an apparatus or system such as those disclosed herein. The blocks of method 700, like other methods described herein, are not necessarily performed in the order indicated. Moreover, such methods may include more or fewer blocks than shown and/or described. The blocks of method 700 may be performed by one or more devices, which may be (or may include) a control system such as the control system 110 shown in FIG. 6A and described above, or one of the other disclosed control system examples.

In this implementation, block 705 involves receiving, by a control system, audio data. In some examples, the audio data may include audio signals and associated spatial data, e.g., as described above with reference to the spatial audio stream 305 of FIGS. 3, 4 and 6. Accordingly, in some examples the audio data may include spatial channel-based audio data and/or spatial object-based audio data. In some instances, the audio data may have one of the following audio formats: stereo, Dolby 3.1.2, Dolby 5.1, Dolby 5.1.2, Dolby 7.1, Dolby 7.1.2, Dolby 7.1.4, Dolby 9.1, Dolby 9.1.6 or Dolby Atmos™.

According to this example, block 710 involves receiving, by the control system, listening configuration data for a plurality of listening configurations. In this example, each listening configuration corresponds to a listening position and a listening orientation. Each listening configuration may, for example, correspond with a listening position and a listening orientation of a person in an audio environment. The listening position may, for example, correspond with the person's head position. The listening orientation may, for example, correspond with the person's head orientation.

According to some examples, the listening configuration data may correspond to sensor data obtained from one or more sensors in the audio environment. The sensors may, for example, include one or more cameras, one or more movement sensors and/or one or more microphones. In some instances, the listening position and the listening orientation may be relative to an audio environment coordinate system.

According to some examples, the listening position may be relative to a position of one or more loudspeakers in the audio environment.

According to this implementation, block 715 involves analyzing, by an analysis filterbank implemented via the control system, the received audio data to produce a global set of frequency bands corresponding to the audio data. In some instances, the analysis filterbank may be a Short-time Discrete Fourier Transform (STDFT) filterbank, a Hybrid Complex Quadrature Mirror (HCQMF) filterbank or a Quadrature Mirror (QMF) filterbank. In some examples, block 715 may be performed by the filterbank analysis block 405, which produces the global set of frequency bands 607 corresponding to the audio data of the spatial audio stream 305.

In this example, block 720 involves selecting, by the control system and for each renderer of a plurality of renderers implemented by the control system, a subset of the global set of frequency bands to produce a renderer-specific set of frequency bands for each renderer. In some such implementations, each renderer-specific set of loudspeaker feed signals may be uniquely associated with one renderer of the plurality of renderers and uniquely associated with one listening configuration of the plurality of listening configurations. In some examples, block 720 may be performed by each of the frequency band selection blocks 410*a*-410*n*, which are configured to select a corresponding one of the renderer-specific sets of frequency bands 617*a*-617*n* from the global set of frequency bands 607 and to provide one of the renderer-specific sets of frequency bands 617*a*-617*n* to a corresponding one of the spatial audio renderers 310*a*-310*n*.

According to this implementation, block 725 involves rendering, by each renderer of the plurality of renderers and according to the listening configuration data, the renderer-specific set of frequency bands to obtain a set of renderer-specific loudspeaker feed signals for a corresponding listening configuration. In this example, each renderer is configured to render the frequency bands of the renderer-specific set of frequency bands for a different listening configuration. In some examples, block 725 may be performed by the spatial audio renderers 310*a*-310*n* of FIG. 6A. According to some examples, the rendering of block 725 may involve cross-talk cancellation in the frequency domain.

In this example, block 730 involves combining, by the control system, the sets of renderer-specific loudspeaker feed signals of each renderer of the plurality of renderers, to produce an output set of loudspeaker feed signals. In some examples, combining the set of loudspeaker feed signals may involve multiplexing each of the sets of renderer-specific loudspeaker feed signals. In some examples, block 730 may be performed, at least in part, by the combination block 415 that is described above with reference to FIG. 6A, which is configured to combine the renderer-specific loudspeaker feed signals 317*a*-317*n*, output by the spatial audio renderers 310*a*-310*n*, to produce an output set of loudspeaker feed signals 417 in the frequency domain. According to some examples, block 730 (or another block of method 700) may involve transforming (e.g., via a synthesis filterbank) the output set of loudspeaker feed signals in the frequency domain to an output set of loudspeaker feed signals in the time domain.

In some alternative examples, block 725 may involve producing a plurality of data structures. Each data structure may include a set of renderer-specific speaker activations for a corresponding listening configuration and corresponding to each of a plurality of points in a two-dimensional space or a three-dimensional space. In some such examples, one such data structure may be created for each of a plurality of listening configurations, e.g., as described above with reference to FIGS. 6B and 6C. In some such examples, block 730 may involve creating a single data structure (e.g., a single lookup table) by summing a plurality of data structures, each of which corresponds to a different one of a plurality of listening configurations.

In this implementation, block 735 involves outputting, by the control system, the output set of loudspeaker feed signals to a plurality of loudspeakers. In some examples, method 700 may involve causing the plurality of loudspeakers to reproduce the output set of loudspeaker feed signals.

Figure 8:
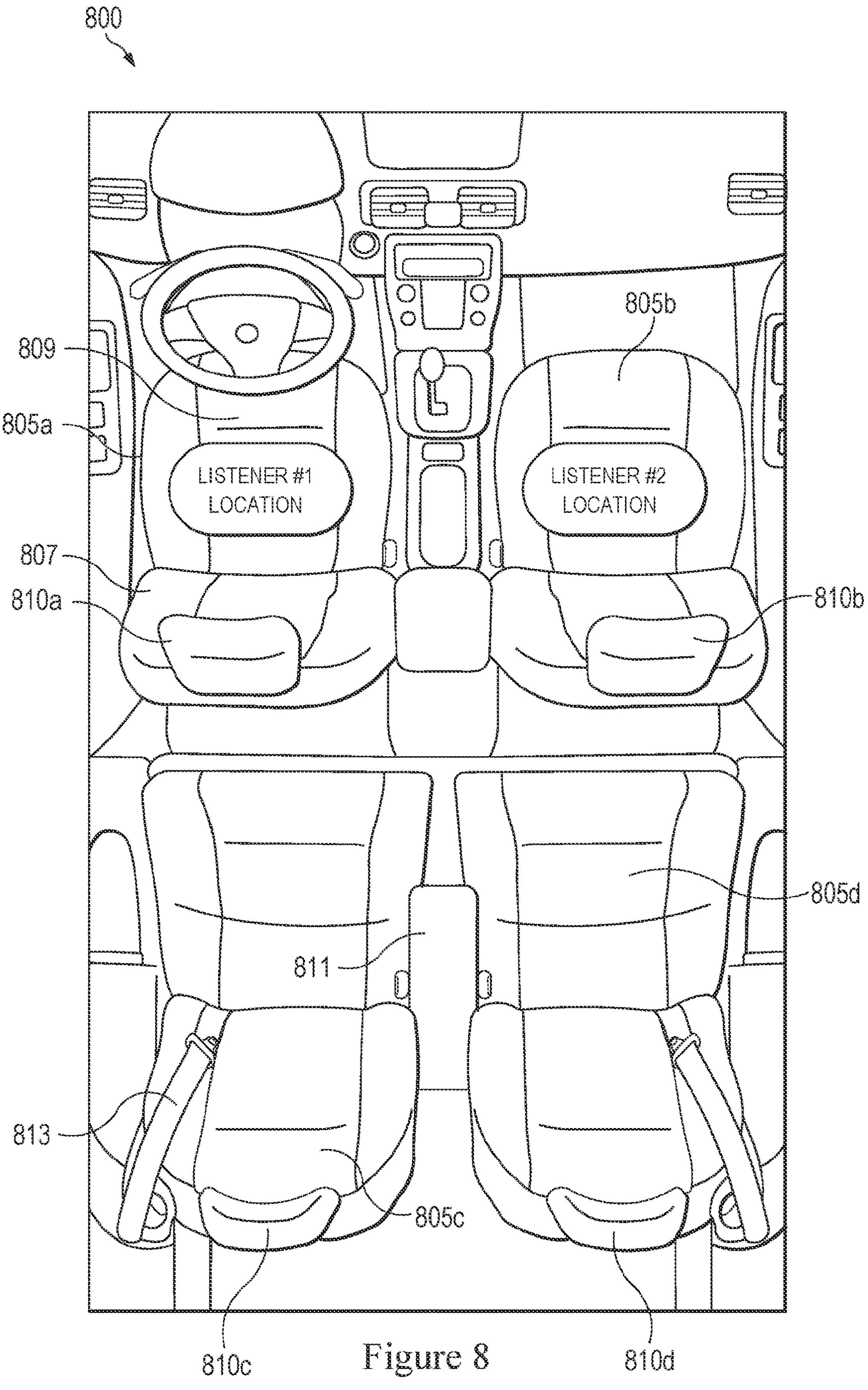
FIG. 8 shows an example of a vehicle interior according to one implementation.

In some implementations, the audio environment may be, or may include, a vehicle environment. FIG. 8 shows an example of a vehicle interior according to one implementation. In this example, the vehicle 800 includes seats 805*a*, 805*b*, 805*c* and 805*d*, each of which includes a seat back 807, a seat bottom 809 and one of the head rests 810*a*, 810*b*, 810*c* and 810*d*. In this implementations, each seat has one or more associated elbow rests 811 and a seat belt 813.

In this example, the vehicle 800 includes a plurality of loudspeakers, although the loudspeakers are not visible in FIG. 8. One potential advantage of vehicle audio environments is that in-vehicle loudspeaker positions and orientations are generally fixed. Therefore, in general the in-vehicle loudspeaker positions and orientations are known and do not need to be determined, e.g., according to an audio device auto-location process.

According to some examples, a vehicle control system (which may be an instance of the control system 110 of FIG. 1) may be configured to determine a listening position and a listening orientation of one or more persons in the vehicle 800. In some such examples, the may be configured to determine the listening position and listening orientation of one or more persons in the vehicle 800 according to sensor data obtained from one or more sensors of the vehicle 800. The one or more sensors may be instances of the sensor system 129 of FIG. 1. In the example shown in FIG. 8, a vehicle control system has determined the positions of Listener 1, who is seated in the driver's seat, and the position of Listener 2, who is sitting in the front passenger seat, according to sensor data obtained from one or more sensors of the vehicle 800.

In some examples, the one or more sensors may be seat sensors, such as one or more cameras, one or more belt sensors, one or more headrest sensors, one or more seat back sensors, one or more seat bottom sensors and/or one or more elbow rest sensors. If the one or more seat sensors include one or more cameras, the camera(s) may or may not be attached to the seat(s), depending on the particular implementation. For example, each of the one or more cameras may be attached to a portion of the vehicle interior near a seat, such as a dashboard, a windshield, a rear-view mirror, a steering wheel, etc., and may be positioned so as to obtain images of persons that are in any of the seats 805*a*-805*d*.

According to some such implementations, if the sensor data indicates that a person is sitting in a seat, the listening position may be assumed to correspond with a seat position (and/or a head rest position) and the person's listening orientation will be assumed to correspond with the orientation of the seat. In some implementations, the vehicle control system may determine a person's listening position according to a position of the person's head. In some examples, the position of the person's head may be determined according to a head rest position. According to some examples, the vehicle control system may determine a person's listening orientation according to the orientation of the seat in which the person is sitting. In some implementations, such as the example shown in FIG. 8, all of the seats 805*a*-805*d* face forward. Accordingly, the vehicle control system may determine that the orientation of a person in any one of the seats 805*a*-805*d* is forward-facing.

However, in some implementations the vehicle control system may determine the position and/or orientation of a person (e.g., of the person's head) based, at least in part, on a seat back position. For example, the vehicle control system may determine (e.g. according to seat sensor data or from a seat mechanism for positioning a seat (including but not limited to a seat mechanism for adjusting the seat back angle)) that a person's seat back is in an upright position, in a reclined position, etc., and may determine the position and/or orientation of the person accordingly.

Moreover, in some alternative implementations, one or more of the seats in a vehicle may be configured to rotate, such that one or more of the seats in a vehicle may be facing a side of the vehicle, facing the back of the vehicle, etc. In some such implementations the vehicle control system may determine the position and/or orientation of a person (e.g., of the person's head) based, at least in part, on a determined angle of seat rotation (e.g., according to seat sensor data). As autonomous vehicles gain in popularity and consumer acceptance, in some instances even a person sitting in what would normally be the driver's seat of a vehicle may not be facing forward at all times.

Figure 9:
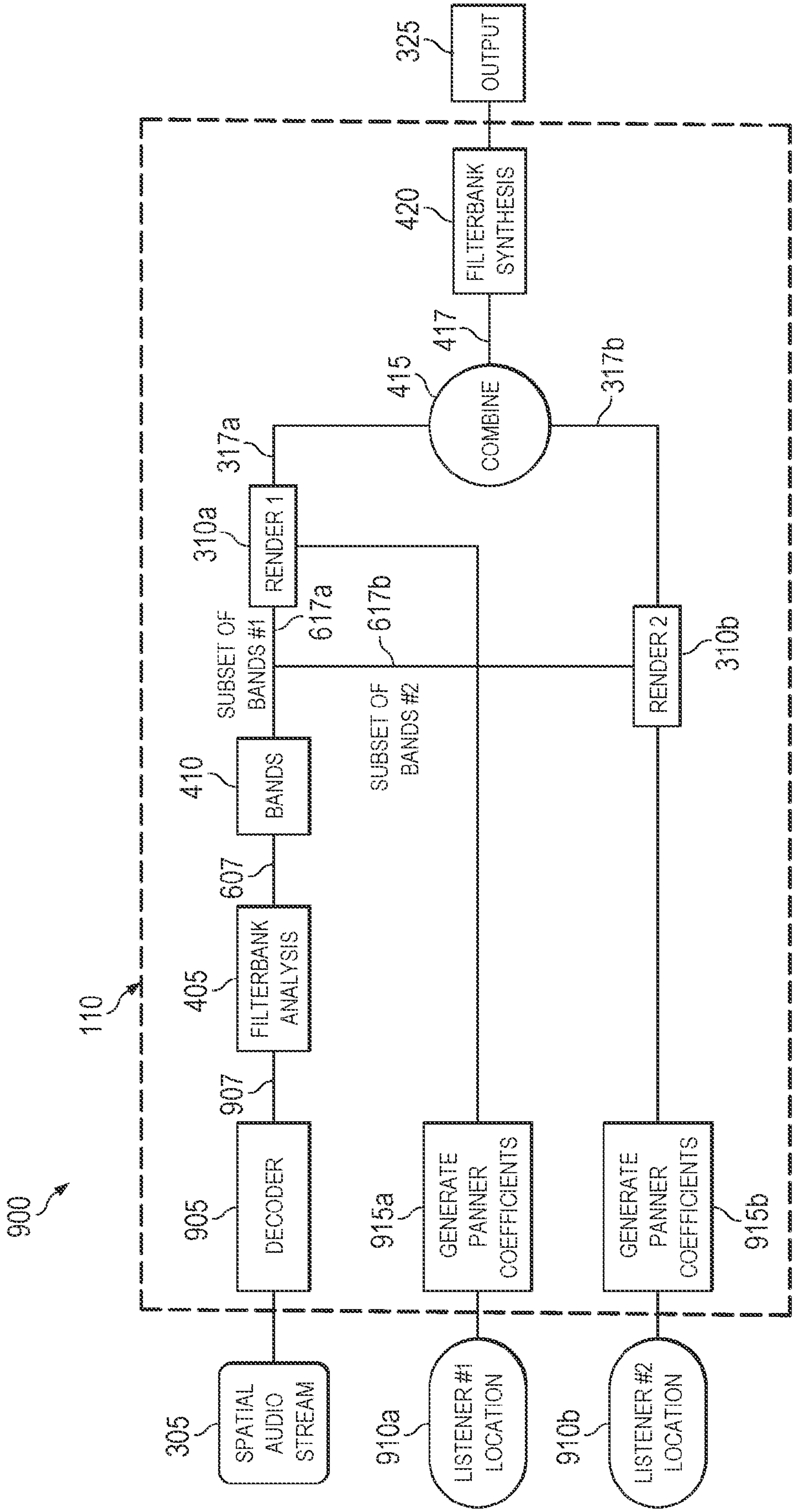
FIG. 9 shows example blocks of another disclosed implementation.

FIG. 9 shows example blocks of another disclosed implementation. As with other figures provided herein, the types, numbers and arrangements of elements shown in FIG. 9 are merely provided by way of example. Other implementations may include more, fewer and/or different types, numbers and/or arrangements of elements. In this example, elements 310*a*, 310*b*, 410, 415, 420, 905, 915*a* and 915*b* are implemented via an instance of the control system 110 of apparatus 100, which is a vehicle control system in this instance. In some such examples, elements 310*a*, 310*b*, 410, 415, 420, 905, 915*a* and 915*b* may be implemented by the control system 110 according to instructions stored on one or more non-transitory computer-readable media, which may in some instances correspond to one or more memory devices of the memory system 115.

In this example, an encoded spatial audio stream 305 is received by a decoder 905, decoded, and the decoded spatial audio stream 907 is provided to the filterbank analysis block 405. Here, as in FIG. 6A, only a single instance of the filterbank analysis block 405 is implemented, and the filterbank analysis is applied to the input decoded spatial audio stream 907 rather than to the speaker feeds of spatial audio renderers. According to this example, the filterbank analysis block 405 produces a global set of frequency bands 607 corresponding to the audio data of the decoded spatial audio stream 907. In this context, the "frequency bands" produced by the filterbank analysis block 405 are frequency-domain representations of the audio data of the decoded spatial audio stream 907 in each of a set of frequency ranges. In this example, the filterbank analysis block 405 is a single instance of the filterbank analysis blocks 405*a*-405*n* that are described above with reference to FIG. 4, so that description will not be repeated here.

In this implementation, the frequency band selection block 410 has a functionality that is similar to that of the frequency band selection blocks 410*a*-410*n* that are described above with reference to FIG. 4. However, in this implementation, the frequency band selection block 410 is configured to select two renderer-specific sets of frequency bands, 617*a* and 617*b*, from the global set of frequency bands 607. In this example, the frequency band selection block 410 is configured to provide the renderer-specific set of frequency bands 617*a* to the spatial audio renderer 310*a* and to provide the renderer-specific set of frequency bands 617*b* to the spatial audio renderer 310*b*. Accordingly, for each of the spatial audio renderers 310*a* and 310*b*, only the renderer-specific frequency bands of the spatial audio stream belonging to its selected subset of bands are processed to produce speakers feeds for those frequency bands, thereby potentially reducing the complexity of operations performed by each of the spatial audio renderers 310*a* and 310*b* as compared to those described above with reference to FIGS. 3 and 4.

In this example, listener position data 910*a* corresponding to Listener 1 of FIG. 8 is provided to panner coefficient generation block 915*a*, which is configured to generate panner coefficients corresponding to listener position data 910*a* and to provide the panner coefficients to the spatial audio renderer 310*a*. In some implementations, the listener position data 910*a* may include both listener position and listener orientation data. In some such examples, the listener orientation data may indicate that Listener 1 is facing forward, according to the capabilities of the seat 805*a*.

According to this example, listener position data 910*b* corresponding to Listener 2 of FIG. 8 is provided to panner coefficient generation block 915*b*, which is configured to generate panner coefficients corresponding to listener position data 910*b* and to provide the panner coefficients to the spatial audio renderer 310*b*. In some implementations, the listener position data 910*b* may include both listener position and listener orientation data. In some such examples, the listener orientation data may indicate that Listener 2 is facing forward, according to the capabilities of the seat 805*b*. According to some examples, the listener position data 910*a* and the listener position data 910*b* may be, or may be based on, vehicle sensor data, such as seat sensor data.

Some alternative implementations may not include panner coefficient generation blocks 915*a* and 915*b* that are separate from the spatial audio renderers 310*a* and 310*b*. In some such implementations, the listener position data 910*a* may be provided to the spatial audio renderer 310*a* and the listener position data 910*a* may be provided to the spatial audio renderer 310*b*. According to some such examples, the spatial audio renderer 310*a* may be configured to generate panner coefficients corresponding to listener position data 910*a* and the spatial audio renderer 310*b* may be configured to generate panner coefficients corresponding to listener position data 910*b*.

If the input spatial audio stream 305 includes spatial metadata, in some implementations this spatial metadata will also be provided to the spatial audio renderers 310*a* and 310*b*. In some such examples, the spatial metadata may accompany the global set of frequency bands 607 and each of the renderer-specific sets of frequency bands 617*a* and 617*b*.

According to this example, the control system 110 is configured to implement the combination block 415 that is described above with reference to FIG. 4, which is configured to combine the renderer-specific loudspeaker feed signals 317*a* and 317*b*, output by the spatial audio renderers 310*a* and 310*b*, to produce an output set of loudspeaker feed signals 417 in the frequency domain. In some examples, the combination block 415 may be configured to combine the renderer-specific loudspeaker feed signals 317*a* and 317*b* via a multiplexing process. In this example, the control system 110 is configured to implement a filterbank synthesis block 420 that is configured to transform the output set of loudspeaker feed signals 417 from the frequency domain to the time domain, such that the output set of loudspeaker feed signals 325 is in the time domain. In some examples, the output set of loudspeaker feed signals 325 may be provided to a set of loudspeakers in the vehicle 800. According to some implementations, the output set of loudspeaker feed signals 325 may be played back by the set of loudspeakers in the vehicle 800.

Figure 10:
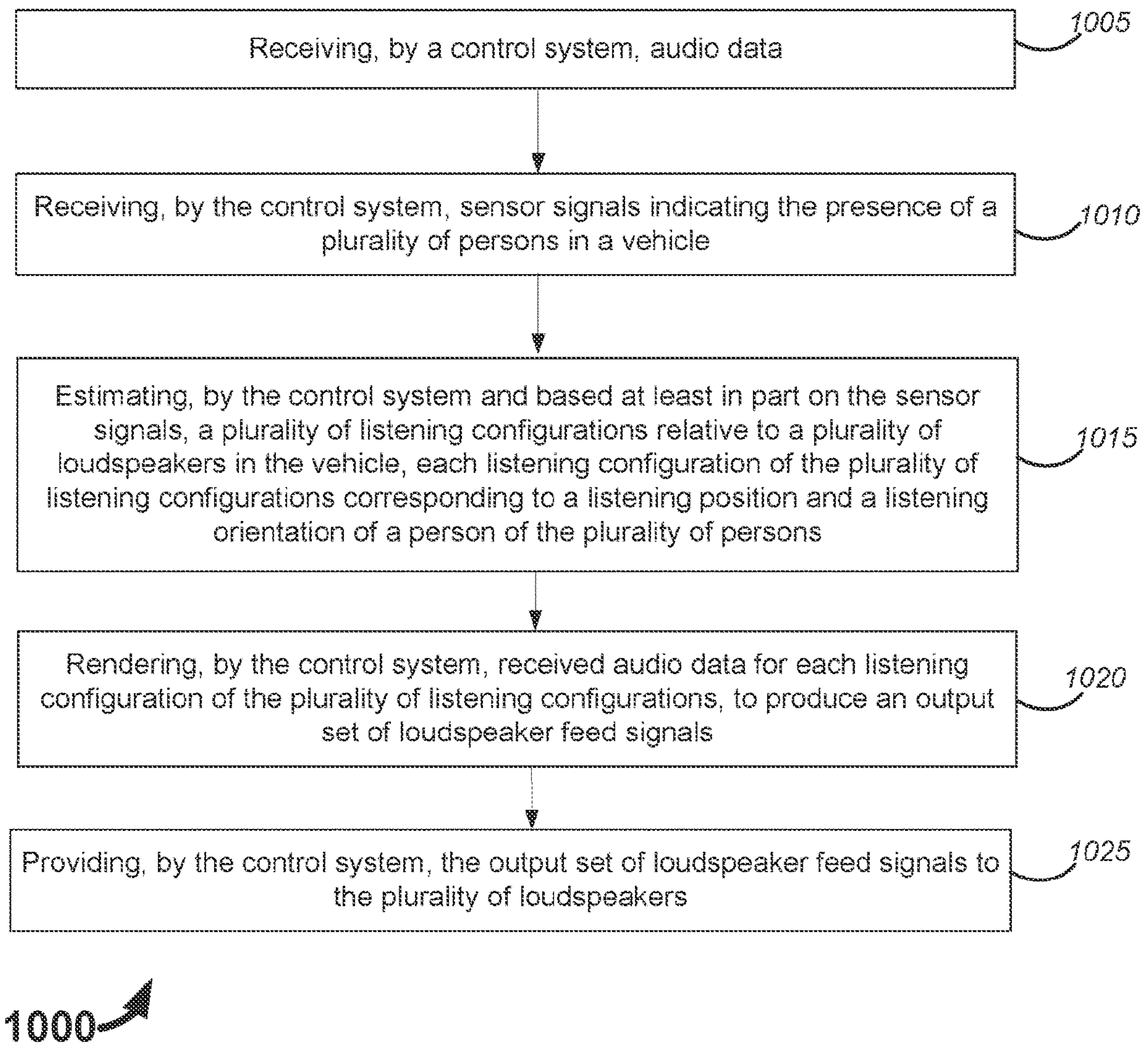
FIG. 10 is a flow diagram that outlines one example of a method that may be performed by an apparatus or system such as those disclosed herein.

FIG. 10 is a flow diagram that outlines one example of a method that may be performed by an apparatus or system such as those disclosed herein. The blocks of method 1000, like other methods described herein, are not necessarily performed in the order indicated. Moreover, such methods may include more or fewer blocks than shown and/or described. The blocks of method 1000 may be performed by one or more devices, which may be (or may include) a control system such as the control system 110 shown in FIG. 8 and described above, or one of the other disclosed control system examples.

In this implementation, block 1005 involves receiving, by a control system, audio data. In some implementations, the control system may be, or may include, a vehicle control system. In some examples, the audio data may include audio signals and associated spatial data, e.g., as described above with reference to the spatial audio stream 305 of FIGS. 3, 4, 6 and 9. Accordingly, in some examples the audio data may include spatial channel-based audio data and/or spatial object-based audio data. In some instances, the audio data may have one of the following audio formats: stereo, Dolby 3.1.2, Dolby 5.1, Dolby 5.1.2, Dolby 7.1, Dolby 7.1.2, Dolby 7.1.4, Dolby 9.1, Dolby 9.1.6 or Dolby Atmos™.

According to this example, block 1010 involves receiving, by the control system, sensor signals indicating the presence of a plurality of persons in a vehicle. The sensor signals may, in some instances, be, or include, signals from one or more seat sensors. In some such examples, the seat sensors may include one or more cameras, one or more belt sensors, one or more headrest sensors, one or more seat back sensors, one or more seat bottom sensors and/or one or more elbow rest sensors. However, in some alternative examples, sensor signals may be, or may include, signals from one or more doors of the vehicle, signals from one or more non-seat surfaces of the vehicle (e.g., one or more dashboard surfaces, interior panel surfaces, floor surfaces, ceiling surfaces, steering wheel surfaces), etc. The sensors may, for example, include one or more cameras, one or more pressure sensors, one or more touch sensors, one or more movement sensors and/or one or more microphones.

According to this implementation, block 1015 involves estimating, by the control system and based at least in part on the sensor signals, a plurality of listening configurations. In this example, each listening configuration corresponds to a listening position and a listening orientation of a person of the plurality of persons. In some instances, the listening position and the listening orientation may be relative to a vehicle coordinate system. According to some examples, the listening configuration may be relative to a position of one or more loudspeakers in the vehicle. In some such examples, the listening position may correspond to a head position. According to some such examples, the listening orientation may correspond to a head orientation. In some implementations, at least one listening configuration may be associated with an identity of a person and stored in a memory. For example, in some such implementations the head position and/or orientation may correspond with a saved, pre-set seat position and/or orientation for a particular individual. The memory may be a vehicle memory or a remote memory accessible by the control system, e.g., a memory of a server used to implement a cloud-based service.

In this example, block 1020 involves rendering, by the control system, received audio data for each listening configuration of the plurality of listening configurations, to produce an output set of loudspeaker feed signals. In this implementation, block 1025 involves providing, by the control system, the output set of loudspeaker feed signals to a plurality of loudspeakers in the vehicle. In some examples, method 1000 may involve causing the plurality of loudspeakers to reproduce the output set of loudspeaker feed signals.

In some examples, rendering of the audio data may be performed by a plurality of renderers. In some such examples, each renderer of the plurality of renderers may be configured to render the audio data for a different listening configuration, to obtain a set of renderer-specific loudspeaker feed signals. In some such examples, method 1000 may involve decomposing, by the control system and for each renderer, each set of renderer-specific loudspeaker feed signals into a renderer-specific set of frequency bands. In some instances, each of the renderer-specific sets of frequency bands may be uniquely associated with one renderer of the plurality of renderers. In some instances, each of the renderer-specific sets of frequency bands may be uniquely associated with one listening configuration of the plurality of listening configurations. In some instances, the rendering may involve rendering in the time domain (e.g., performing dual-balance amplitude panning in the time domain) or rendering in the frequency domain (e.g., cross-talk cancellation in the frequency domain).

In some such examples, method 1000 may involve combining, by the control system, the renderer-specific set of frequency bands of each renderer to produce an output set of loudspeaker feed signals. In some instances, combining the renderer-specific sets of frequency bands may involve multiplexing the renderer-specific sets of frequency bands. In some such examples, method 1000 may involve outputting, by the control system, the output set of loudspeaker feed signals.

In some examples, decomposing the set of renderer-specific loudspeaker feed signals into the renderer-specific set of frequency bands may involve analyzing, by an analysis filter bank associated with each renderer, the set of renderer-specific loudspeaker feed signals, to produce a global set of frequency bands, and selecting a subset of the global set of frequency bands to produce the renderer-specific set of frequency bands. In some such examples, the subset of the global set of frequency bands may be selected such that when combining the renderer-specific frequency bands of each of the plurality of renderers, each frequency band of the global set of frequency bands is represented only once in the output set of loudspeaker feed signals.

According to some examples, combining the plurality of renderer-specific frequency bands may involve synthesizing, by a synthesis filterbank, the output set of loudspeaker feed signals in the time domain. In some examples, the analysis filter bank and/or the synthesis filter band may be a Short-time Discrete Fourier Transform (STDFT) filter bank, a Hybrid Complex Quadrature Mirror (HCQMF) filter bank or a Quadrature Mirror (QMF) filter bank.

In some alternative examples, rendering of the audio data also may be performed by a plurality of renderers. In some such examples, each renderer of the plurality of renderers may be configured to render the audio data for a different listening configuration, to obtain a set of renderer-specific loudspeaker feed signals. In some such examples, method 1000 may involve analyzing, by an analysis filter bank implemented by the control system, received audio to produce a global set of frequency bands of the received audio data. In some such examples, method 1000 may involve selecting, by the control system and for each renderer of the plurality of renderers, a subset of the global set of frequency bands to produce a renderer-specific set of frequency bands for each renderer. In some such examples, method 1000 may involve rendering, by each renderer of the plurality of renderers, the renderer-specific set of frequency bands to obtain a set of loudspeaker feed signals for a corresponding listening configuration. According to some implementations, each renderer-specific set of frequency bands may be uniquely associated with one renderer. In some implementations, each renderer-specific set of frequency bands may be uniquely associated with one listening configuration.

In some implementations, the rendering may involve generating, by or for each renderer, a set of coefficients corresponding with a listening configuration. The coefficients may be used for the rendering. In some instances, the coefficients may be panner coefficients.

Some examples may involve selecting a rendering mode from a plurality of rendering modes. In some such examples, each rendering mode may be based on a respective listening configuration of a plurality of listening configurations. In some examples, at least one listening configuration may be associated with an identity of a person and stored in a memory. According to some such examples, the memory may be a vehicle memory. In other examples, the memory may be a remote memory accessible by the control system, e.g., a memory of a server used to implement a cloud-based service.

In some examples, method 1000 may involve combining sets of loudspeaker feed signals from each renderer to produce an output set of loudspeaker feed signals. According to some examples, combining the set of loudspeaker feed signals from each renderer may involve multiplexing the set of loudspeaker feed signals from each renderer. In some examples, method 1000 may involve outputting the output set of loudspeaker feed signals.

According to some such examples, combining the set of loudspeaker feed signals may involve synthesizing, by a synthesis filter bank, the output set of loudspeaker feed signals in the time domain. In some examples, the synthesis filter bank or the analysis filter bank may be a Short-time Discrete Fourier Transform (STDFT) filter bank, a Hybrid Complex Quadrature Mirror (HCQMF) filter bank or a Quadrature Mirror (QMF) filter bank.

The listening position and listening orientation associated with each of the plurality of listening configurations may be obtained through numerous mechanisms known in the art. In some applications, such as an automobile cabin, these locations and orientations are fixed and can be physically measured, e.g. with a tape measure or from CAD designs. Other applications, such as the home environment shown in FIGS. 2A-B, may require a more adaptable approach that can automatically detect these locations and orientations through a one-time setup procedure or even dynamically across time. In Hess, Wolfgang, *Head-Tracking Techniques for Virtual Acoustic Applications*, (AES 133rd Convention, October 2012), which is hereby incorporated by reference, numerous commercially available techniques for tracking both the position and orientation of a listener's head in the context of spatial audio reproduction systems are presented. One particular example discussed is the Microsoft Kinect. With its depth sensing and standard cameras along with a publicly available software (Windows Software Development Kit (SDK)), the positions and orientations of the heads of several listeners in a space can be simultaneously tracked using a combination of skeletal tracking and facial recognition. Although the Kinect for Windows has been discontinued, the Azure Kinect developer kit (DK), which implements the next generation of Microsoft's depth sensor, is currently available.

In U.S. Pat. No. 10,779,084, entitled "Automatic Discovery and Localization of Speaker Locations in Surround Sound Systems," which is hereby incorporated by reference, a system is described which can automatically locate the positions of loudspeakers and microphones in a listening environment by acoustically measuring the time-of-arrival (TOA) between each speaker and microphone. A listening position may be detected by placing and locating a microphone at a desired listening position (a microphone in a mobile phone held by the listener, for example), and an associated listening orientation may be defined by placing another microphone at a point in the viewing direction of the listener, e.g. at the TV. Alternatively, the listening orientation may be defined by locating a loudspeaker in the viewing direction, e.g. the loudspeakers on the TV.

In Shi, Guangi et al, *Spatial Calibration of Surround Sound Systems including Listener Position Estimation*, (AES 137$^{th}$ Convention, October 2014), which is hereby incorporated by reference, a system is described in which a single linear microphone array associated with a component of the reproduction system whose location is predictable, such as a soundbar a front center speaker, measures the time-difference-of-arrival (TDOA) for both satellite loudspeakers and a listener to locate the positions of both the loudspeakers and listener. In this case, the listening orientation is inherently defined as the line connecting the detected listening position and the component of the reproduction system that includes the linear microphone array, such as a sound bar that is co-located with a television (placed directly above or below the television). Because the sound bar's location is predictably placed directly above or below the video screen, the geometry of the measured distance and incident angle can be translated to an absolute position relative to any point in front of that reference sound bar location using simple trigonometric principles. The distance between a loudspeaker and a microphone of the linear microphone array can be estimated by playing a test signal and measuring the time of flight (TOF) between the emitting loudspeaker and the receiving microphone. The time delay of the direct component of a measured impulse response can be used for this purpose. The impulse response between the loudspeaker and a microphone array element can be obtained by playing a test signal through the loudspeaker under analysis. For example, either a maximum length sequence (MLS) or a chirp signal (also known as logarithmic sine sweep) can be used as the test signal. The room impulse response can be obtained by calculating the circular cross-correlation between the captured signal and the MLS input. FIG. 2 of this reference shows an echoic impulse response obtained using a MLS input. This impulse response is said to be similar to a measurement taken in a typical office or living room. The delay of the direct component is used to estimate the distance between the loudspeaker and the microphone array element. For loudspeaker distance estimation, any loopback latency of the audio device used to playback the test signal should be computed and removed from the measured TOF estimate.

As can be seen, there exist numerous mechanisms through which the listening positions and orientations of the plurality of listening configurations may be obtained, and all such methods (as well as relevant future methods that may be developed) are meant to be applicable to the implementations of the present disclosure. Accordingly, the specific details disclosed herein should merely be regarded as examples.

Figure 11:
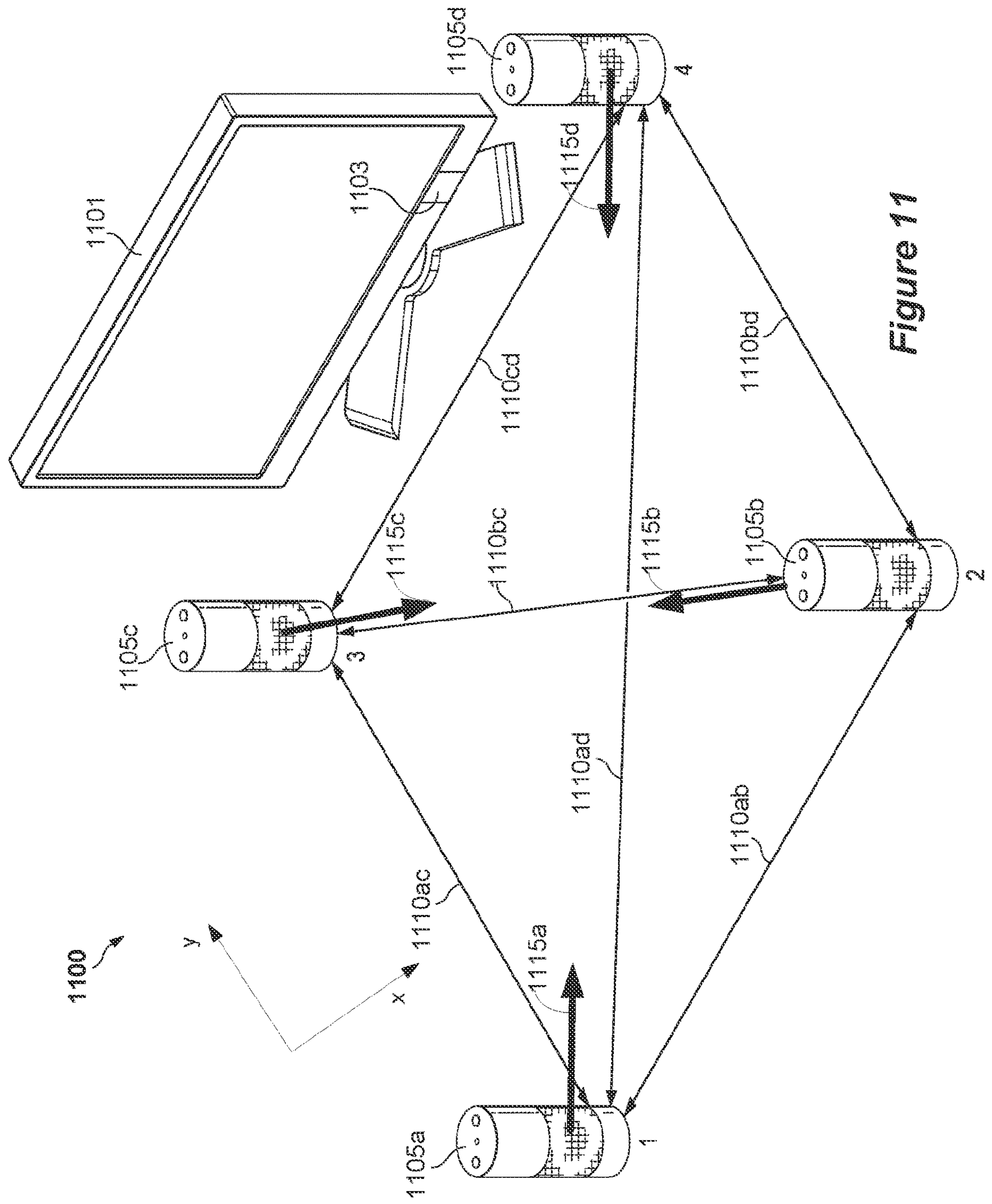
FIG. 11 shows an example of geometric relationships between four audio devices in an environment.

FIG. 11 shows an example of geometric relationships between four audio devices in an environment. In this example, the audio environment 1100 is a room that includes a television 1101 and audio devices 1105*a*, 1105*b*, 1105*c* and 1105*d*. According to this example, the audio devices 1105*a*-1105*d* are in locations 1 through 4, respectively, of the audio environment 1100. As with other examples disclosed herein, the types, numbers, locations and orientations of elements shown in FIG. 11 are merely made by way of example. Other implementations may have different types, numbers and arrangements of elements, e.g., more or fewer audio devices, audio devices in different locations, audio devices having different capabilities, etc.

In this implementation, each of the audio devices 1105*a*-1105*d* is a smart speaker that includes a microphone system and a speaker system that includes at least one speaker. In some implementations, each microphone system includes an array of at least three microphones. According to some implementations, the television 1101 may include a speaker system and/or a microphone system. In some such implementations, an automatic localization method may be used to automatically localize the television 1101, or a portion of the television 1101 (e.g., a television loudspeaker, a television transceiver, etc.), e.g., as described below with reference to the audio devices 1105*a*-1105*d*.

Some of the embodiments described in this disclosure allow for the automatic localization of a set of audio devices, such as the audio devices 1105*a*-1105*d* shown in FIG. 11, based on either the direction of arrival (DOA) between each pair of audio devices, the time of arrival (TOA) of the audio signals between each pair of devices, or both the DOA and the TOA of the audio signals between each pair of devices. In some instances, as in the example shown in FIG. 11, each of the audio devices is enabled with at least one driving unit and one microphone array, the microphone array being capable of providing the direction of arrival of an incoming sound. According to this example, the two-headed arrow 1110*ab* represents sound transmitted by the audio device 1105*a* and received by the audio device 1105*b*, as well as sound transmitted by the audio device 1105*b* and received by the audio device 1105*a*. Similarly, the two-headed arrows 1110*ac*, 1110*ad*, 1110*bc*, 1110*bd*, and 1110*cd* represent sounds transmitted and received by audio devices 1105*a* and audio device 1105*c*, sounds transmitted and received by audio devices 1105*a* and audio device 1105*d*, sounds transmitted and received by audio devices 1105*b* and audio device 1105*c*, sounds transmitted and received by audio devices 1105*b* and audio device 1105*d*, and sounds transmitted and received by audio devices 1105*c* and audio device 1105*d*, respectively.

In this example, each of the audio devices 1105*a*-1105*d* has an orientation, represented by the arrows 1115*a*-1115*d*, which may be defined in various ways. For example, the orientation of an audio device having a single loudspeaker may correspond to a direction in which the single loudspeaker is facing. In some examples, the orientation of an audio device having multiple loudspeakers facing in different directions may be indicated by a direction in which one of the loudspeakers is facing. In other examples, the orientation of an audio device having multiple loudspeakers facing in different directions may be indicated by the direction of a vector corresponding to the sum of audio output in the different directions in which each of the multiple loudspeakers is facing. In the example shown in FIG. 11, the orientations of the arrows 1115*a*-1115*d* are defined with reference to a Cartesian coordinate system. In other examples, the orientations of the arrows 1115*a*-1115*d* may be defined with reference to another type of coordinate system, such as a spherical or cylindrical coordinate system.

In this example, the television 1101 includes an electromagnetic interface 1103 that is configured to receive electromagnetic waves. In some examples, the electromagnetic interface 1103 may be configured to transmit and receive electromagnetic waves. According to some implementations, at least two of the audio devices 1105*a*-1105*d* may include an antenna system configured as a transceiver. The antenna system may be configured to transmit and receive electromagnetic waves. In some examples, the antenna system includes an antenna array having at least three antennas. Some of the embodiments described in this disclosure allow for the automatic localization of a set of devices, such as the audio devices 1105*a*-1105*d* and/or the television 1101 shown in FIG. 11, based at least in part on the DOA of electromagnetic waves transmitted between devices. Accordingly, the two-headed arrows 1110*ab*, 1110*ac*, 1110*ad*, 1110*bc*, 1110*bd*, and 1110*cd* also may represent electromagnetic waves transmitted between the audio devices 1105*a*-1105*d*.

According to some examples, the antenna system of a device (such as an audio device) may be co-located with a loudspeaker of the device, e.g., adjacent to the loudspeaker. In some such examples, an antenna system orientation may correspond with a loudspeaker orientation. Alternatively, or additionally, the antenna system of a device may have a known or predetermined orientation with respect to one or more loudspeakers of the device.

In this example, the audio devices 1105*a*-1105*d* are configured for wireless communication with one another and with other devices. In some examples, the audio devices 1105*a*-1105*d* may include network interfaces that are configured for communication between the audio devices 1105*a*-1105*d* and other devices via the Internet. In some implementations, the automatic localization processes disclosed herein may be performed by a control system of one of the audio devices 1105*a*-1105*d*. In other examples, the automatic localization processes may be performed by another device of the audio environment 1100, such as what may sometimes be referred to as a smart home hub, that is configured for wireless communication with the audio devices 1105*a*-1105*d*. In other examples, the automatic localization processes may be performed, at least in part, by a device outside of the audio environment 1100, such as a server, e.g., based on information received from one or more of the audio devices 1105*a*-1105*d* and/or a smart home hub.

Figure 12:
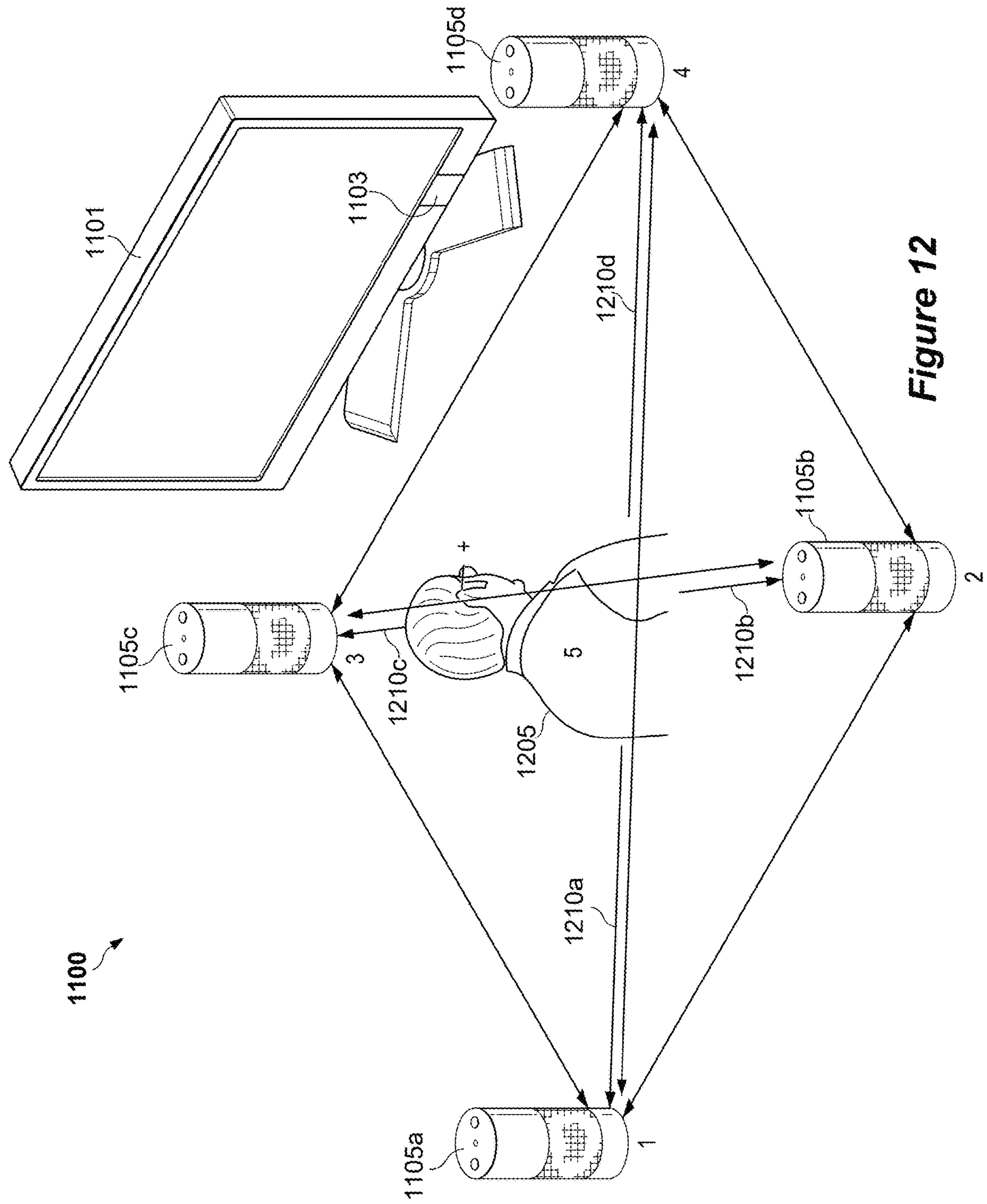
FIG. 12 shows an audio emitter located within the audio environment of FIG. 11.

FIG. 12 shows an audio emitter located within the audio environment of FIG. 11. Some implementations provide automatic localization of one or more audio emitters, such as the person 1205 of FIG. 12. In this example, the person 1205 is at location 5. Here, sound emitted by the person 1205 and received by the audio device 1105*a* is represented by the single-headed arrow 1210*a*. Similarly, sounds emitted by the person 1205 and received by the audio devices 1105*b*, 1105*c* and 1105*d* are represented by the single-headed arrows 1210*b*, 1210*c* and 1210*d*. Audio emitters can be localized based on either the DOA of the audio emitter sound as captured by the audio devices 1105*a*-1105*d* and/or the television 1101, based on the differences in TOA of the audio emitter sound as measured by the audio devices 1105*a*-1105*d* and/or the television 1101, or based on both the DOA and the differences in TOA.

Alternatively, or additionally, some implementations may provide automatic localization of one or more electromagnetic wave emitters. Some of the embodiments described in this disclosure allow for the automatic localization of one or more electromagnetic wave emitters, based at least in part on the DOA of electromagnetic waves transmitted by the one or more electromagnetic wave emitters. If an electromagnetic wave emitter were at location 5, electromagnetic waves emitted by the electromagnetic wave emitter and received by the audio devices 1105*a*, 1105*b*, 1105*c* and 1105*d* also may be represented by the single-headed arrows 1210*a*, 1210*b*, 1210*c* and 1210*c*.

Figure 13:
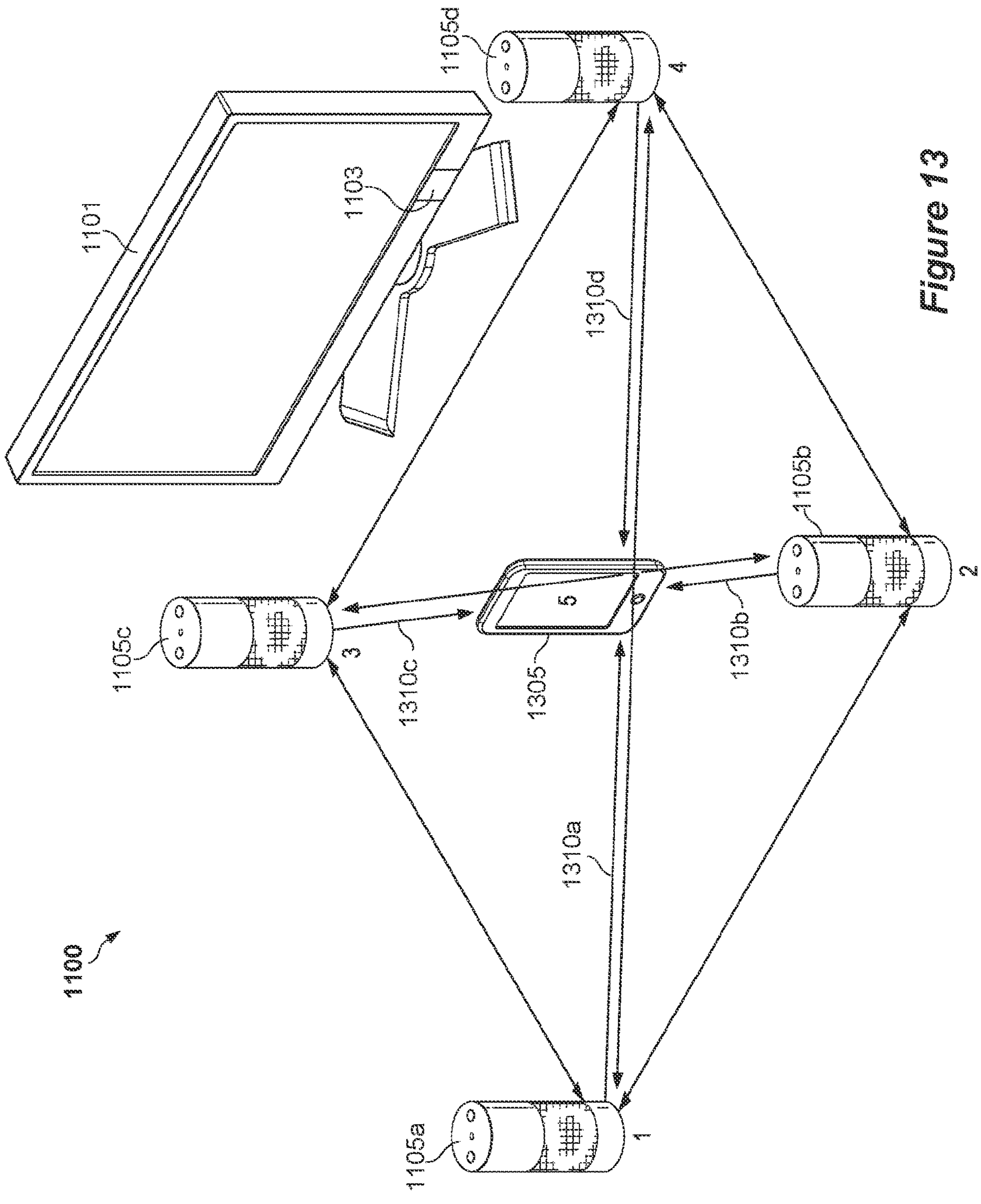
FIG. 13 shows an audio receiver located within the audio environment of FIG. 11.

FIG. 13 shows an audio receiver located within the audio environment of FIG. 11. In this example, the microphones of a smartphone 1305 are enabled, but the speakers of the smartphone 1305 are not currently emitting sound. Some embodiments provide automatic localization one or more passive audio receivers, such as the smartphone 1305 of FIG. 13 when the smartphone 1305 is not emitting sound. Here, sound emitted by the audio device 1105*a* and received by the smartphone 1305 is represented by the single-headed arrow 1310*a*. Similarly, sounds emitted by the audio devices 1105*b*, 1105*c* and 1105*d* and received by the smartphone 1305 are represented by the single-headed arrows 1310*b*, 1310*c* and 1310*d*.

If the audio receiver is equipped with a microphone array and is configured to determine the DOA of received sound, the audio receiver may be localized based, at least in part, on the DOA of sounds emitted by the audio devices 1105*a*-1105*d* and captured by the audio receiver. In some examples, the audio receiver may be localized based, at least in part, on the difference in TOA of the smart audio devices as captured by the audio receiver, regardless of whether the audio receiver is equipped with a microphone array. Yet other embodiments may allow for the automatic localization of a set of smart audio devices, one or more audio emitters, and one or more receivers, based on DOA only or DOA and TOA, by combining the methods described above.

Direction of Arrival Localization

Figure 14:
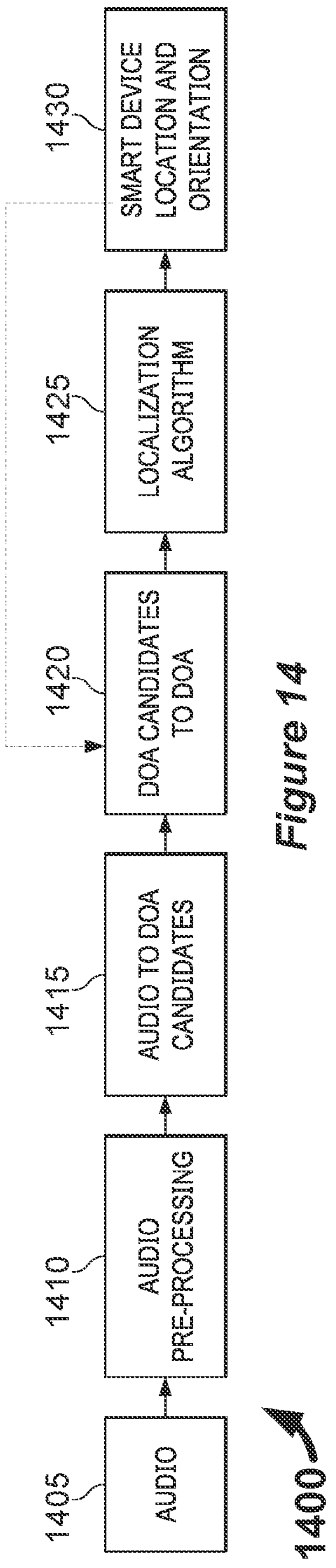
FIG. 14 is a flow diagram that outlines one example of a method that may be performed by a control system of an apparatus such as that shown in FIG. 1.

FIG. 14 is a flow diagram that outlines one example of a method that may be performed by a control system of an apparatus such as that shown in FIG. 1. The blocks of method 1400, like other methods described herein, are not necessarily performed in the order indicated. Moreover, such methods may include more or fewer blocks than shown and/or described.

Method 1400 is an example of an audio device localization process. In this example, method 1400 involves determining the location and orientation of two or more smart audio devices, each of which includes a loudspeaker system and an array of microphones. According to this example, method 1400 involves determining the location and orientation of the smart audio devices based at least in part on the audio emitted by every smart audio device and captured by every other smart audio device, according to DOA estimation. In this example, the initial blocks of method 1400 rely on the control system of each smart audio device to be able to extract the DOA from the input audio obtained by that smart audio device's microphone array, e.g., by using the time differences of arrival between individual microphone capsules of the microphone array.

In this example, block 1405 involves obtaining the audio emitted by every smart audio device of an audio environment and captured by every other smart audio device of the audio environment. In some such examples, block 1405 may involve causing each smart audio device to emit a sound, which in some instances may be a sound having a predetermined duration, frequency content, etc. This predetermined type of sound may be referred to herein as a structured source signal. In some implementations, the smart audio devices may be, or may include, the audio devices 1105*a*-1105*d* of FIG. 11.

In some such examples, block 1405 may involve a sequential process of causing a single smart audio device to emit a sound while the other smart audio devices "listen" for the sound. For example, referring to FIG. 11, block 1405 may involve: (a) causing the audio device 1105*a* to emit a sound and receiving microphone data corresponding to the emitted sound from microphone arrays of the audio devices 1105*b*-1105*d*; then (b) causing the audio device 1105*b* to emit a sound and receiving microphone data corresponding to the emitted sound from microphone arrays of the audio devices 1105*a*, 1105*c* and 1105*d*; then (c) causing the audio device 1105*c* to emit a sound and receiving microphone data corresponding to the emitted sound from microphone arrays of the audio devices 1105*a*, 1105*b* and 1105*d*; then (d) causing the audio device 1105*d* to emit a sound and receiving microphone data corresponding to the emitted sound from microphone arrays of the audio devices 1105*a*, 1105*b* and 1105*c*. The emitted sounds may or may not be the same, depending on the particular implementation.

In other examples, block 1405 may involve a simultaneous process of causing all smart audio devices to emit a sound while the other smart audio devices "listen" for the sound. For example, block 1405 may involve performing the following steps simultaneously: (1) causing the audio device 1105*a* to emit a first sound and receiving microphone data corresponding to the emitted first sound from microphone arrays of the audio devices 1105*b*-1105*d*; (2) causing the audio device 1105*b* to emit a second sound different from the first sound and receiving microphone data corresponding to the emitted second sound from microphone arrays of the audio devices 1105*a*, 1105*c* and 1105*d*; (3) causing the audio device 1105*c* to emit a third sound different from the first sound and the second sound, and receiving microphone data corresponding to the emitted third sound from microphone arrays of the audio devices 1105*a*, 1105*b* and 1105*d*; (4) causing the audio device 1105*d* to emit a fourth sound different from the first sound, the second sound and the third sound, and receiving microphone data corresponding to the emitted fourth sound from microphone arrays of the audio devices 1105*a*, 1105*b* and 1105*c*.

In some examples, block 1405 may be used to determine the mutual audibility of the audio devices in an audio environment. Some detailed examples are disclosed herein.

In this example, block 1410 involves a process of pre-processing the audio signals obtained via the microphones. Block 1410 may, for example, involve applying one or more filters, a noise or echo suppression process, etc. Some additional pre-processing examples are described below.

According to this example, block 1415 involves determining DOA candidates from the pre-processed audio signals resulting from block 1410. For example, if block 1405 involved emitting and receiving structured source signals, block 1415 may involve one or more deconvolution methods to yield impulse responses and/or "pseudo ranges," from which the time difference of arrival of dominant peaks can be used, in conjunction with the known microphone array geometry of the smart audio devices, to estimate DOA candidates.

However, not all implementations of method 1400 involve obtaining microphone signals based on the emission of predetermined sounds. Accordingly, some examples of block 1415 include "blind" methods that are applied to arbitrary audio signals, such as steered response power, receiver-side beamforming, or other similar methods, from which one or more DOAs may be extracted by peak-picking. Some examples are described below. It will be appreciated that while DOA data may be determined via blind methods or using structured source signals, in most instances TOA data may only be determined using structured source signals. Moreover, more accurate DOA information may generally be obtained using structured source signals.

According to this example, block 1420 involves selecting one DOA corresponding to the sound emitted by each of the other smart audio devices. In many instances, a microphone array may detect both direct arrivals and reflected sound that was transmitted by the same audio device. Block 1420 may involve selecting the audio signals that are most likely to correspond to directly transmitted sound. Some additional examples of determining DOA candidates and of selecting a DOA from two or more candidate DOAs are described below.

In this example, block 1425 involves receiving DOA information resulting from each smart audio device's implementation of block 1420 (in other words, receiving a set of DOAs corresponding to sound transmitted from every smart audio device to every other smart audio device in the audio environment) and performing a localization method (e.g., implementing a localization algorithm via a control system) based on the DOA information. In some disclosed implementations, block 1425 involves minimizing a cost function, possibly subject to some constraints and/or weights, e.g., as described below with reference to FIG. 15. In some such examples, the cost function receives as input data the DOA values from every smart audio device to every other smart device and returns as outputs the estimated location and the estimated orientation of each of the smart audio devices. In the example shown in FIG. 14, block 1430 represents the estimated smart audio device locations and the estimated smart audio device orientations produced in block 1425.

Figure 15:
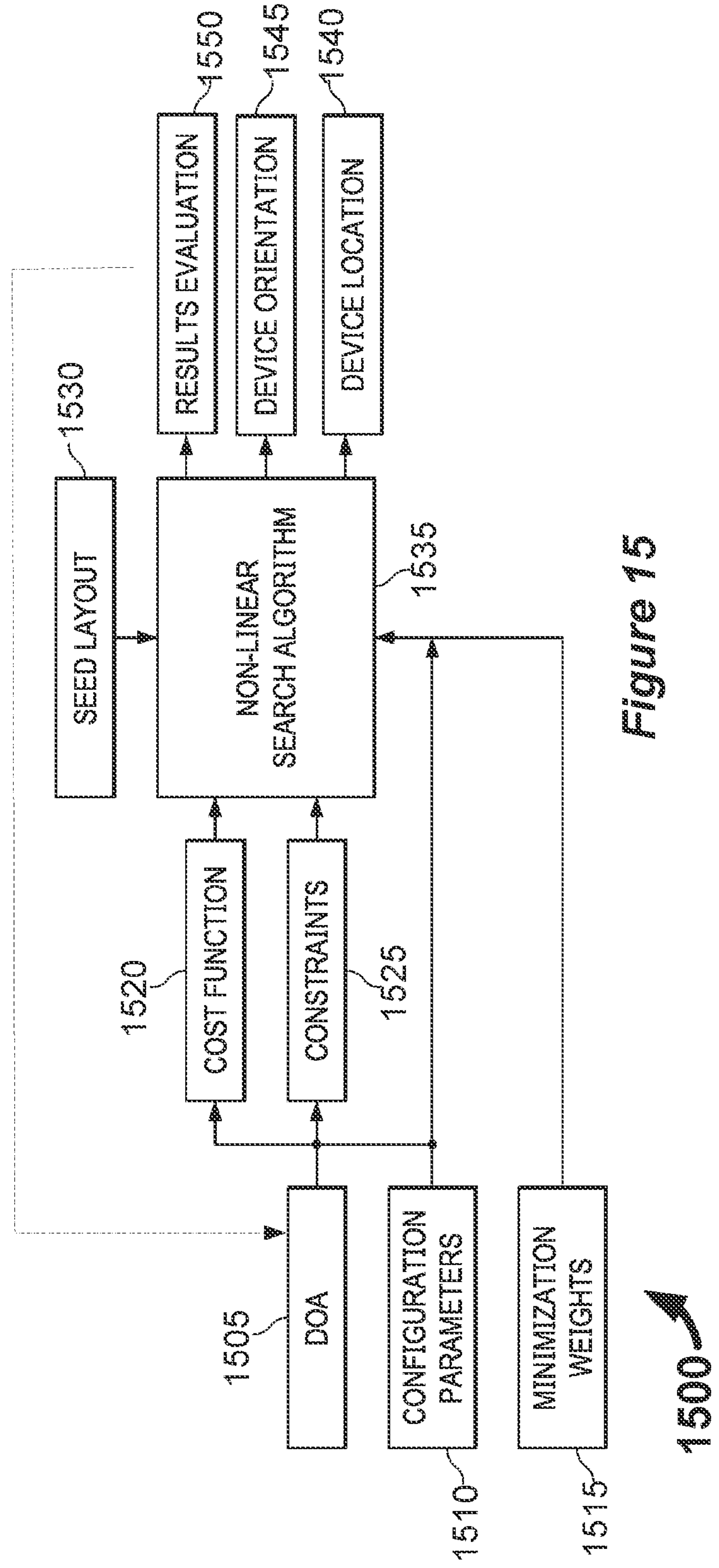
FIG. 15 is a flow diagram that outlines an example of a method for automatically estimating device locations and orientations based on DOA data.

FIG. 15 is a flow diagram that outlines another example of a method for automatically estimating device locations and orientations based on DOA data. Method 1500 may, for example, be performed by implementing a localization algorithm via a control system of an apparatus such as that shown in FIG. 1. The blocks of method 1500, like other methods described herein, are not necessarily performed in the order indicated. Moreover, such methods may include more or fewer blocks than shown and/or described.

According to this example, DOA data are obtained in block 1505. According to some implementations, block 1505 may involve obtaining acoustic DOA data, e.g., as described above with reference to blocks 1405-1420 of FIG. 14. Alternatively, or additionally, block 1505 may involve obtaining DOA data corresponding to electromagnetic waves that are transmitted by, and received by, each of a plurality of devices in an environment.

In this example, the localization algorithm receives as input the DOA data obtained in block 1505 from every smart device to every other smart device in an audio environment, along with any configuration parameters 1510 specified for the audio environment. In some examples, optional constraints 1525 may be applied to the DOA data. The configuration parameters 1510, minimization weights 1515, the optional constraints 1525 and the seed layout 1530 may, for example, be obtained from a memory by a control system that is executing software for implementing the cost function 1520 and the non-linear search algorithm 1535. The configuration parameters 1510 may, for example, include data corresponding to maximum room dimensions, loudspeaker layout constraints, external input to set a global translation (e.g., 2 parameters), a global rotation (1 parameter), and a global scale (1 parameter), etc.

According to this example, the configuration parameters 1510 are provided to the cost function 1520 and to the non-linear search algorithm 1535. In some examples, the configuration parameters 1510 are provided to optional constraints 1525. In this example, the cost function 1520 takes into account the differences between the measured DOAs and the DOAs estimated by an optimizer's localization solution.

In some embodiments, the optional constraints 1525 impose restrictions on the possible audio device location and/or orientation, such as imposing a condition that audio devices are a minimum distance from each other. Alternatively, or additionally, the optional constraints 1525 may impose restrictions on dummy minimization variables introduced by convenience, e.g., as described below.

In this example, minimization weights 1515 are also provided to the non-linear search algorithm 1535. Some examples are described below.

According to some implementations, the non-linear search algorithm 1535 is an algorithm that can find local solutions to a continuous optimization problem of the form:

$$\min_{x \in C^n} C(x)$$

such that $g_L \leq g(x) \leq g_U$ and $x_L \leq x \leq x_U$

In the foregoing expressions, $C(x)$: $R^n \rightarrow R$ represent the cost function 1520, and $g(x)$: $R^n \rightarrow R^m$ represent constraint functions corresponding to the optional constraints 1525. In these examples, the vectors $g_L$ and $g_U$ represent the lower and upper bounds on the constraints, and the vectors $x_L$ and $x_U$ represent the bounds on the variables x.

The non-linear search algorithm 1535 may vary according to the particular implementation. Examples of the non-linear search algorithm 1535 include gradient descent methods, the Broyden-Fletcher-Goldfarb-Shanno (BFGS) method, interior point optimization (IPOPT) methods, etc. While some of the non-linear search algorithms require only the values of the cost functions and the constraints, some other methods also may require the first derivatives (gradients, Jacobians) of the cost function and constraints, and some other methods also may require the second derivatives (Hessians) of the same functions. If the derivatives are required, they can be provided explicitly, or they can be computed automatically using automatic or numerical differentiation techniques.

Some non-linear search algorithms need seed point information to start the minimization, as suggested by the seed layout 1530 that is provided to the non-linear search algorithm 1535 in FIG. 15. In some examples, the seed point information may be provided as a layout consisting of the same number of smart audio devices (in other words, the same number as the actual number of smart audio devices for which DOA data are obtained) with corresponding locations and orientations. The locations and orientations may be arbitrary, and need not be the actual or approximate locations and orientations of the smart audio devices. In some examples, the seed point information may indicate smart audio device locations that are along an axis or another arbitrary line of the audio environment, smart audio device locations that are along a circle, a rectangle or other geometric shape within the audio environment, etc. In some examples, the seed point information may indicate arbitrary smart audio device orientations, which may be predetermined smart audio device orientations or random smart audio device orientations.

In some embodiments, the cost function 1520 can be formulated in terms of complex plane variables as follows:

$$C_{DOA}(x, z) = \sum_{n=1}^{N}\sum_{\substack{m=1\\ m\neq n}}^{N} w_{nm}^{DOA}\left|Z_{nm} - z_n^*\left(\frac{x_m - x_n}{|x_m - x_n|}\right)\right|^2,$$

wherein the star indicates complex conjugation, the bar indicates absolute value, and where:

$Z_{nm}=\exp(i\ DOA_{nm})$ represents the complex plane value giving the direction of arrival of smart device m as measured from device n, with i representing the imaginary unit;

$x_n=x_{nx}+ix_{ny}$ represents the complex plane value encoding the x and y positions of the smart device n;

$z_n=\exp(i\alpha_n)$ represents the complex value encoding the angle $\alpha_n$ of orientation of the smart device n;

$w_{nm}^{DOA}$ represents the weight given to the $DOA_{nm}$ measurement;

N represents the number of smart audio devices for which DOA data are obtained; and $x=(x_1, \ldots, x_N)$ and $z=(z_1, \ldots, z_N)$ represent vectors of the complex positions and complex orientations, respectively, of all Nsmart audio devices.

According to this example, the outcomes of the minimization are device location data 1540 indicating the 2D position of the smart devices, $x_k$ (representing 2 real unknowns per device) and device orientation data 1545 indicating the orientation vector of the smart devices $z_k$ (representing 2 additional real variables per device). From the orientation vector, only the angle of orientation of the smart device $\alpha_k$ is relevant for the problem (1 real unknown per device). Therefore, in this example there are 3 relevant unknowns per smart device.

In some examples, results evaluation block 1550 involves computing the residual of the cost function at the outcome position and orientations. A relatively lower residual indicates relatively more precise device localization values. According to some implementations, the results evaluation block 1550 may involve a feedback process. For example, some such examples may implement a feedback process that involves comparing the residual of a given DOA candidate combination with another DOA candidate combination, e.g., as explained in the DOA robustness measures discussion below.

As noted above, in some implementations block 1505 may involve obtaining acoustic DOA data as described above with reference to blocks 1405-1420 of FIG. 14, which involve determining DOA candidates and selecting DOA candidates. Accordingly, FIG. 15 includes a dashed line from the results evaluation block 1550 to block 1505, to represent one flow of an optional feedback process. Moreover, FIG. 14 includes a dashed line from block 1430 (which may involve results evaluation in some examples) to DOA candidate selection block 1420, to represent a flow of another optional feedback process.

In some embodiments, the non-linear search algorithm 1535 may not accept complex-valued variables. In such cases, every complex-valued variable can be replaced by a pair of real variables.

In some implementations, there may be additional prior information regarding the availability or reliability of each DOA measurement. In some such examples, loudspeakers may be localized using only a subset of all the possible DOA elements. The missing DOA elements may, for example, be masked with a corresponding zero weight in the cost function. In some such examples, the weights $w_{nm}$ may be either be zero or one, e.g., zero for those measurements which are either missing or considered not sufficiently reliable and one for the reliable measurements. In some other embodiments, the weights $w_{nm}$ may have a continuous value from zero to one, as a function of the reliability of the DOA measurement. In those embodiments in which no prior information is available, the weights $w_{nm}$ may simply be set to one.

In some implementations, the conditions $|z_k|=1$ (one condition for every smart audio device) may be added as constraints to ensure the normalization of the vector indicating the orientation of the smart audio device. In other examples, these additional constraints may not be needed, and the vector indicating the orientation of the smart audio device may be left unnormalized. Other implementations may add as constraints conditions on the proximity of the smart audio devices, e.g., indicating that $|x_n-x_m|\geq D$, where D is the minimum distance between smart audio devices.

The minimization of the cost function above does not fully determine the absolute position and orientation of the smart audio devices. According to this example, the cost function remains invariant under a global rotation (1 independent parameter), a global translation (2 independent parameters), and a global rescaling (1 independent parameter), affecting simultaneously all the smart devices locations and orientations. This global rotation, translation, and rescaling cannot be determined from the minimization of the cost function. Different layouts related by the symmetry transformations are totally indistinguishable in this framework and are said to belong to the same equivalence class. Therefore, the configuration parameters should provide criteria to allow uniquely defining a smart audio device layout representing an entire equivalence class. In some embodiments, it may be advantageous to select criteria so that this smart audio device layout defines a reference frame that is close to the reference frame of a listener near a reference listening position. Examples of such criteria are provided below. In some other examples, the criteria may be purely mathematical and disconnected from a realistic reference frame.

The symmetry disambiguation criteria may include a reference position, fixing the global translation symmetry (e.g., smart audio device 1 should be at the origin of coordinates); a reference orientation, fixing the two-dimensional rotation symmetry (e.g., smart device 1 should be oriented toward an area of the audio environment designated as the front, such as where the television 1101 is located in FIGS. 11-13); and a reference distance, fixing the global scaling symmetry (e.g., smart device 2 should be at a unit distance from smart device 1). In total, there are 4 parameters that cannot be determined from the minimization problem in this example and that should be provided as an external input. Therefore, in this example there are 3N−4 unknowns that can be determined from the minimization problem.

As described above, in some examples, in addition to the set of smart audio devices, there may be one or more passive audio receivers, equipped with a microphone array, and/or one or more audio emitters. In such cases the localization process may use a technique to determine the smart audio device location and orientation, emitter location, and passive receiver location and orientation, from the audio emitted by every smart audio device and every emitter and captured by every other smart audio device and every passive receiver, based on DOA estimation.

In some such examples, the localization process may proceed in a similar manner as described above. In some instances, the localization process may be based on the same cost function described above, which is shown below for the reader's convenience:

$$C_{DOA}(x, z) = \sum_{n=1}^{N}\sum_{\substack{m=1 \\ m\neq n}}^{N} w_{nm}^{DOA}\left|Z_{nm} - z_n^*\left(\frac{x_m - x_n}{|x_m - x_n|}\right)\right|^2$$

However, if the localization process involves passive audio receivers and/or audio emitters that are not audio receivers, the variables of the foregoing equation need to be interpreted in a slightly different way. Now N represents the total number of devices, including $N_{smart}$ smart audio devices, $N_{rec}$ passive audio receivers and N emit emitters, so that $N=N_{smart}+N_{rec}+N_{emit}$. In some examples, the weights $w_{nm}^{DOA}$ may have a sparse structure to mask out missing data due to passive receivers or emitter-only devices (or other audio sources without receivers, such as human beings), so that $w_{nm}^{DOA}=0$ for all m if device n is an audio emitter without a receiver, and $w_{nm}^{DOA}=0$ for all n if device m is an audio receiver. For both smart audio devices and passive receivers both the position and angle can be determined, whereas for audio emitters only the position can be obtained. The total number of unknowns is $3N_{smart}+3N_{rec}+2N_{emit}-4$.

Combined Time of Arrival and Direction of Arrival Localization

In the following discussion, the differences between the above-described DOA-based localization processes and the combined DOA and TOA localization of this section will be emphasized. Those details that are not explicitly given may be assumed to be the same as those in the above-described DOA-based localization processes.

Figure 16:
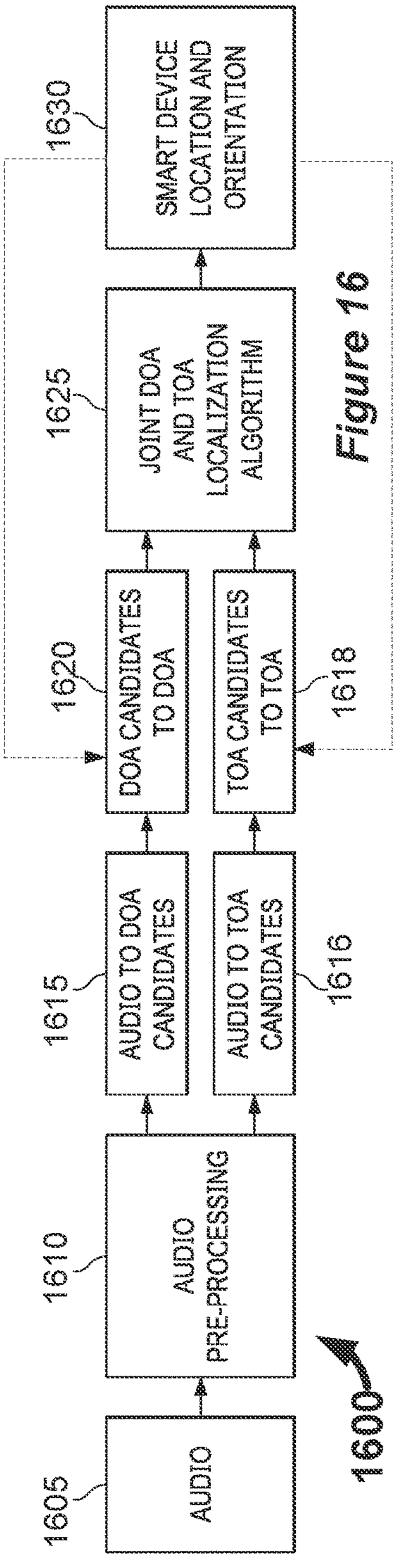
FIG. 16 is a flow diagram that outlines one example of a method for automatically estimating device locations and orientations based on DOA data and TOA data.

FIG. 16 is a flow diagram that outlines one example of a method for automatically estimating device locations and orientations based on DOA data and TOA data. Method 1600 may, for example, be performed by implementing a localization algorithm via a control system of an apparatus such as that shown in FIG. 1. The blocks of method 1600, like other methods described herein, are not necessarily performed in the order indicated. Moreover, such methods may include more or fewer blocks than shown and/or described.

According to this example, DOA data are obtained in blocks 1605-1620. According to some implementations, blocks 1605-1620 may involve obtaining acoustic DOA data from a plurality of smart audio devices, e.g., as described above with reference to blocks 1405-1420 of FIG. 14. In some alternative implementations, blocks 1605-1620 may involve obtaining DOA data corresponding to electromagnetic waves that are transmitted by, and received by, each of a plurality of devices in an environment.

In this example, however, block 1605 also involves obtaining TOA data. According to this example, the TOA data includes the measured TOA of audio emitted by, and received by, every smart audio device in the audio environment (e.g., every pair of smart audio devices in the audio environment). In some embodiments that involve emitting structured source signals, the audio used to extract the TOA data may be the same as was used to extract the DOA data. In other embodiments, the audio used to extract the TOA data may be different from that used to extract the DOA data.

According to this example, block 1616 involves detecting TOA candidates in the audio data and block 1618 involves selecting a single TOA for each smart audio device pair from among the TOA candidates. Some examples are described below.

Various techniques may be used to obtain the TOA data. One method is to use a room calibration audio sequence, such as a sweep (e.g., a logarithmic sine tone) or a Maximum Length Sequence (MLS). Optionally, either aforementioned sequence may be used with band-limiting to the close ultrasonic audio frequency range (e.g., 18 kHz to 24 kHz). In this audio frequency range most standard audio equipment is able to emit and record sound, but such a signal cannot be perceived by humans because it lies beyond the normal human hearing capabilities. Some alternative implementations may involve recovering TOA elements from a hidden signal in a primary audio signal, such as a Direct Sequence Spread Spectrum signal.

Given a set of DOA data from every smart audio device to every other smart audio device, and the set of TOA data from every pair of smart audio devices, the localization method 1625 of FIG. 16 may be based on minimizing a certain cost function, possibly subject to some constraints. In this example, the localization method 1625 of FIG. 16 receives as input data the above-described DOA and TOA values, and outputs the estimated location data and orientation data 1630 corresponding to the smart audio devices. In some examples, the localization method 1625 also may output the playback and recording latencies of the smart audio devices, e.g., up to some global symmetries that cannot be determined from the minimization problem. Some examples are described below.

Figure 17:
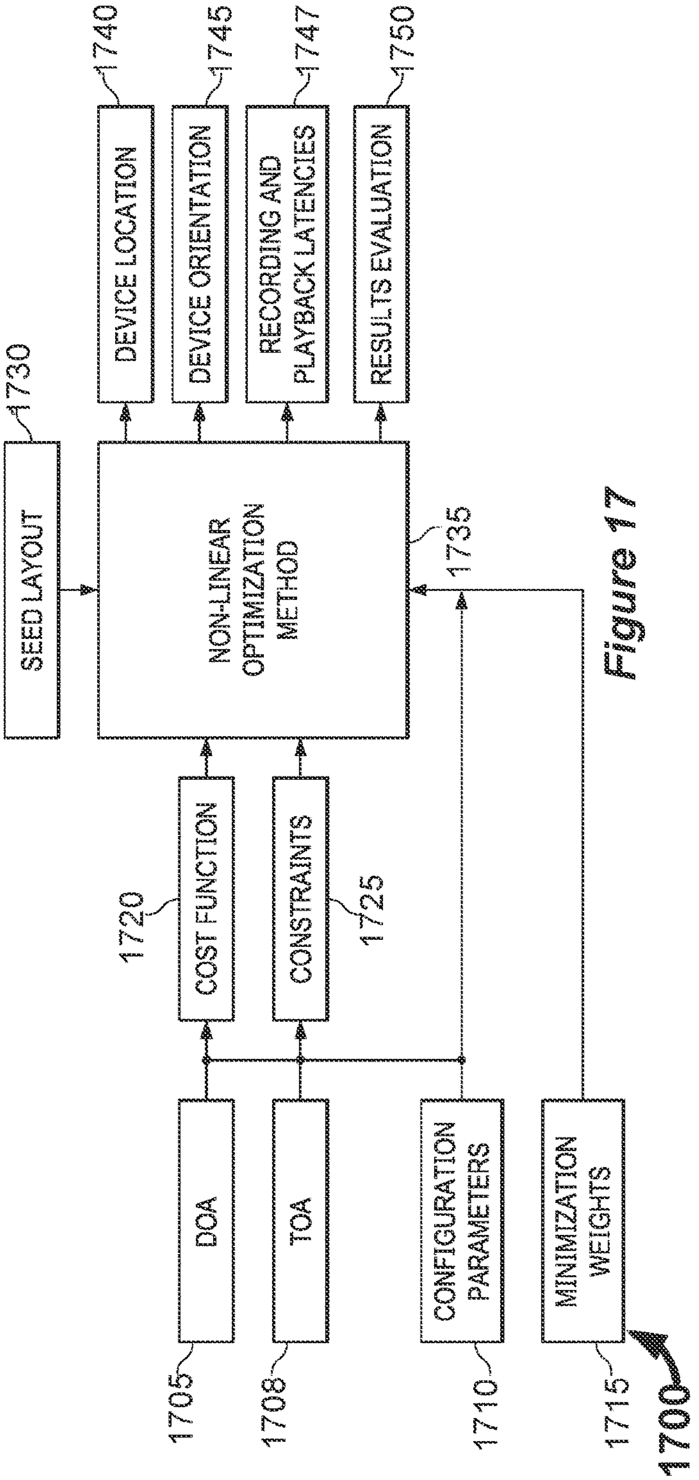
FIG. 17 is a flow diagram that outlines another example of a method for automatically estimating device locations and orientations based on DOA data and TOA data.

FIG. 17 is a flow diagram that outlines another example of a method for automatically estimating device locations and orientations based on DOA data and TOA data. Method 1700 may, for example, be performed by implementing a localization algorithm via a control system of an apparatus such as that shown in FIG. 1. The blocks of method 1700, like other methods described herein, are not necessarily performed in the order indicated. Moreover, such methods may include more or fewer blocks than shown and/or described.

Except as described below, in some examples blocks 1705, 1710, 1715, 1720, 1725, 1730, 1735, 1740, 1745 and 1750 may be as described above with reference to blocks 1505, 1510, 1515, 1520, 1525, 1530, 1535, 1540, 1545 and 1550 of FIG. 15. However, in this example the cost function 1720 and the non-linear optimization method 1735 are modified, with respect to the cost function 1520 and the non-linear optimization method 1535 of FIG. 15, so as to operate on both DOA data and TOA data. The TOA data of block 1708 may, in some examples, be obtained as described above with reference to FIG. 16. Another difference, as compared to the process of FIG. 15, is that in this example the non-linear optimization method 1735 also outputs recording and playback latency data 1747 corresponding to the smart audio devices, e.g., as described below. Accordingly, in some implementations, the results evaluation block 1750 may involve evaluating both DOA data and/or TOA data. In some such examples, the operations of block 1750 may include a feedback process involving the DOA data and/or TOA data. For example, some such examples may implement a feedback process that involves comparing the residual of a given TOA/DOA candidate combination with another TOA/DOA candidate combination, e.g., as explained in the TOA/DOA robustness measures discussion below.

In some examples, results evaluation block 1750 involves computing the residual of the cost function at the outcome position and orientations. A relatively lower residual normally indicates relatively more precise device localization values. According to some implementations, the results evaluation block 1750 may involve a feedback process. For example, some such examples may implement a feedback process that involves comparing the residual of a given TOA/DOA candidate combination with another TOA/DOA candidate combination, e.g., as explained in the TOA and DOA robustness measures discussion below.

Accordingly, FIG. 16 includes dashed lines from block 630 (which may involve results evaluation in some examples) to DOA candidate selection block 1620 and TOA candidate selection block 1618, to represent a flow of an optional feedback process. In some implementations block 1705 may involve obtaining acoustic DOA data as described above with reference to blocks 1605-1620 of FIG. 16, which involve determining DOA candidates and selecting DOA candidates. In some examples block 1708 may involve obtaining acoustic TOA data as described above with reference to blocks 1605-1618 of FIG. 16, which involve determining TOA candidates and selecting TOA candidates. Although not shown in FIG. 17, some optional feedback processes may involve reverting from the results evaluation block 1750 to block 1705 and/or block 1708.

According to this example, the localization algorithm proceeds by minimizing a cost function, possibly subject to some constraints, and can be described as follows. In this example, the localization algorithm receives as input the DOA data 1705 and the TOA data 1708, along with configuration parameters 1710 specified for the listening environment and possibly some optional constraints 1725. In this example, the cost function takes into account the differences between the measured DOA and the estimated DOA, and the differences between the measured TOA and the estimated TOA. In some embodiments, the constraints 1725 impose restrictions on the possible device location, orientation, and/or latencies, such as imposing a condition that audio devices are a minimum distance from each other and/or imposing a condition that some device latencies should be zero.

In some implementations, the cost function can be formulated as follows:

$$C(x,z,\ell,k)=W_{DOA}C_{DOA}(x,z)+W_{TOA}C_{TOA}(x,\ell,k)$$

In the foregoing equation, $\ell=(\ell_1, \ldots, \ell_N)$ and $k=(k_1, \ldots, k_N)$ are represent vectors of playback and recording devices for every device, respectively, and where $W_{DOA}$ and $W_{TOA}$ represent the global weights (also known as prefactors) of the DOA and TOA minimization parts, respectively, reflecting the relative importance of each one of the two terms. In some such examples, the TOA cost function can be formulated as:

$$C_{TOA}(x, \ell, k) = \sum_{n=1}^{N}\sum_{m=1}^{N} w_{nm}^{TOA}(cTOA_{nm} - c\ell_m + ck_n - |x_m - x_n|)^2,$$

where $TOA_{nm}$ represents the measured time of arrival of signal travelling from smart device m to smart device n;

$w_{nm}^{TOA}$ represents the weight given to the $TOA_{nm}$ measurement; and c represents the speed of sound.

There are up to 5 real unknowns per every smart audio device: the device positions $x_n$ (2 real unknowns per device), the device orientations $\alpha_n$ (1 real unknown per device) and the recording and playback latencies $\ell_n$ and $k_n$ (2 additional unknowns per device). From these, only device positions and latencies are relevant for the TOA part of the cost function. The number of effective unknowns can be reduced in some implementations if there are a priori known restrictions or links between the latencies.

In some examples, there may be additional prior information, e.g., regarding the availability or reliability of each TOA measurement. In some of these examples, the weights $w_{nm}^{TOA}$ can either be zero or one, e.g., zero for those measurements which are not available (or considered not sufficiently reliable) and one for the reliable measurements. This way, device localization may be estimated with only a subset of all possible DOA and/or TOA elements. In some other implementations, the weights may have a continuous value from zero to one, e.g., as a function of the reliability of the TOA measurement. In some examples, in which no prior reliability information is available, the weights may simply be set to one.

According to some implementations, one or more additional constraints may be placed on the possible values of the latencies and/or the relation of the different latencies among themselves.

In some examples, the position of the audio devices may be measured in standard units of length, such as meters, and the latencies and times of arrival may be indicated in standard units of time, such as seconds. However, it is often the case that non-linear optimization methods work better when the scale of variation of the different variables used in the minimization process is of the same order. Therefore, some implementations may involve rescaling the position measurements so that the range of variation of the smart device positions ranges between −1 and 1, and rescaling the latencies and times of arrival so that these values range between −1 and 1 as well.

The minimization of the cost function above does not fully determine the absolute position and orientation of the smart audio devices or the latencies. The TOA information gives an absolute distance scale, meaning that the cost function is no longer invariant under a scale transformation, but still remains invariant under a global rotation and a global translation. Additionally, the latencies are subject to an additional global symmetry: the cost function remains invariant if the same global quantity is added simultaneously to all the playback and recording latencies. These global transformations cannot be determined from the minimization of the cost function. Similarly, the configuration parameters should provide a criterion to allowing to uniquely define a device layout representing an entire equivalence class.

In some examples, the symmetry disambiguation criteria may include the following: a reference position, fixing the global translation symmetry (e.g., smart device 1 should be at the origin of coordinates); a reference orientation, fixing the two-dimensional rotation symmetry (e.g., smart device 1 should be oriented toward the front); and a reference latency (e.g., recording latency for device 1 should be zero). In total, in this example there are 4 parameters that cannot be determined from the minimization problem and that should be provided as an external input. Therefore, there are 5N−4 unknowns that can be determined from the minimization problem.

In some implementations, besides the set of smart audio devices, there may be one or more passive audio receivers, which may not be equipped with a functioning microphone array, and/or one or more audio emitters. The inclusion of latencies as minimization variables allows some disclosed methods to localize receivers and emitters for which emission and reception times are not precisely known. In some such implementations, the TOA cost function described above may be implemented. This cost function is shown again below for the reader's convenience:

$$C_{TOA}(x, \ell, k) = \sum_{n=1}^{N} \sum_{m=1}^{N} w_{nm}^{TOA} (cTOA_{nm} - c\ell_m + ck_n - |x_m - x_n|)^2$$

As described above with reference to the DOA cost function, the cost function variables need to be interpreted in a slightly different way if the cost function is used for localization estimates involving passive receivers and/or emitters. Now N represents the total number of devices, including $N_{smart}$ smart audio devices, $N_{rec}$ passive audio receivers and $N_{emit}$ emitters, so that $N=N_{smart}+N_{rec}+N_{emit}$. The weights $w_{nm}^{DOA}$ may have a sparse structure to mask out missing data due to passive receivers or emitters-only, e.g., so that $w_{nm}^{DOA}=0$ for all m if device n is an audio emitter, and $w_{nm}^{DOA}=0$ for all n if device m is an audio receiver. According to some implementations, for smart audio devices positions, orientations, and recording and playback latencies must be determined; for passive receivers, positions, orientations, and recording latencies must be determined; and for audio emitters, positions and playback latencies must be determined. According to some such examples, the total number of unknowns is therefore $5N_{smart}+4N_{rec}+3N_{emit}-4$.

Disambiguation of Global Translation and Rotation

Solutions to both DOA-only and combined TOA and DOA problems are subject to a global translation and rotation ambiguity. In some examples, the translation ambiguity can be resolved by treating an emitter-only source as a listener and translating all devices such that the listener lies at the origin.

Rotation ambiguities can be resolved by placing additional constraints on the solution. For example, some multi-loudspeaker environments may include television (TV) loudspeakers and a couch positioned for TV viewing. After locating the loudspeakers in the environment, some methods may involve finding a vector joining the listener to the TV viewing direction. Some such methods may then involve having the TV emit a sound from its loudspeakers and/or prompting the user to walk up to the TV and locating the user's speech. Some implementations may involve rendering an audio object that pans around the environment. A user may provide user input (e.g., saying "Stop") indicating when the audio object is in one or more predetermined positions within the environment, such as the front of the environment, at a TV location of the environment, etc. Some implementations involve a cellphone app equipped with an inertial measurement unit that prompts the user to point the cellphone in two defined directions: the first in the direction of a particular device, for example the device with lit LEDs, the second in the user's desired viewing direction, such as the front of the environment, at a TV location of the environment, etc. Some detailed disambiguation examples will now be described with reference to FIGS. 18A-18D.

Figure 18A:
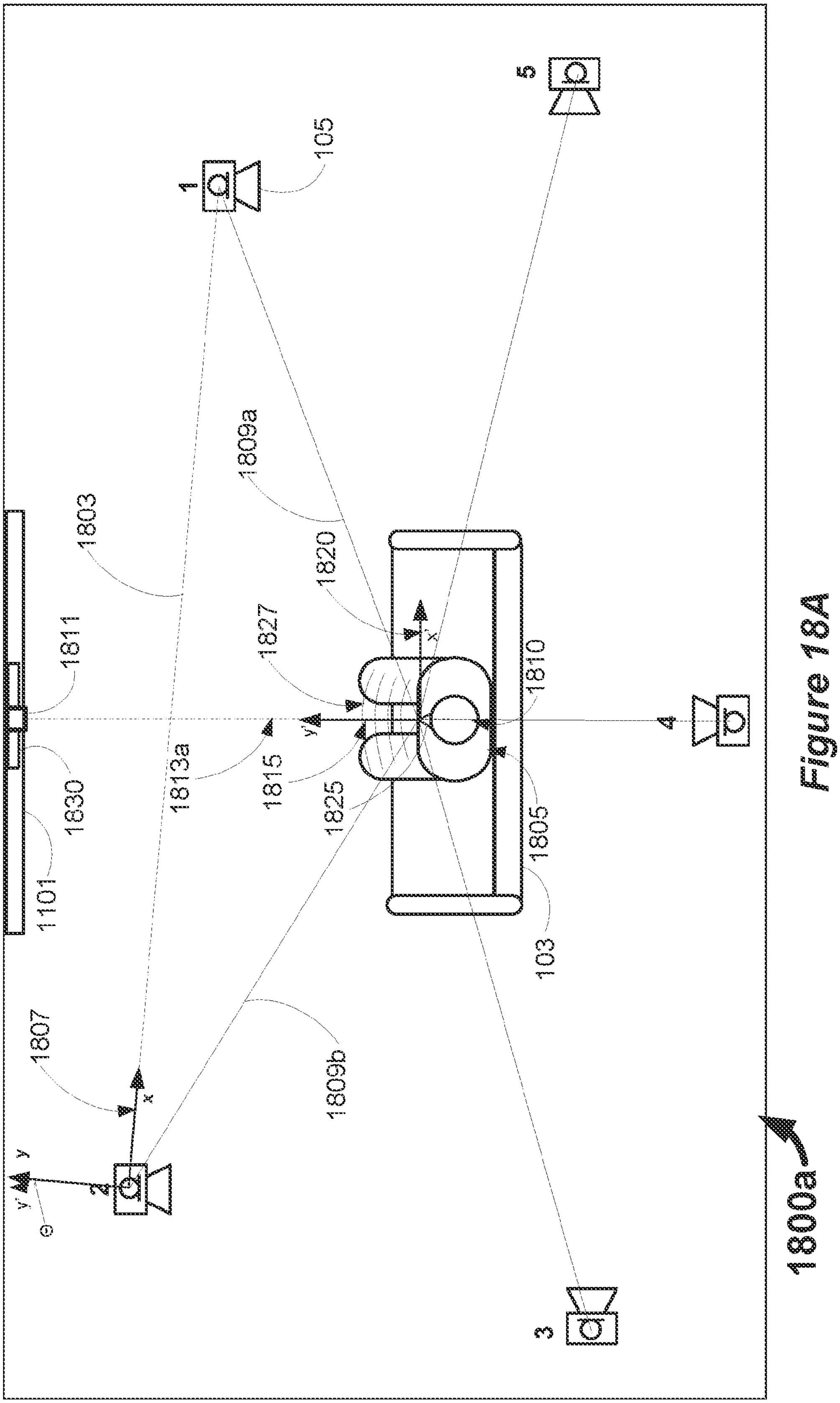
FIG. 18A shows an example of an audio environment.

FIG. 18A shows an example of an audio environment. According to some examples, the audio device location data output by one of the disclosed localization methods may include an estimate of an audio device location for each of audio devices 1-5, with reference to the audio device coordinate system 1807. In this implementation, the audio device coordinate system 1807 is a Cartesian coordinate system having the location of the microphone of audio device 2 as its origin. Here, the x axis of the audio device coordinate system 1807 corresponds with a line 1803 between the location of the microphone of audio device 2 and the location of the microphone of audio device 1.

In this example, this example, the listener location is determined by prompting the listener 1805 who is shown seated on the couch 1103 (e.g., via an audio prompt from one or more loudspeakers in the environment 1800*a*) to make one or more utterances 1827 and estimating the listener location according to time-of-arrival (TOA) data. The TOA data corresponds to microphone data obtained by a plurality of microphones in the environment. In this example, the microphone data corresponds with detections of the one or more utterances 1827 by the microphones of at least some (e.g., 3, 4 or all 5) of the audio devices 1-5.

Alternatively, or additionally, the listener location may be estimated according to DOA data provided by the microphones of at least some (e.g., 2, 3, 4 or all 5) of the audio devices 1-5. According to some such examples, the listener location may be determined according to the intersection of lines 1809*a*, 1809*b*, etc., corresponding to the DOA data.

According to this example, the listener location corresponds with the origin of the listener coordinate system 1820. In this example, the listener angular orientation data is indicated by the y' axis of the listener coordinate system 1820, which corresponds with a line 1813*a* between the listener's head 1810 (and/or the listener's nose 1825) and the sound bar 1830 of the television 1101. In the example shown in FIG. 18A, the line 1813*a* is parallel to the y' axis. Therefore, the angle Θ represents the angle between the y axis and the y' axis. Accordingly, although the origin of the audio device coordinate system 1807 is shown to correspond with audio device 2 in FIG. 18A, some implementations involve co-locating the origin of the audio device coordinate system 1807 with the origin of the listener coordinate system 1820 prior to the rotation by the angle Θ of audio device coordinates around the origin of the listener coordinate system 1820. This co-location may be performed by a coordinate transformation from the audio device coordinate system 1807 to the listener coordinate system 1820.

The location of the sound bar 1830 and/or the television 1101 may, in some examples, be determined by causing the sound bar to emit a sound and estimating the sound bar's location according to DOA and/or TOA data, which may correspond detections of the sound by the microphones of at least some (e.g., 3, 4 or all 5) of the audio devices 1-5. Alternatively, or additionally, the location of the sound bar 1830 and/or the television 1101 may be determined by prompting the user to walk up to the TV and locating the user's speech by DOA and/or TOA data, which may correspond detections of the sound by the microphones of at least some (e.g., 3, 4 or all 5) of the audio devices 1-5. Some such methods may involve applying a cost function, e.g., as described above. Some such methods may involve triangulation. Such examples may be beneficial in situations wherein the sound bar 1830 and/or the television 1101 has no associated microphone.

In some other examples wherein the sound bar 1830 and/or the television 1101 does have an associated microphone, the location of the sound bar 1830 and/or the television 1101 may be determined according to TOA and/or DOA methods, such as the methods disclosed herein. According to some such methods, the microphone may be co-located with the sound bar 1830.

According to some implementations, the sound bar 1830 and/or the television 1101 may have an associated camera 1811. A control system may be configured to capture an image of the listener's head 1810 (and/or the listener's nose 1825). In some such examples, the control system may be configured to determine a line 1813*a* between the listener's head 1810 (and/or the listener's nose 1825) and the camera 1811. The listener angular orientation data may correspond with the line 1813*a*. Alternatively, or additionally, the control system may be configured to determine an angle Θ between the line 1813*a* and the y axis of the audio device coordinate system.

Figure 18B:
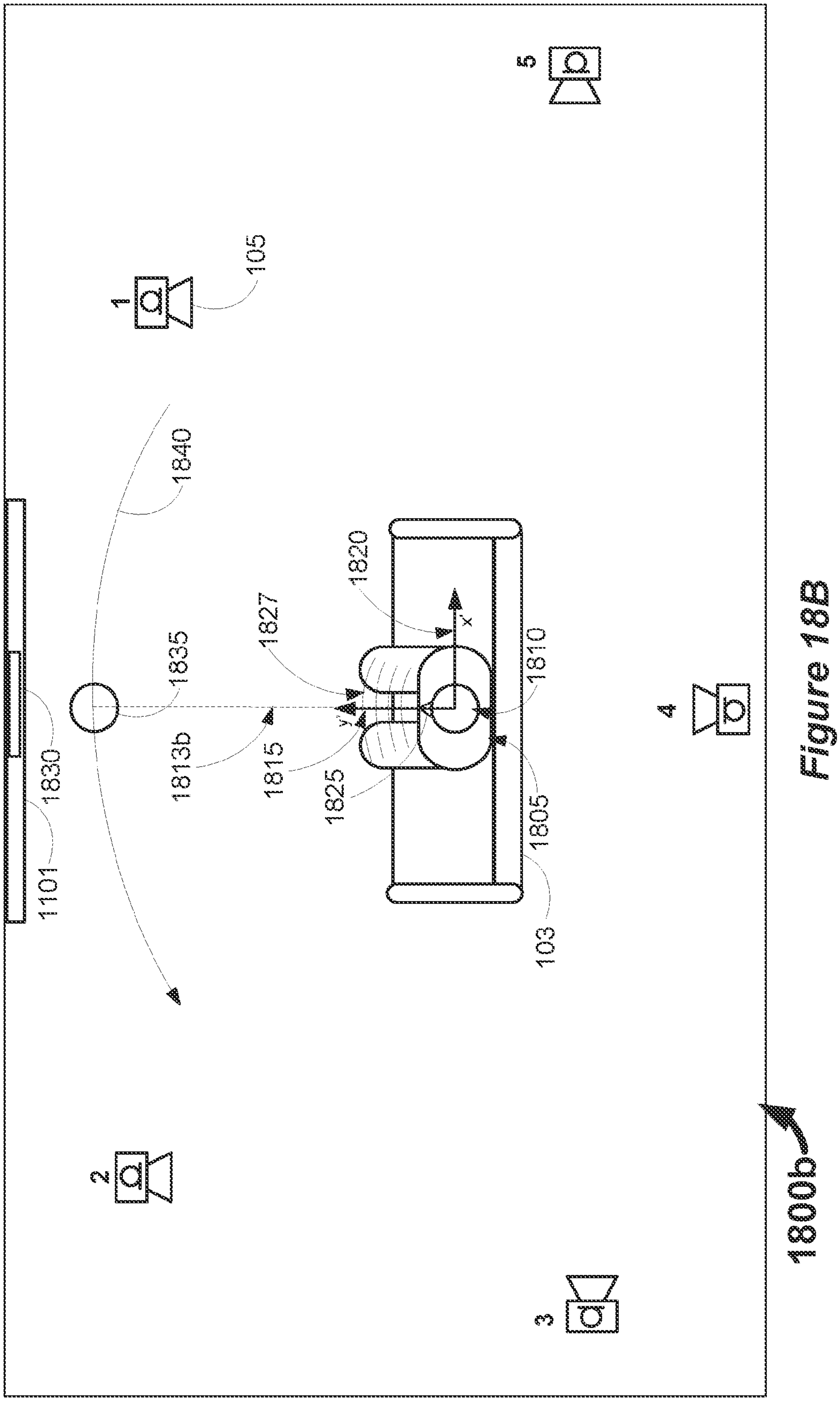
FIG. 18B shows an additional example of determining listener angular orientation data.

FIG. 18B shows an additional example of determining listener angular orientation data. According to this example, the listener location has already been determined. Here, a control system is controlling loudspeakers of the environment 1800*b* to render the audio object 1835 to a variety of locations within the environment 1800*b*. In some such examples, the control system may cause the loudspeakers to render the audio object 1835 such that the audio object 1835 seems to rotate around the listener 1805, e.g., by rendering the audio object 1835 such that the audio object 1835 seems to rotate around the origin of the listener coordinate system 1820. In this example, the curved arrow 1840 shows a portion of the trajectory of the audio object 1835 as it rotates around the listener 1805.

According to some such examples, the listener 1805 may provide user input (e.g., saying "Stop") indicating when the audio object 1835 is in the direction that the listener 1805 is facing. In some such examples, the control system may be configured to determine a line 1813*b* between the listener location and the location of the audio object 1835. In this example, the line 1813*b* corresponds with the y' axis of the listener coordinate system, which indicates the direction that the listener 1805 is facing. In alternative implementations, the listener 1805 may provide user input indicating when the audio object 1835 is in the front of the environment, at a TV location of the environment, at an audio device location, etc.

Figure 18C:
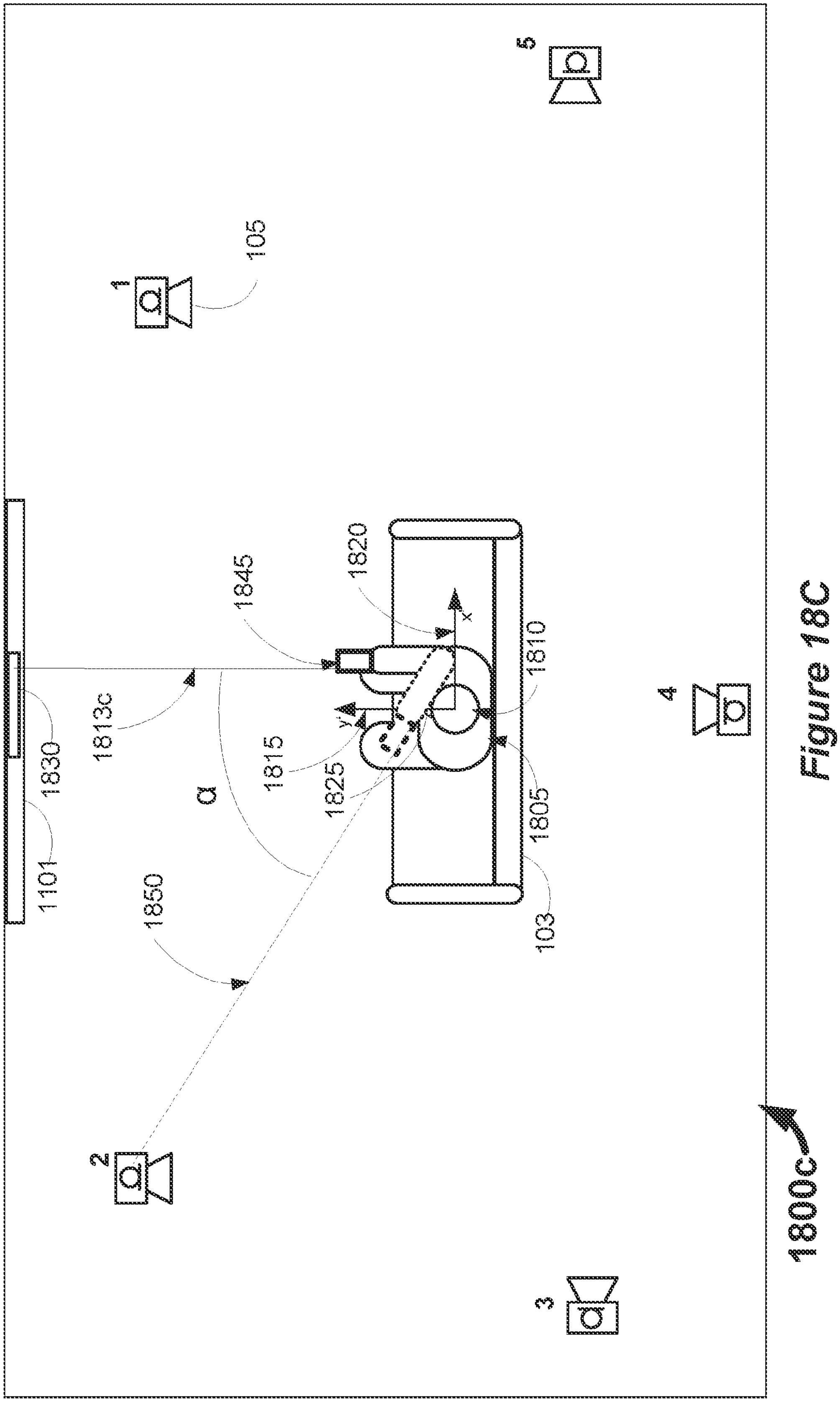
FIG. 18C shows an additional example of determining listener angular orientation data.

FIG. 18C shows an additional example of determining listener angular orientation data. According to this example, the listener location has already been determined. Here, the listener 1805 is using a handheld device 1845 to provide input regarding a viewing direction of the listener 1805, by pointing the handheld device 1845 towards the television 1101 or the soundbar 1830. The dashed outline of the handheld device 1845 and the listener's arm indicate that at a time prior to the time at which the listener 1805 was pointing the handheld device 1845 towards the television 1101 or the soundbar 1830, the listener 1805 was pointing the handheld device 1845 towards audio device 2 in this example. In other examples, the listener 1805 may have pointed the handheld device 1845 towards another audio device, such as audio device 1. According to this example, the handheld device 1845 is configured to determine an angle α between audio device 2 and the television 1101 or the soundbar 1830, which approximates the angle between audio device 2 and the viewing direction of the listener 1805.

The handheld device 1845 may, in some examples, be a cellular telephone that includes an inertial sensor system and a wireless interface configured for communicating with a control system that is controlling the audio devices of the environment 1800*c*. In some examples, the handheld device 1845 may be running an application or "app" that is configured to control the handheld device 1845 to perform the necessary functionality, e.g., by providing user prompts (e.g., via a graphical user interface), by receiving input indicating that the handheld device 1845 is pointing in a desired direction, by saving the corresponding inertial sensor data and/or transmitting the corresponding inertial sensor data to the control system that is controlling the audio devices of the environment 1800*c*, etc.

According to this example, a control system (which may be a control system of the handheld device 1845, a control system of a smart audio device of the environment 1800*c* or a control system that is controlling the audio devices of the environment 1800*c*) is configured to determine the orientation of lines 1813*c* and 1850 according to the inertial sensor data, e.g., according to gyroscope data. In this example, the line 1813*c* is parallel to the axis y' and may be used to determine the listener angular orientation. According to some examples, a control system may determine an appropriate rotation for the audio device coordinates around the origin of the listener coordinate system 1820 according to the angle α between audio device 2 and the viewing direction of the listener 1805.

Figure 18D:
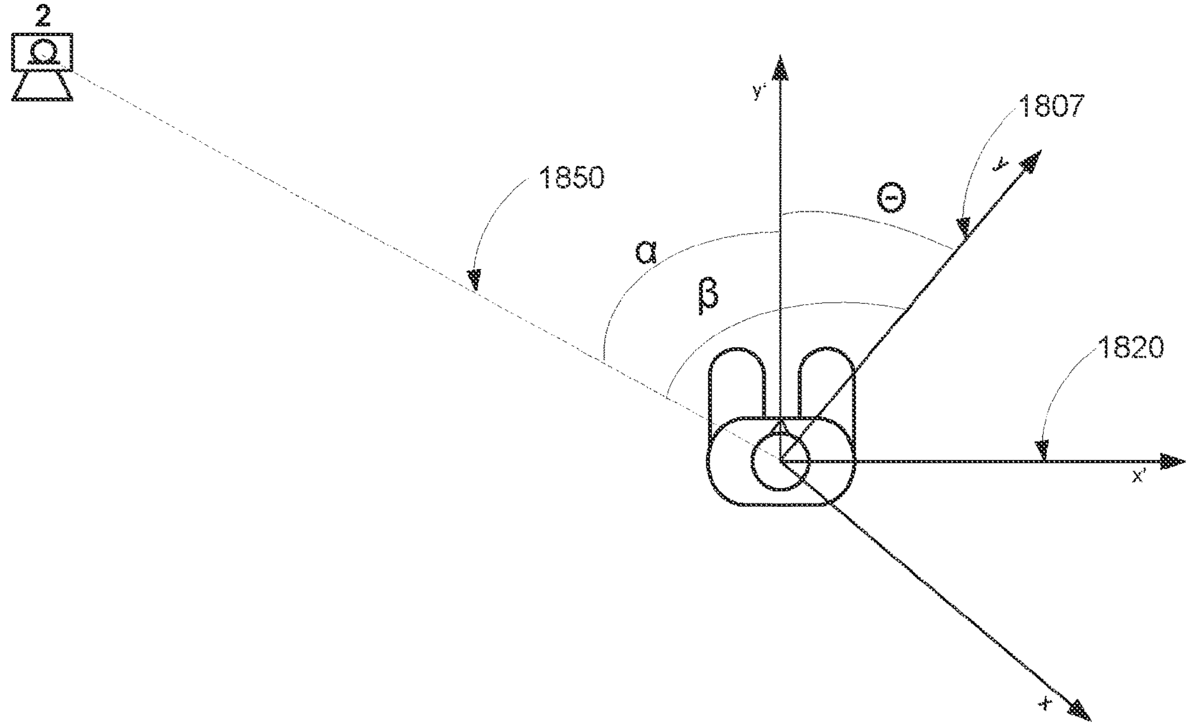
FIG. 18D shows one example of determine an appropriate rotation for the audio device coordinates in accordance with the method described with reference to FIG. 18C.

FIG. 18D shows one example of determine an appropriate rotation for the audio device coordinates in accordance with the method described with reference to FIG. 18C. In this example, the origin of the audio device coordinate system 1807 is co-located with the origin of the listener coordinate system 1820. Co-locating the origins of the audio device coordinate system 1807 and the listener coordinate system 1820 is made possible after the listener location is determined. Co-locating the origins of the audio device coordinate system 1807 and the listener coordinate system 1820 may involve transforming the audio device locations from the audio device coordinate system 1807 to the listener coordinate system 1820. The angle α has been determined as described above with reference to FIG. 18C. Accordingly, the angle α corresponds with the desired orientation of the audio device 2 in the listener coordinate system 1820. In this example, the angle β corresponds with the orientation of the audio device 2 in the audio device coordinate system 1807. The angle Θ, which is β−α in this example, indicates the necessary rotation to align the y axis of the of the audio device coordinate system 1807 with the γ' axis of the listener coordinate system 1820.

DOA Robustness Measures

As noted above with reference to FIG. 14, in some examples using "blind" methods that are applied to arbitrary signals including steered response power, beamforming, or other similar methods, robustness measures may be added to improve accuracy and stability. Some implementations include time integration of beamformer steered response to filter out transients and detect only the persistent peaks, as well as to average out random errors and fluctuations in those persistent DOAs. Other examples may use only limited frequency bands as input, which can be tuned to room or signal types for better performance.

For examples using 'supervised' methods that involve the use of structured source signals and deconvolution methods to yield impulse responses, preprocessing measures can be implemented to enhance the accuracy and prominence of DOA peaks. In some examples, such preprocessing may include truncation with an amplitude window of some temporal width starting at the onset of the impulse response on each microphone channel. Such examples may incorporate an impulse response onset detector such that each channel onset can be found independently.

In some examples based on either 'blind' or 'supervised' methods as described above, still further processing may be added to improve DOA accuracy. It is important to note that DOA selection based on peak detection (e.g., during Steered-Response Power (SRP) or impulse response analysis) is sensitive to environmental acoustics that can give rise to the capture of non-primary path signals due to reflections and device occlusions that will dampen both receive and transmit energy. These occurrences can degrade the accuracy of device pair DOAs and introduce errors in the optimizer's localization solution. It is therefore prudent to regard all peaks within predetermined thresholds as candidates for ground truth DOAs. One example of a predetermined threshold is a requirement that a peak be larger than the mean Steered-Response Power (SRP). For all detected peaks, prominence thresholding and removing candidates below the mean signal level have proven to be simple yet effective initial filtering techniques. As used herein, "prominence" is a measure of how large a local peak is compared to its adjacent local minima, which is different from thresholding only based on power. One example of a prominence threshold is a requirement that the difference in power between a peak and its adjacent local minima be at or above a threshold value. Retention of viable candidates improves the chances that a device pair will contain a usable DOA in their set (within an acceptable error tolerance from the ground truth), though there is the chance that it will not contain a usable DOA in cases where the signal is corrupted by strong reflections/occlusions. In some examples, a selection algorithm may be implemented in order to do one of the following: 1) select the best usable DOA candidate per device pair; 2) make a determination that none of the candidates are usable and therefore null that pair's optimization contribution with the cost function weighting matrix; or 3) select a best inferred candidate but apply a non-binary weighting to the DOA contribution in cases where it is difficult to disambiguate the amount of error the best candidate carries.

After an initial optimization with the best inferred candidates, in some examples the localization solution may be used to compute the residual cost contribution of each DOA. An outlier analysis of the residual costs can provide evidence of DOA pairs that are most heavily impacting the localization solution, with extreme outliers flagging those DOAs to be potentially incorrect or sub-optimal. A recursive run of optimizations for outlying DOA pairs based on the residual cost contributions with the remaining candidates and with a weighting applied to that device pair's contribution may then be used for candidate handling according to one of the aforementioned three options. This is one example of a feedback process such as described above with reference to FIGS. 14-17. According to some implementations, repeated optimizations and handling decisions may be carried out until all detected candidates are evaluated and the residual cost contributions of the selected DOAs are balanced.

A drawback of candidate selection based on optimizer evaluations is that it is computationally intensive and sensitive to candidate traversal order. An alternative technique with less computational weight involves determining all permutations of candidates in the set and running a triangle alignment method for device localization on these candidates. Relevant triangle alignment methods are disclosed in U.S. Provisional Patent Application No. 62/992,068, filed on Mar. 19, 2020 and entitled "Audio Device Auto-Location," which is hereby incorporated by reference for all purposes. The localization results can then be evaluated by computing the total and residual costs the results yield with respect to the DOA candidates used in the triangulation. Decision logic to parse these metrics can be used to determine the best candidates and their respective weighting to be supplied to the non-linear optimization problem. In cases where the list of candidates is large, therefore yielding high permutation counts, filtering and intelligent traversal through the permutation list may be applied.

TOA Robustness Measures

As described above with reference to FIG. 16, the use of multiple candidate TOA solutions adds robustness over systems that utilize single or minimal TOA values, and ensures that errors have a minimal impact on finding the optimal speaker layout. Having obtained an impulse response of the system, in some examples each one of the TOA matrix elements can be recovered by searching for the peak corresponding to the direct sound. In ideal conditions (e.g., no noise, no obstructions in the direct path between source and receiver and speakers pointing directly to the microphones) this peak can be easily identified as the largest peak in the impulse response. However, in presence of noise, obstructions, or misalignment of speakers and microphones, the peak corresponding to the direct sound does not necessarily correspond to the largest value. Moreover, in such conditions the peak corresponding to the direct sound can be difficult to isolate from other reflections and/or noise. The direct sound identification can, in some instances, be a challenging process. An incorrect identification of the direct sound will degrade (and in some instances may completely spoil) the automatic localization process. Thus, in cases wherein there is the potential for error in the direct sound identification process, it can be effective to consider multiple candidates for the direct sound. In some such instances, the peak selection process may include two parts: (1) a direct sound search algorithm, which looks for suitable peak candidates, and (2) a peak candidate evaluation process to increase the probability to pick the correct TOA matrix elements.

In some implementations, the process of searching for direct sound candidate peaks may include a method to identify relevant candidates for the direct sound. Some such methods may be based on the following steps: (1) identify one first reference peak (e.g., the maximum of the absolute value of the impulse response (IR)), the "first peak;" (2) evaluate the level of noise around (before and after) this first peak; (3) search for alternative peaks before (and in some cases after) the first peak that are above the noise level; (4) rank the peaks found according to their probability of corresponding the correct TOA; and optionally (5) group close peaks (to reduce the number of candidates).

Once direct sound candidate peaks are identified, some implementations may involve a multiple peak evaluation step. As a result of the direct sound candidate peak search, in some examples there will be one or more candidate values for each TOA matrix element ranked according their estimated probability. Multiple TOA matrices can be formed by selecting among the different candidate values. In order to assess the likelihood of a given TOA matrix, a minimization process (such as the minimization process described above) may be implemented. This process can generate the residuals of the minimization, which are a good estimates of the internal coherence of the TOA and DOA matrices. A perfect noiseless TOA matrix will lead to zero residuals, whereas a TOA matrix with incorrect matrix elements will lead to large residuals. In some implementations, the method will look for the set of candidate TOA matrix elements that creates the TOA matrix with the smallest residuals. This is one example of an evaluation process described above with reference to FIGS. 16 and 17, which may involve results evaluation block 1750. In one example, the evaluation process may involve performing the following steps: (1) choose an initial TOA matrix; (2) evaluate the initial matrix with the residuals of the minimization process; (3) change one matrix element of the TOA matrix from the list of TOA candidates; (4) re-evaluate the matrix with the residuals of the minimization process; (5) if the residuals are smaller accept the change, otherwise do not accept it; and (6) iterate over steps 3 to 5. In some examples, the evaluation process may stop when all TOA candidates have been evaluated or when a predefined maximum number of iterations has been reached.

Some disclosed alternative implementations also involve acoustically locating loudspeakers and/or listeners using directional-of-arrival (DOA) data. In some examples the DOA data may be obtained via microphone arrays collocated with some or all of the loudspeakers.

Figure 19:
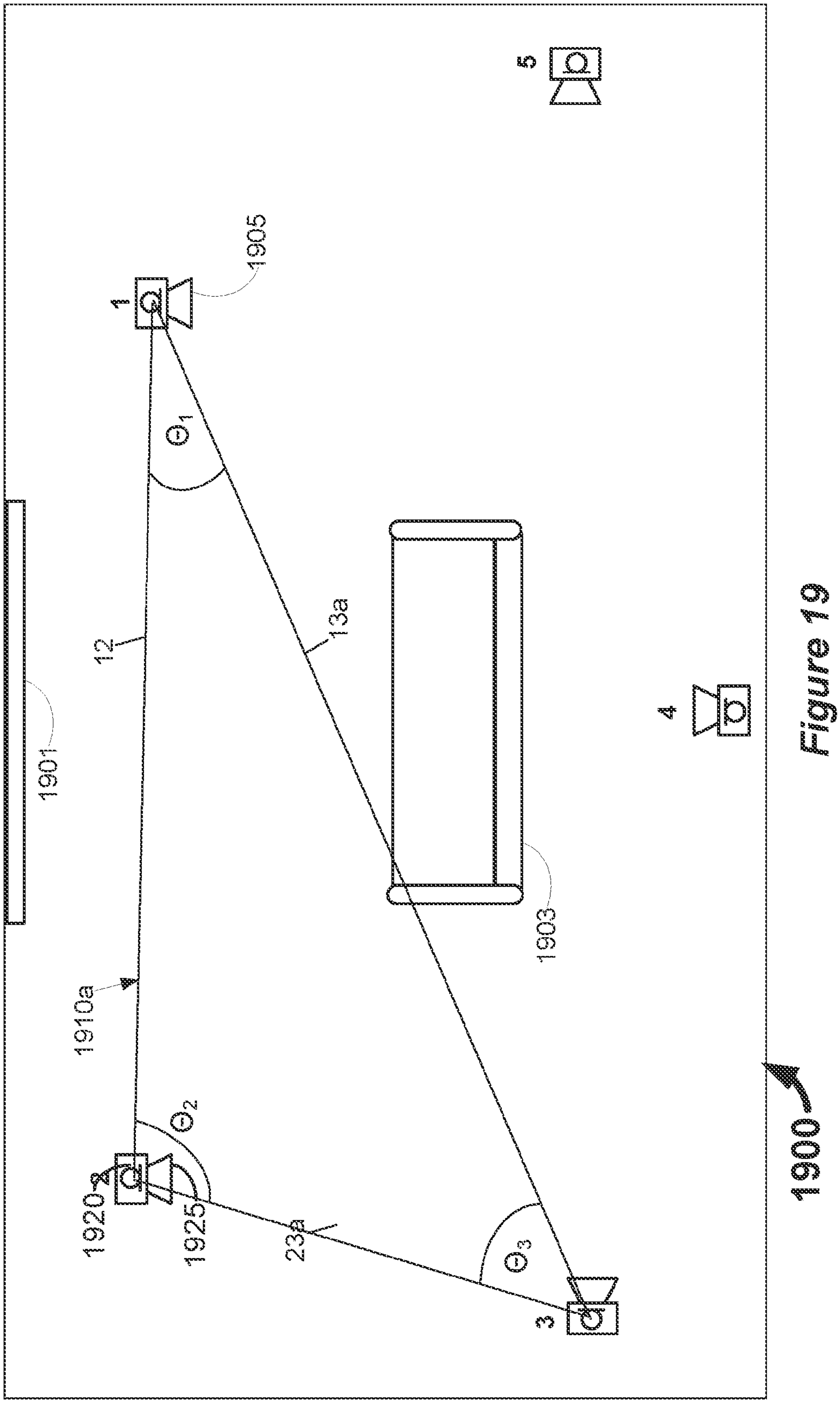
FIG. 19 shows an example of geometric relationships between three audio devices in an environment.

FIG. 19 shows an example of geometric relationships between three audio devices in an environment. In this example, the environment 1900 is a room that includes a television 1901, a sofa 1903 and five audio devices 1905. According to this example, the audio devices 1905 are in locations 1 through 5 of the environment 1900. In this implementation, each of the audio devices 1905 includes a microphone system 1920 having at least three microphones and a speaker system 1925 that includes at least one speaker. In some implementations, each microphone system 1920 includes an array of microphones. According to some implementations, each of the audio devices 1905 may include an antenna system that includes at least three antennas.

As with other examples disclosed herein, the type, number and arrangement of elements shown in FIG. 19 are merely made by way of example. Other implementations may have different types, numbers and arrangements of elements, e.g., more or fewer audio devices 1905, audio devices 1905 in different locations, etc.

In this example, the triangle 1910*a* has its vertices at locations 1, 2 and 3. Here, the triangle 1910*a* has sides 12, 23*a* and 13*a*. According to this example, the angle between sides 12 and 23 is $\theta_2$, the angle between sides 12 and 13*a* is $\theta_1$ and the angle between sides 23*a* and 13*a* is $\theta_3$. These angles may be determined according to DOA data, as described in more detail below.

In some implementations, only the relative lengths of triangle sides may be determined. In alternative implementations, the actual lengths of triangle sides may be estimated. According to some such implementations, the actual length of a triangle side may be estimated according to TOA data, e.g., according to the time of arrival of sound produced by an audio device located at one triangle vertex and detected by an audio device located at another triangle vertex. Alternatively, or additionally, the length of a triangle side may be estimated according to electromagnetic waves produced by an audio device located at one triangle vertex and detected by an audio device located at another triangle vertex. For example, the length of a triangle side may be estimated according to the signal strength of electromagnetic waves produced by an audio device located at one triangle vertex and detected by an audio device located at another triangle vertex. In some implementations, the length of a triangle side may be estimated according to a detected phase shift of electromagnetic waves.

Figure 20:
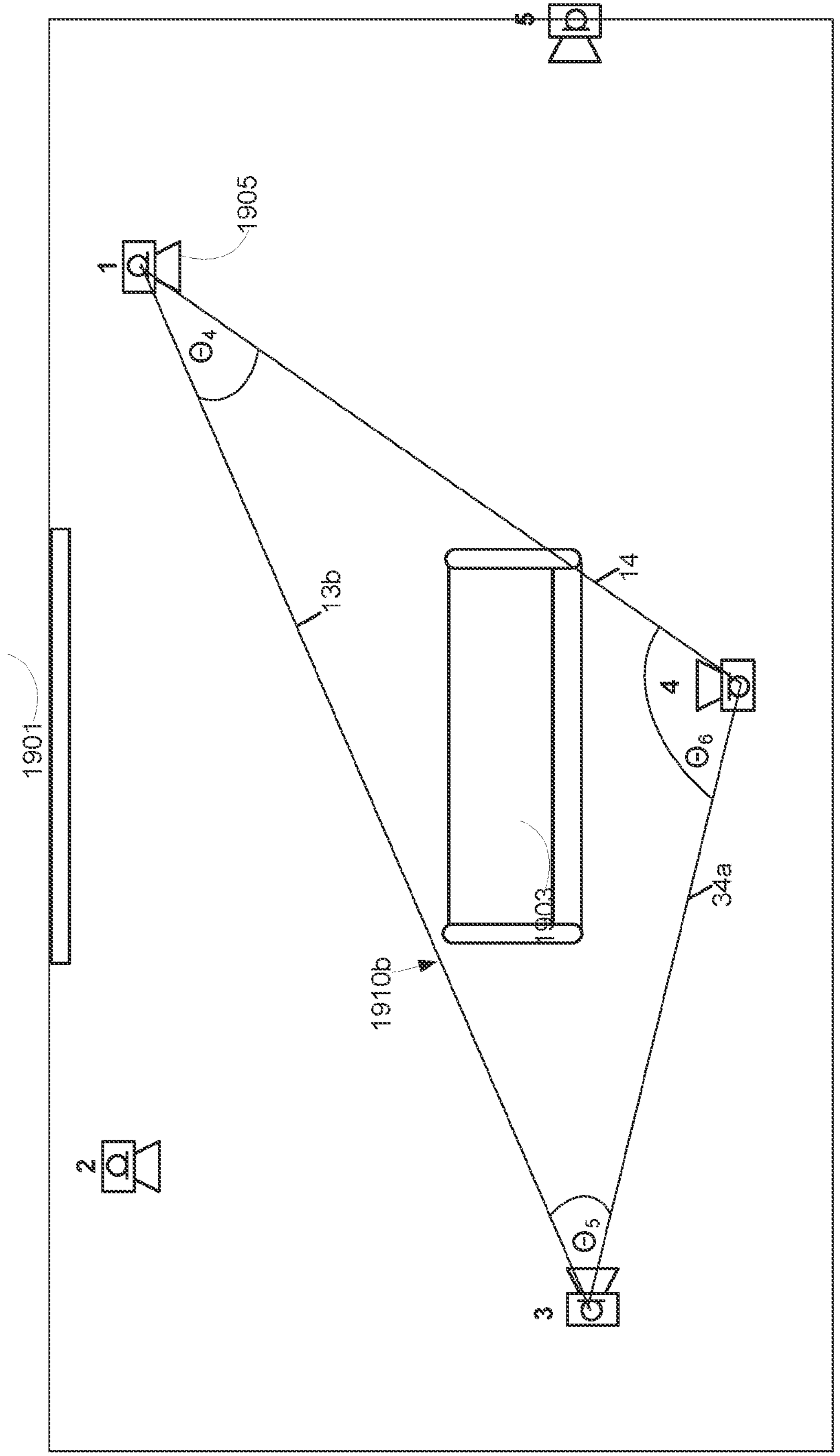
FIG. 20 shows another example of geometric relationships between three audio devices in the environment shown in FIG. 19.

FIG. 20 shows another example of geometric relationships between three audio devices in the environment shown in FIG. 19. In this example, the triangle 1910*b* has its vertices at locations 1, 3 and 4. Here, the triangle 1910*b* has sides 13*b*, 14 and 34*a*. According to this example, the angle between sides 13*b* and 14 is $\theta_4$, the angle between sides 13*b* and 34*a* is $\theta_5$ and the angle between sides 34*a* and 14 is $\theta_6$.

By comparing FIGS. 11 and 12, one may observe that the length of side 13*a* of triangle 1910*a* should equal the length of side 13*b* of triangle 1910*b*. In some implementations, the side lengths of one triangle (e.g., triangle 1910*a*) may be assumed to be correct, and the length of a side shared by an adjacent triangle will be constrained to this length.

Figure 21A:
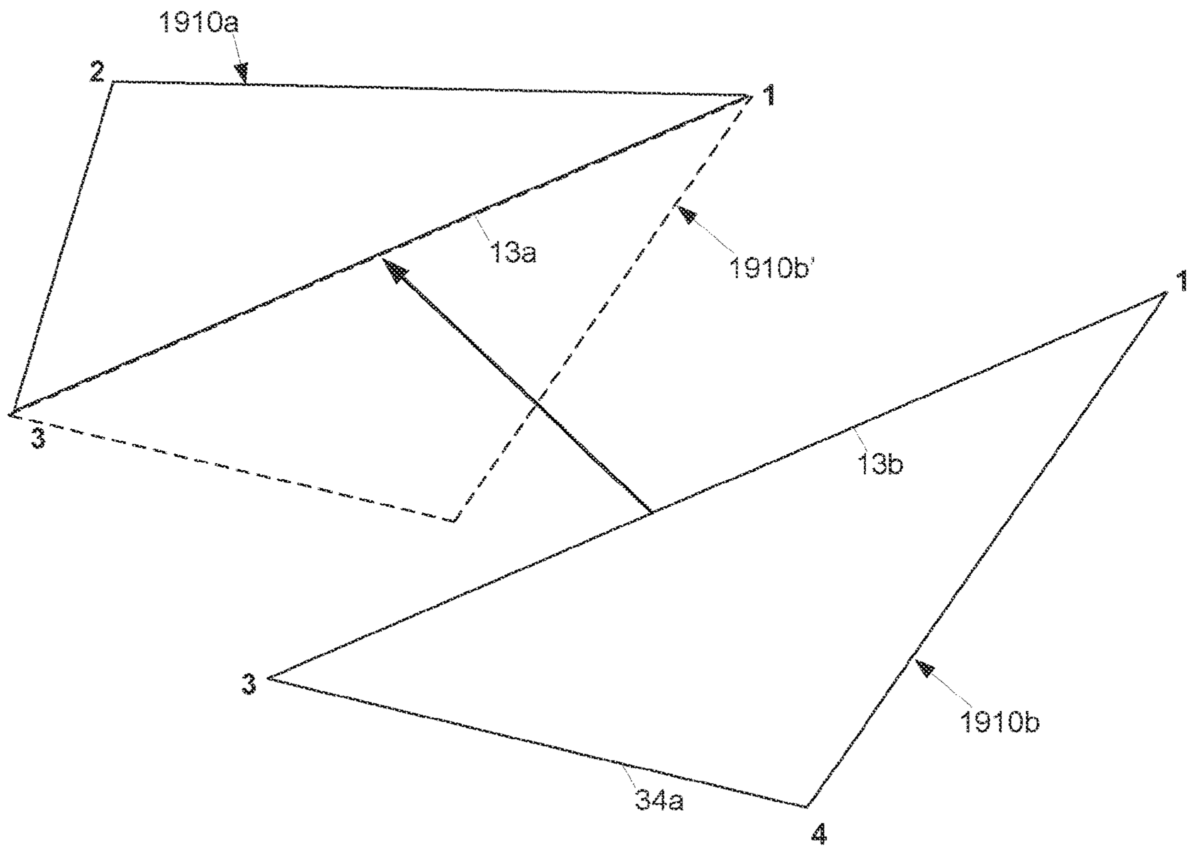
FIG. 21A shows both of the triangles depicted in FIGS. 19 and 20, without the corresponding audio devices and the other features of the environment.

FIG. 21A shows both of the triangles depicted in FIGS. 19 and 20, without the corresponding audio devices and the other features of the environment. FIG. 21A shows estimates of the side lengths and angular orientations of triangles 1910*a* and 1910*b*. In the example shown in FIG. 21A, the length of side 13*b* of triangle 1910*b* is constrained to be the same length as side 13*a* of triangle 1910*a*. The lengths of the other sides of triangle 1910*b* are scaled in proportion to the resulting change in the length of side 13*b*. The resulting triangle 1910*b*' is shown in FIG. 21A, adjacent to the triangle 1910*a*.

According to some implementations, the side lengths of other triangles adjacent to triangle 1910*a* and 1910*b* may be all determined in a similar fashion, until all of the audio device locations in the environment 1900 have been determined.

Some examples of audio device location may proceed as follows. Each audio device may report the DOA of every other audio device in an environment (e.g., a room) based on sounds produced by every other audio device in the environment. The Cartesian coordinates of the ith audio device may be expressed as $x_i=[x_i,y_i]^T$, where the superscript T indicates a vector transpose. Given M audio devices in the environment, $i=\{1 \ldots M\}$.

Figure 21B:
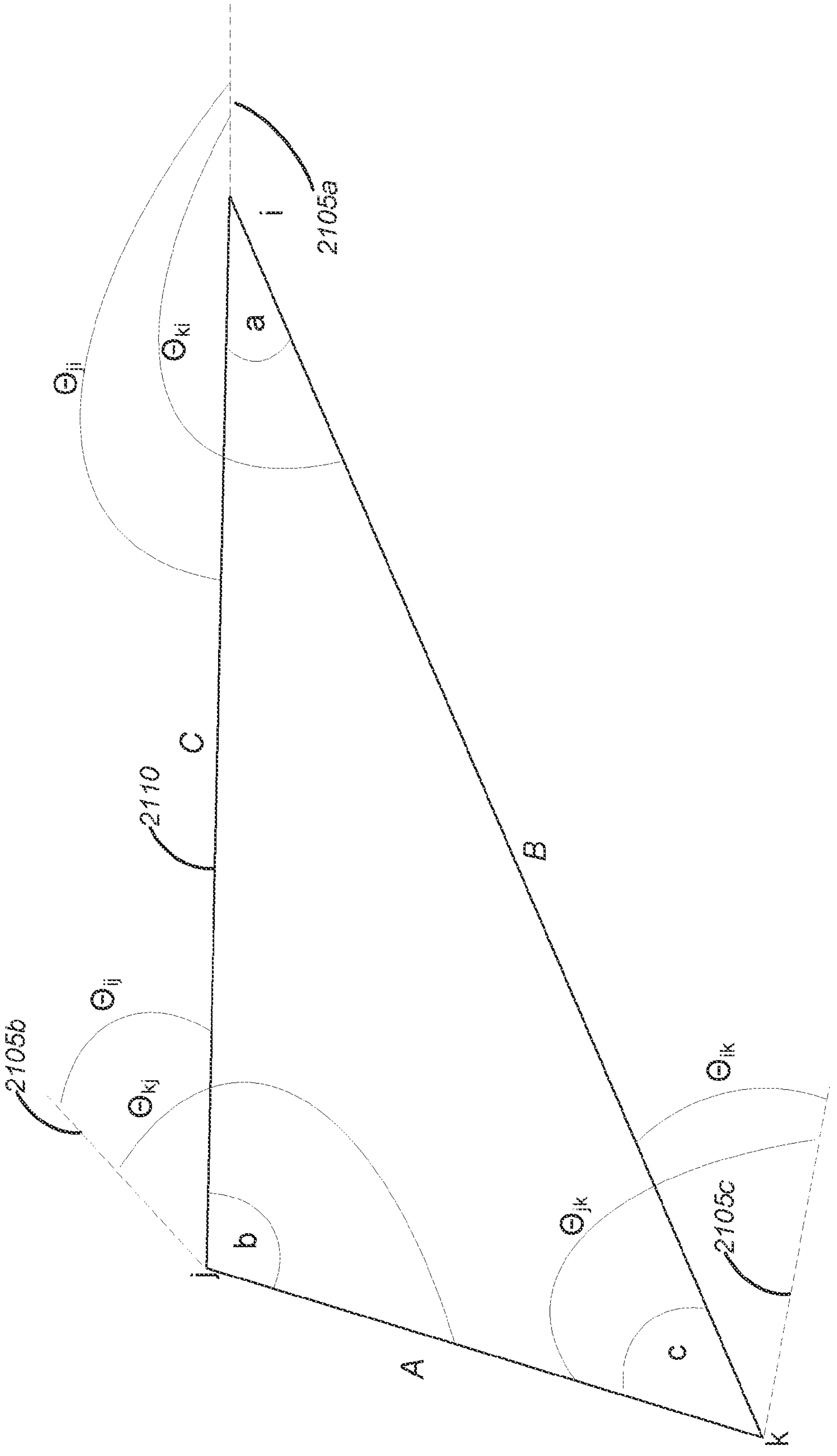
FIG. 21B shows an example of estimating the interior angles of a triangle formed by three audio devices.

FIG. 21B shows an example of estimating the interior angles of a triangle formed by three audio devices. In this example, the audio devices are i, j and k. The DOA of a sound source emanating from device j as observed from device i may be expressed as $\theta_{ji}$. The DOA of a sound source emanating from device k as observed from device i may be expressed as $\theta_{ki}$. In the example shown in FIG. 21B, $\theta_{ji}$ and $\theta_{ki}$ are measured from axis 2105*a*, the orientation of which is arbitrary and which may, for example, correspond to the orientation of audio device i. Interior angle a of triangle 2110 may be expressed as $a=\theta_{ki}-\theta_{ji}$. One may observe that the calculation of interior angle a does not depend on the orientation of the axis 2105*a*.

In the example shown in FIG. 21B, $\theta_{ij}$ and $\theta_{kj}$ are measured from axis 2105*b*, the orientation of which is arbitrary and which may correspond to the orientation of audio device j. Interior angle b of triangle 2110 may be expressed as $b=\theta_{ij}-\theta_{kj}$. Similarly, $\theta_{jk}$ and $\theta_{ik}$ are measured from axis 2105*c* in this example. Interior angle c of triangle 2110 may be expressed as $c=\theta_{jk}-\theta_{ik}$.

In the presence of measurement error, $a+b+c\neq180°$. Robustness can be improved by predicting each angle from the other two angles and averaging, e.g., as follows:

$$\tilde{a}=0.5(a+\text{sgn}(a)(180-|b+c|)).$$

In some implementations, the edge lengths (A, B, C) may be calculated (up to a scaling error) by applying the sine rule. In some examples, one edge length may be assigned an arbitrary value, such as 1. For example, by making A=1 and placing vertex $\hat{x}_a=[0,0]^T$ at the origin, the locations of the remaining two vertices may be calculated as follows:

$$\hat{x}_b=[A\cos a,-A\sin a]^T,\hat{x}_c=[B,0]^T$$

However, an arbitrary rotation may be acceptable.

According to some implementations, the process of triangle parameterization may be repeated for all possible subsets of three audio devices in the environment, enumerated in superset $\zeta$ of size $$N=\binom{M}{3}.$$

In some examples, $T_l$ may represent the lth triangle. Depending on the implementation, triangles may not be enumerated in any particular order. The triangles may overlap and may not align perfectly, due to possible errors in the DOA and/or side length estimates.

Figure 22:
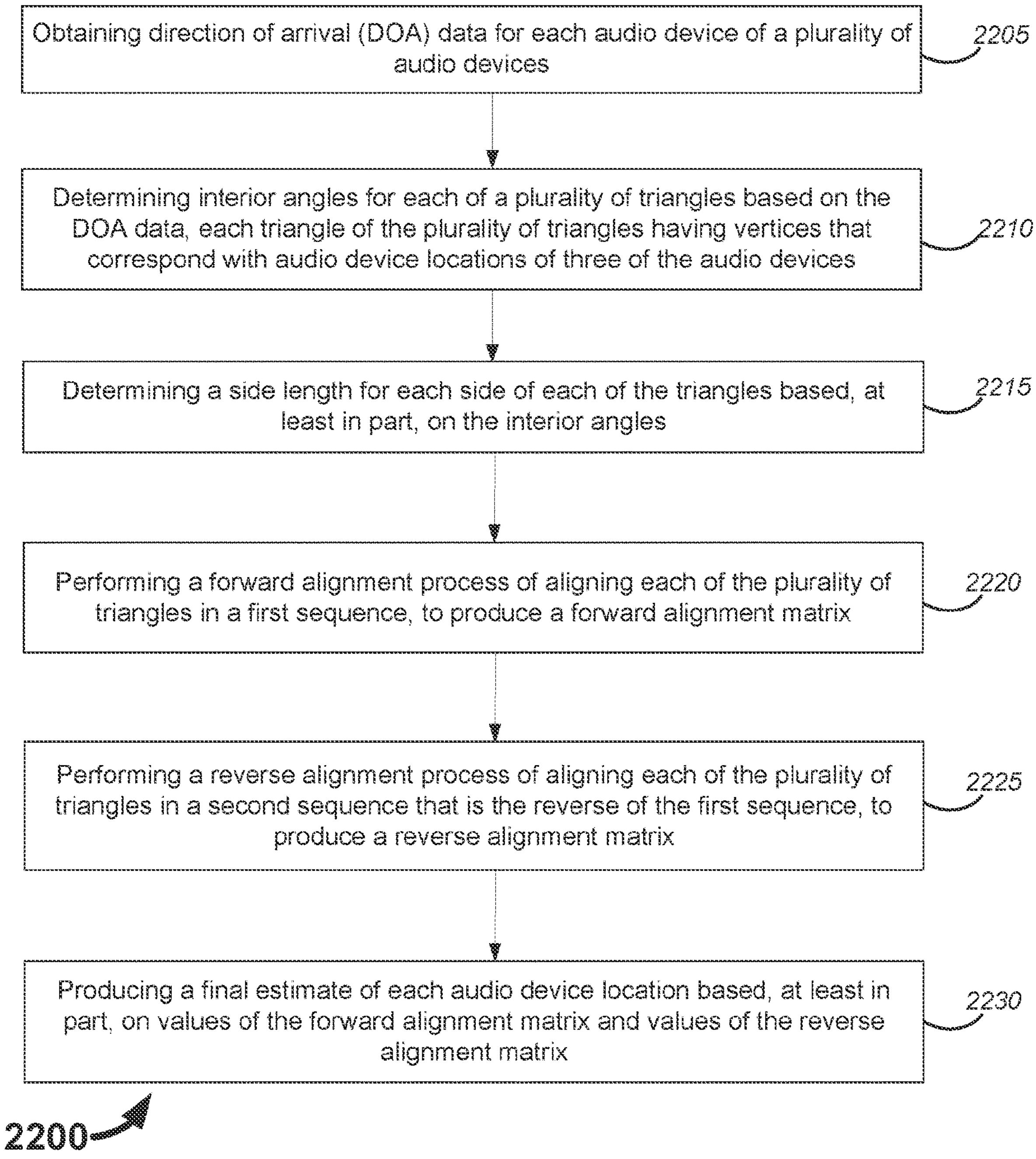
FIG. 22 is a flow diagram that outlines one example of a method that may be performed by an apparatus such as that shown in FIG. 1.

FIG. 22 is a flow diagram that outlines one example of a method that may be performed by an apparatus such as that shown in FIG. 1. The blocks of method 2200, like other methods described herein, are not necessarily performed in the order indicated. Moreover, such methods may include more or fewer blocks than shown and/or described. In this implementation, method 2200 involves estimating a speaker's location in an environment. The blocks of method 2200 may be performed by one or more devices, which may be (or may include) the apparatus 100 shown in FIG. 1.

In this example, block 2205 involves obtaining direction of arrival (DOA) data for each audio device of a plurality of audio devices. In some examples, the plurality of audio devices may include all of the audio devices in an environment, such as all of the audio devices 1905 shown in FIG. 19.

However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to this example, block 2210 involves determining interior angles for each of a plurality of triangles based on the DOA data. In this example, each triangle of the plurality of triangles has vertices that correspond with audio device locations of three of the audio devices. Some such examples are described above.

Figure 23:
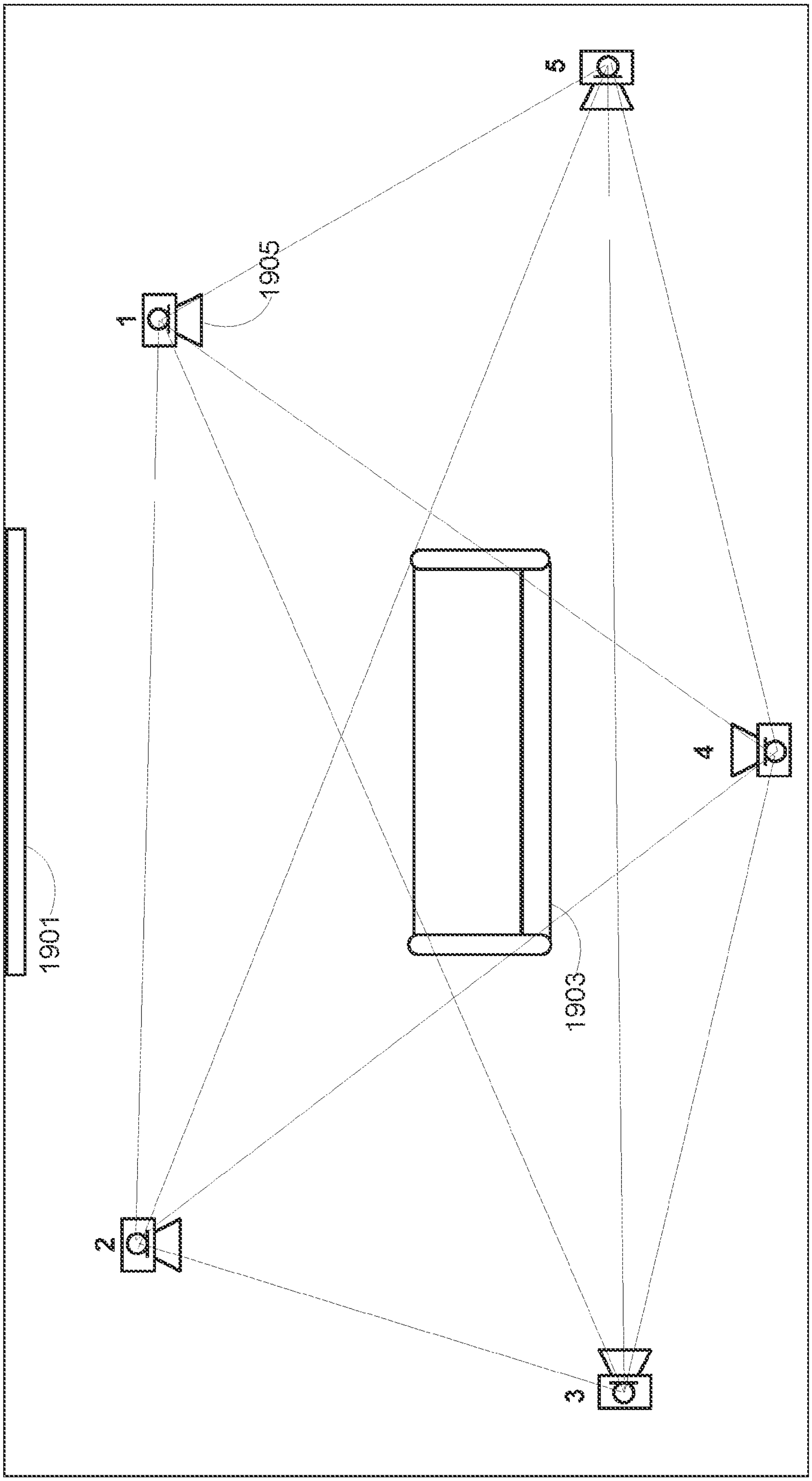
FIG. 23 shows an example in which each audio device in an environment is a vertex of multiple triangles.

FIG. 23 shows an example in which each audio device in an environment is a vertex of multiple triangles. The sides of each triangle correspond with distances between two of the audio devices 1905.

In this implementation, block 2215 involves determining a side length for each side of each of the triangles. (A side of a triangle may also be referred to herein as an "edge.") According to this example, the side lengths are based, at least in part, on the interior angles. In some instances, the side lengths may be calculated by determining a first length of a first side of a triangle and determining lengths of a second side and a third side of the triangle based on the interior angles of the triangle. Some such examples are described above.

According to some such implementations, determining the first length may involve setting the first length to a predetermined value. However, determining the first length may, in some examples, be based on time-of-arrival data and/or received signal strength data. The time-of-arrival data and/or received signal strength data may, in some implementations, correspond to sound waves from a first audio device in an environment that are detected by a second audio device in the environment. Alternatively, or additionally, the time-of-arrival data and/or received signal strength data may correspond to electromagnetic waves (e.g., radio waves, infrared waves, etc.) from a first audio device in an environment that are detected by a second audio device in the environment.

According to this example, block 2220 involves performing a forward alignment process of aligning each of the plurality of triangles in a first sequence. According to this example, the forward alignment process produces a forward alignment matrix.

According to some such examples, triangles are expected to align in such a way that an edge $(x_i,x_j)$ is equal to a neighboring edge, e.g., as shown in FIG. 21A and described above. Let $\varepsilon$ be the set of all edges of size $$P=\binom{M}{2}.$$

In some such implementations, block 2220 may involve traversing through $\varepsilon$ and aligning the common edges of triangles in forward order by forcing an edge to coincide with that of a previously aligned edge.

Figure 24:
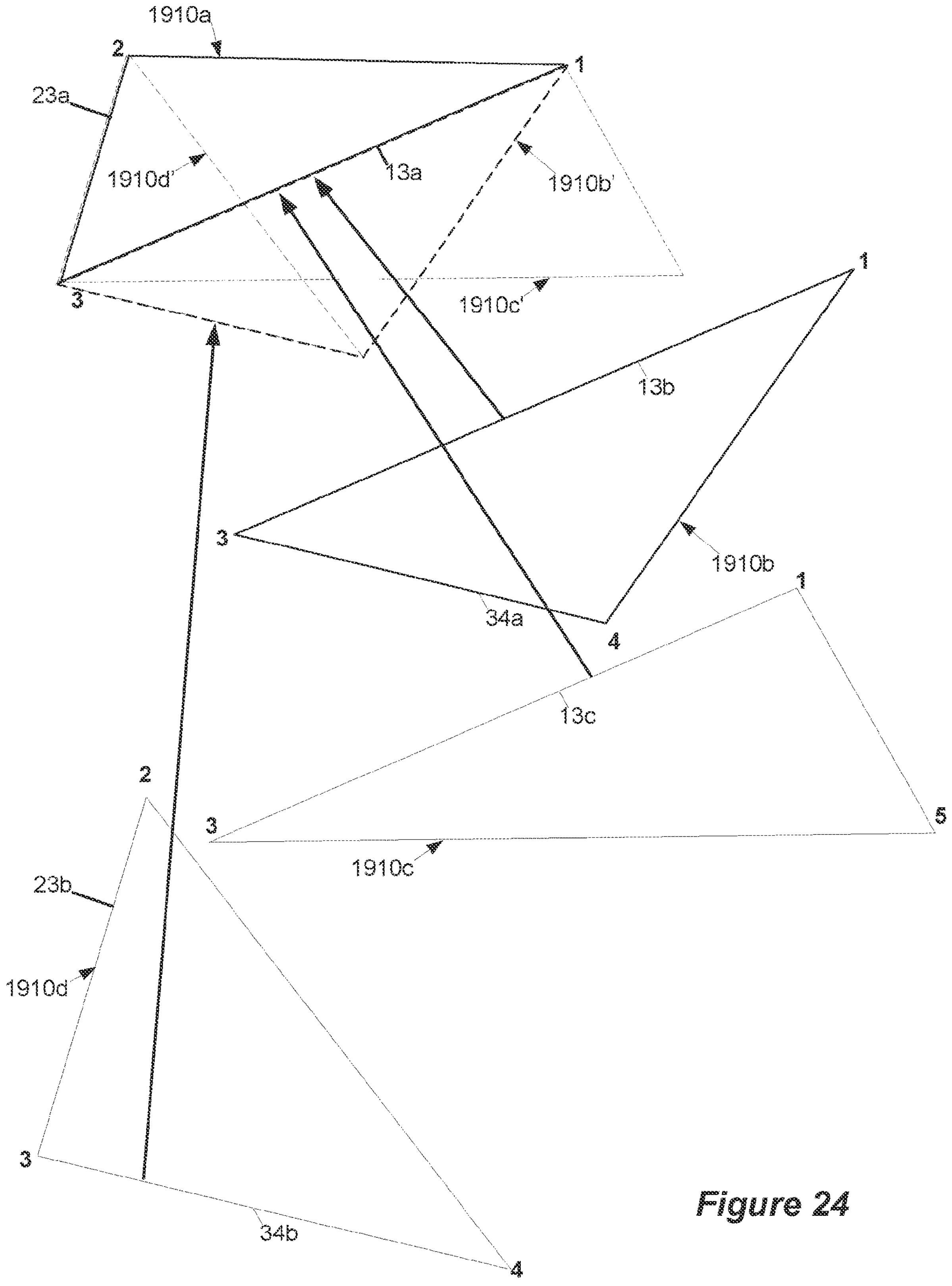
FIG. 24 provides an example of part of a forward alignment process.

FIG. 24 provides an example of part of a forward alignment process. The numbers 1 through 5 that are shown in bold in FIG. 24 correspond with the audio device locations shown in FIGS. 1, 2 and 5. The sequence of the forward alignment process that is shown in FIG. 24 and described herein is merely an example.

In this example, as in FIG. 21A, the length of side 13*b* of triangle 1910*b* is forced to coincide with the length of side 13*a* of triangle 1910*a*. The resulting triangle 1910*b*' is shown in FIG. 24, with the same interior angles maintained. According to this example, the length of side 13*c* of triangle 1910*c* is also forced to coincide with the length of side 13*a* of triangle 1910*a*. The resulting triangle 1910*c*' is shown in FIG. 24, with the same interior angles maintained.

Next, in this example, the length of side 34*b* of triangle 1910*d* is forced to coincide with the length of side 34*a* of triangle 1910*b*'. Moreover, in this example, the length of side 23*b* of triangle 1910*d* is forced to coincide with the length of side 23*a* of triangle 1910*a*. The resulting triangle 1910*d*' is shown in FIG. 24, with the same interior angles maintained. According to some such examples, the remaining triangles shown in FIG. 5 may be processed in the same manner as triangles 1910*b*, 1910*c* and 1910*d*.

The results of the forward alignment process may be stored in a data structure. According to some such examples, the results of the forward alignment process may be stored in a forward alignment matrix. For example, the results of the forward alignment process may be stored in matrix $\overrightarrow{\mathbf{X}} \in \mathbb{R}^{3N \times 2}$, where N indicates the total number of triangles.

When the DOA data and/or the initial side length determinations contain errors, multiple estimates of audio device location will occur. The errors will generally increase during the forward alignment process.

Figure 25:
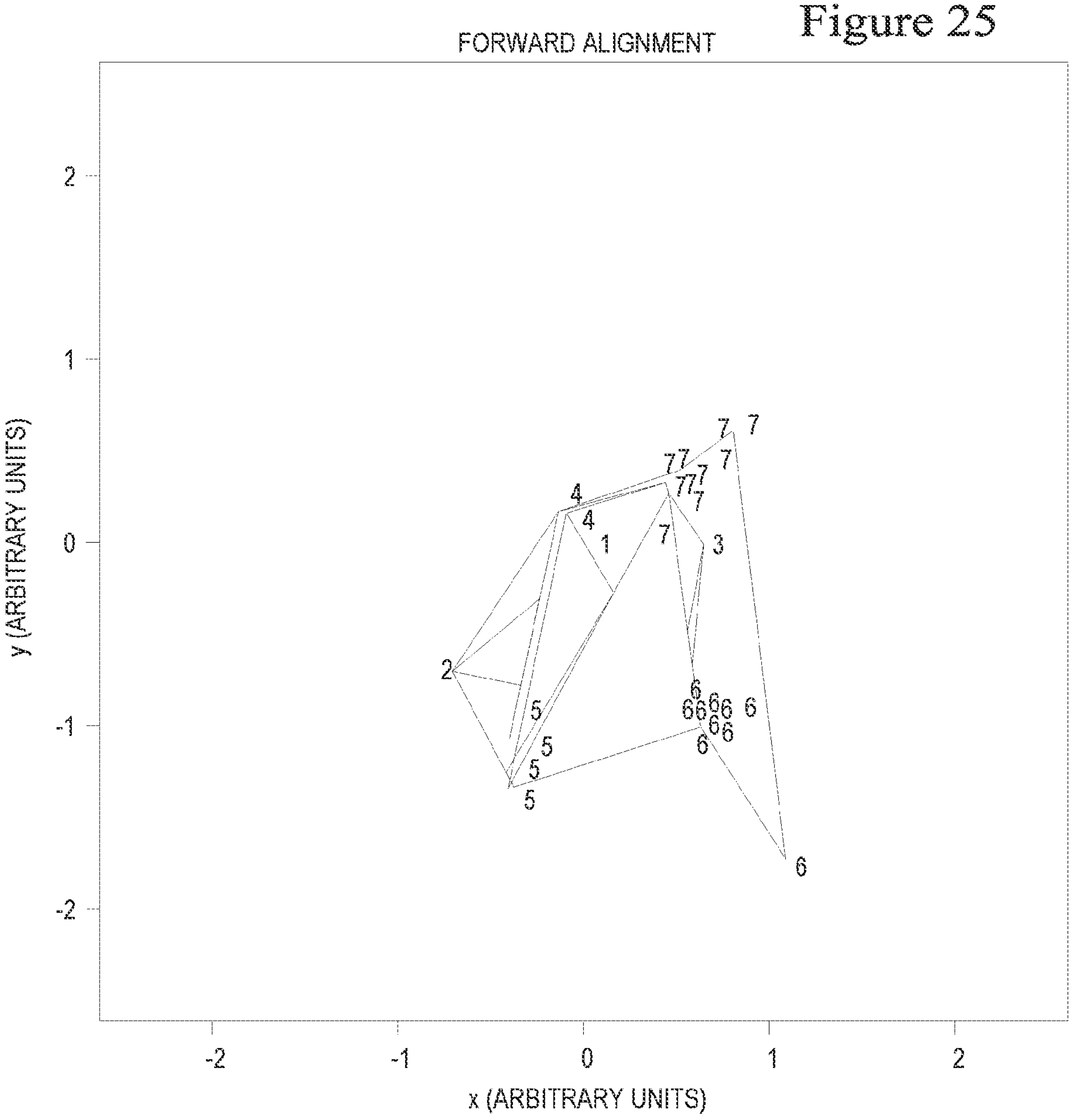
FIG. 25 shows an example of multiple estimates of audio device location that have occurred during a forward alignment process.

FIG. 25 shows an example of multiple estimates of audio device location that have occurred during a forward alignment process. In this example, the forward alignment process is based on triangles having seven audio device locations as their vertices. Here, the triangles do not align perfectly due to additive errors in the DOA estimates. The locations of the numbers 1 through 7 that are shown in FIG. 25 correspond to the estimated audio device locations produced by the forward alignment process. In this example, the audio device location estimates labelled "1" coincide but the audio device locations estimates for audio devices 6 and 7 show larger differences, as indicted by the relatively larger areas over which the numbers 6 and 7 are located.

Returning to FIG. 22, in this example block 2225 involves a reverse alignment process of aligning each of the plurality of triangles in a second sequence that is the reverse of the first sequence. According to some implementations, the reverse alignment process may involve traversing through ε as before, but in reverse order. In alternative examples, the reverse alignment process may not be precisely the reverse of the sequence of operations of the forward alignment process. According to this example, the reverse alignment process produces a reverse alignment matrix, which may be represented herein as $\overleftarrow{\mathbf{X}} \in \mathbb{R}^{3N \times 2}$.

Figure 26:
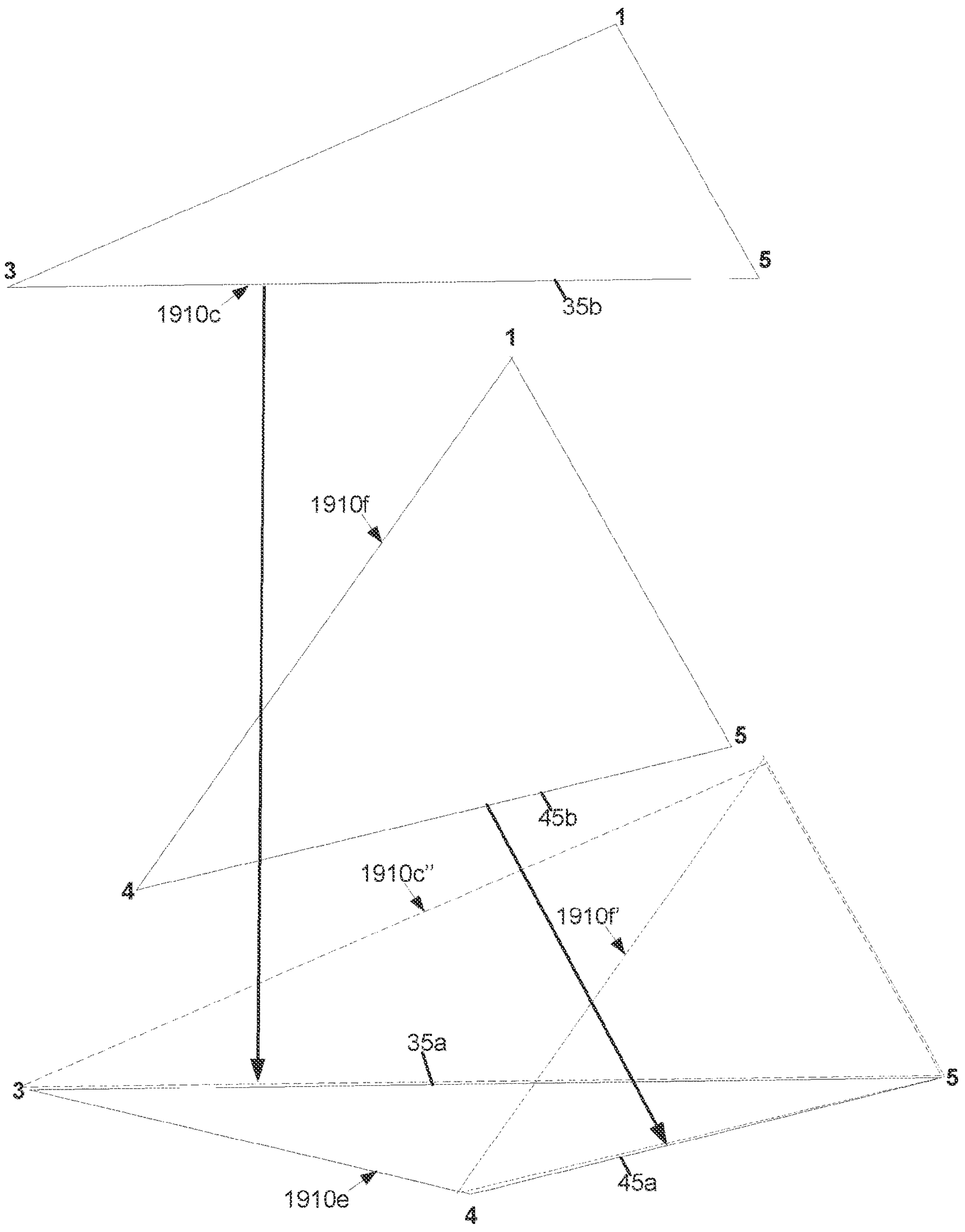
FIG. 26 provides an example of part of a reverse alignment process.

FIG. 26 provides an example of part of a reverse alignment process. The numbers 1 through 5 that are shown in bold in FIG. 26 correspond with the audio device locations shown in FIGS. 19, 21 and 23. The sequence of the reverse alignment process that is shown in FIG. 26 and described herein is merely an example.

In the example shown in FIG. 26, triangle 1910*e* is based on audio device locations 3, 4 and 5. In this implementation, the side lengths (or "edges") of triangle 1910*e* are assumed to be correct, and the side lengths of adjacent triangles are forced to coincide with them. According to this example, the length of side 45*b* of triangle 1910*f* is forced to coincide with the length of side 45*a* of triangle 1910*e*. The resulting triangle 1910*f*', with interior angles remaining the same, is shown in FIG. 26. In this example, the length of side 35*b* of triangle 1910*c* is forced to coincide with the length of side 35*a* of triangle 1910*e*. The resulting triangle 1910*c*", with interior angles remaining the same, is shown in FIG. 26. According to some such examples, the remaining triangles shown in FIG. 23 may be processed in the same manner as triangles 1910*c* and 1910*f*, until the reverse alignment process has included all remaining triangles.

Figure 27:
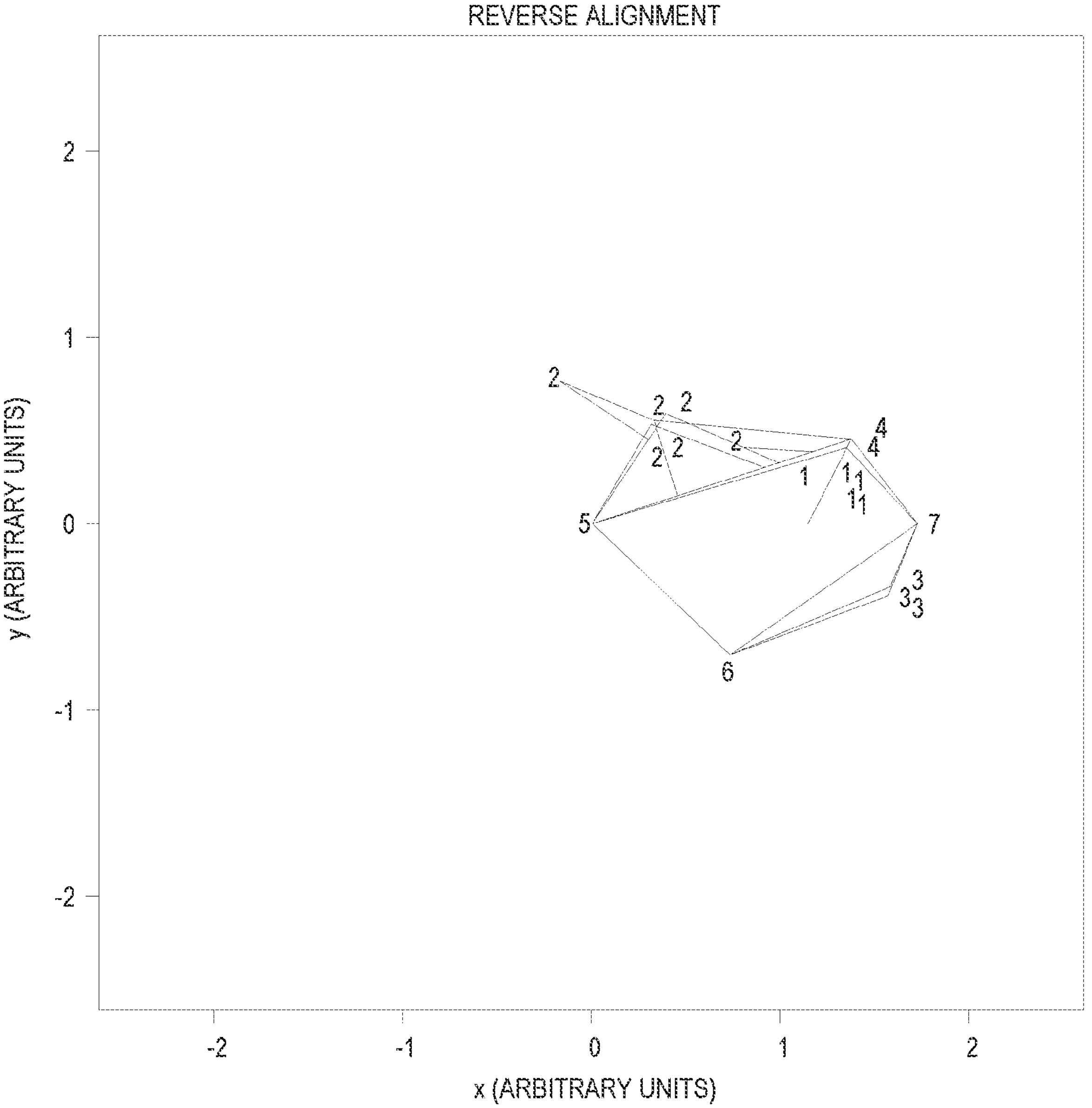
FIG. 27 shows an example of multiple estimates of audio device location that have occurred during a reverse alignment process.

FIG. 27 shows an example of multiple estimates of audio device location that have occurred during a reverse alignment process. In this example, the reverse alignment process is based on triangles having the same seven audio device locations as their vertices that are described above with reference to FIG. 25. The locations of the numbers 1 through 7 that are shown in FIG. 27 correspond to the estimated audio device locations produced by the reverse alignment process. Here again, the triangles do not align perfectly due to additive errors in the DOA estimates. In this example, the audio device location estimates labelled 6 and 7 coincide, but the audio device location estimates for audio devices 1 and 2 show larger differences.

Returning to FIG. 22, block 2230 involves producing a final estimate of each audio device location based, at least in part, on values of the forward alignment matrix and values of the reverse alignment matrix. In some examples, producing the final estimate of each audio device location may involve translating and scaling the forward alignment matrix to produce a translated and scaled forward alignment matrix, and translating and scaling the reverse alignment matrix to produce a translated and scaled reverse alignment matrix.

For example, translation and scaling are fixed by moving the centroids to the origin and forcing unit Frobenius norm, e.g., $$\overrightarrow{X} = \overrightarrow{X}/\|\overrightarrow{X}\|_2^F \text{ and } \overleftarrow{X} = \overleftarrow{X}/\|\overleftarrow{X}\|_2^F.$$

According to some such examples, producing the final estimate of each audio device location also may involve producing a rotation matrix based on the translated and scaled forward alignment matrix and the translated and scaled reverse alignment matrix. The rotation matrix may include a plurality of estimated audio device locations for each audio device. An optimal rotation between forward and reverse alignments is can be found, for example, by singular value decomposition. In some such examples, involve producing the rotation matrix may involve performing a singular value decomposition on the translated and scaled forward alignment matrix and the translated and scaled reverse alignment matrix, e.g., as follows:

$$U \sum V = \overrightarrow{X}^T \overleftarrow{X}$$

In the foregoing equation, U represents the left-singular vector and V represents the right-singular vector of matrix $$\overrightarrow{X}^T \overleftarrow{X}$$

respectively. Σ represents a matrix of singular values. The foregoing equation yields a rotation matrix $R = VU^T$. The matrix product $VU^T$ yields a rotation matrix such that $R\overleftarrow{\mathbf{X}}$ is optimally rotated to align with $\overrightarrow{\mathbf{X}}$.

According to some examples, after determining the rotation matrix $R = VU^T$ alignments may be averaged, e.g., as follows:

$$\overline{X} = 0.5\left(\overrightarrow{X} + R\overleftarrow{X}\right).$$

In some implementations, producing the final estimate of each audio device location also may involve averaging the estimated audio device locations for each audio device to produce the final estimate of each audio device location. Various disclosed implementations have proven to be robust, even when the DOA data and/or other calculations include significant errors. For example, $\overleftrightarrow{\mathbf{X}}$ contains $$\frac{(N-1)(N-2)}{2}$$

estimates of the same node due to overlapping vertices from multiple triangles. Averaging across common nodes yields a final estimate $\hat{X} \in \mathbb{R}^{M \times 3}$.

Figure 28:
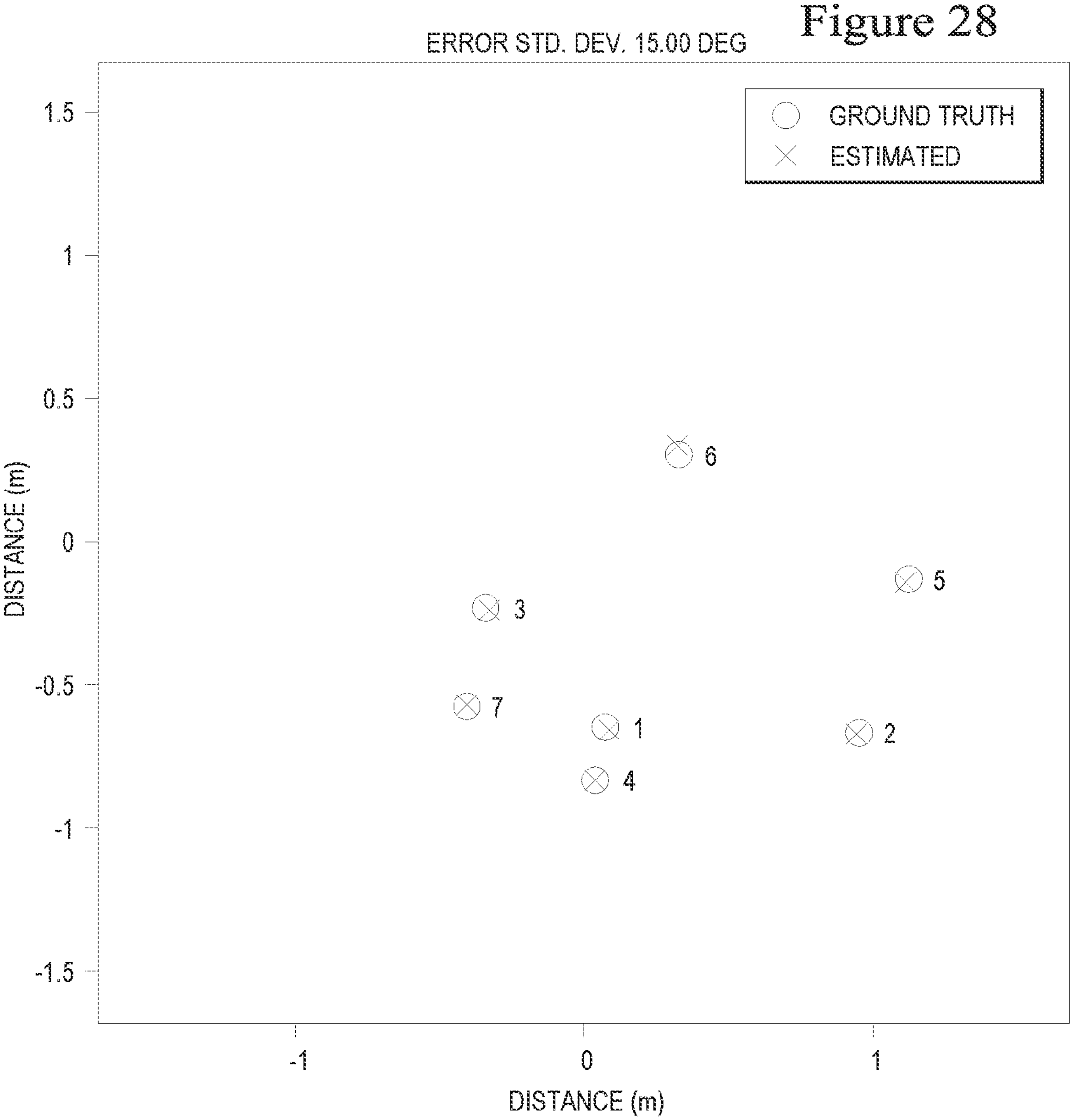
FIG. 28 shows a comparison of estimated and actual audio device locations.

FIG. 28 shows a comparison of estimated and actual audio device locations. In the example shown in FIG. 28, the audio device locations correspond to those that were estimated during the forward and reverse alignment processes that are described above with reference to FIGS. 17 and 19. In these examples, the errors in the DOA estimations had a standard deviation of 15 degrees. Nonetheless, the final estimates of each audio device location (each of which is represented by an "x" in FIG. 28) correspond well with the actual audio device locations (each of which is represented by a circle in FIG. 28).

Much of the foregoing discussion involves audio device auto-location. The following discussion expands upon some methods of determining listener location and listener angular orientation that are described briefly above. In the foregoing description, the term "rotation" is used in essentially the same way as the term "orientation" is used in the following description. For example, the above-referenced "rotation" may refer to a global rotation of the final speaker geometry, not the rotation of the individual triangles during the process that is described above with reference to FIG. 14 et seq. This global rotation or orientation may be resolved with reference to a listener angular orientation, e.g., by the direction in which the listener is looking, by the direction in which the listener's nose is pointing, etc.

Various satisfactory methods for estimating listener location are described below. However, estimating the listener angular orientation can be challenging. Some relevant methods are described in detail below.

Determining listener location and listener angular orientation can enable some desirable features, such as orienting located audio devices relative to the listener. Knowing the listener position and angular orientation allows a determination of, e.g., which speakers within an environment would be in the front, which are in the back, which are near the center (if any), etc., relative to the listener.

After making a correlation between audio device locations and a listener's location and orientation, some implementations may involve providing the audio device location data, the audio device angular orientation data, the listener location data and the listener angular orientation data to an audio rendering system. Alternatively, or additionally, some implementations may involve an audio data rendering process that is based, at least in part, on the audio device location data, the audio device angular orientation data, the listener location data and the listener angular orientation data.

Figure 29:
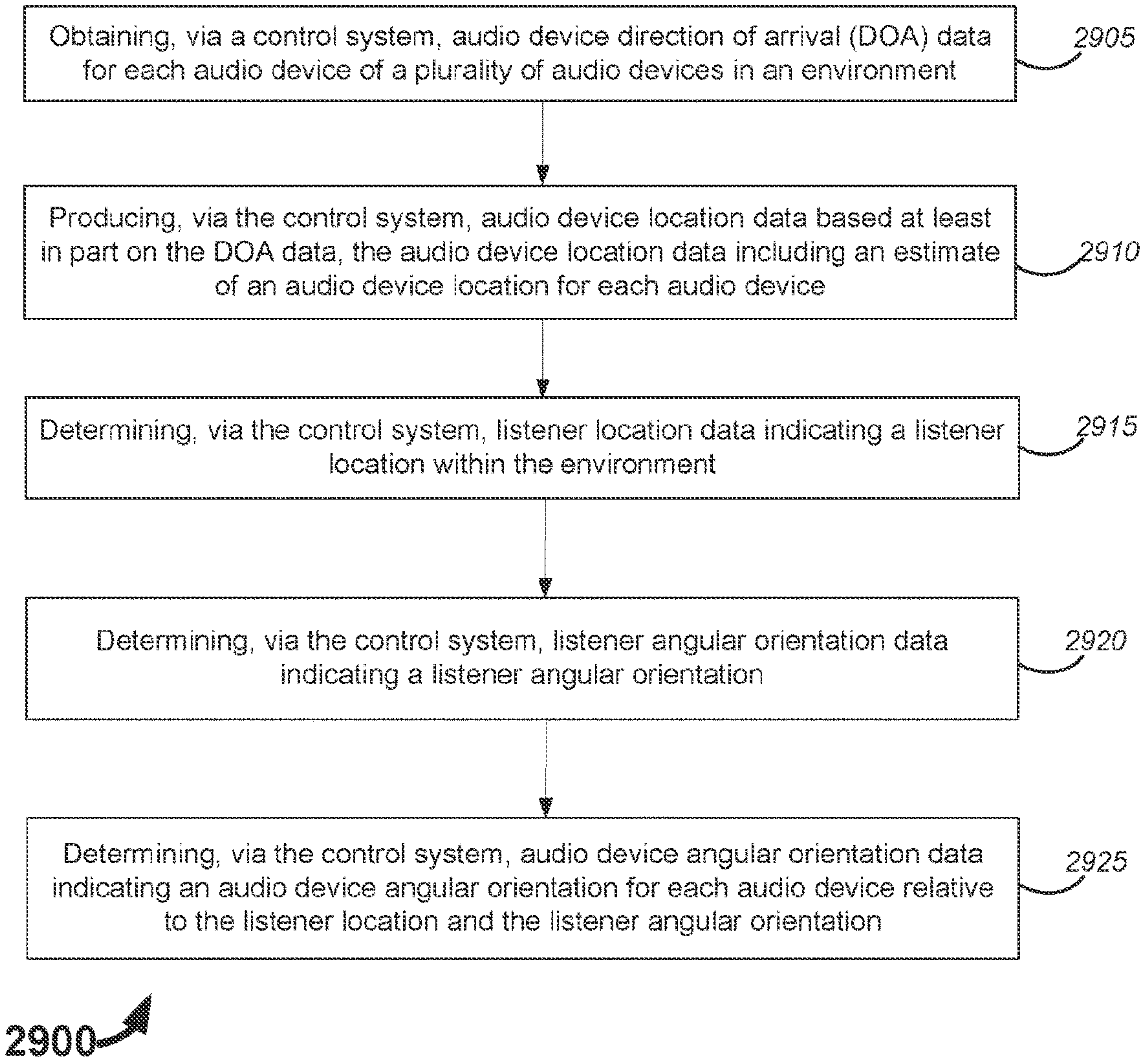
FIG. 29 is a flow diagram that outlines another example of a method that may be performed by an apparatus such as that shown in FIG. 1.

FIG. 29 is a flow diagram that outlines another example of a method that may be performed by an apparatus such as that shown in FIG. 1. The blocks of method 2900, like other methods described herein, are not necessarily performed in the order indicated. Moreover, such methods may include more or fewer blocks than shown and/or described. In this example, the blocks of method 2900 are performed by a control system, which may be (or may include) the control system 110 shown in FIG. 1. As noted above, in some implementations the control system 110 may reside in a single device, whereas in other implementations the control system 110 may reside in two or more devices.

In this example, block 2905 involves obtaining direction of arrival (DOA) data for each audio device of a plurality of audio devices in an environment. In some examples, the plurality of audio devices may include all of the audio devices in an environment, such as all of the audio devices 1905 shown in FIG. 27.

However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. In some examples, the DOA data may be obtained by controlling each loudspeaker of a plurality of loudspeakers in the environment to reproduce a test signal. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to the example shown in FIG. 29, block 2910 involves producing, via the control system, audio device location data based at least in part on the DOA data. In this example, the audio device location data includes an estimate of an audio device location for each audio device referenced in block 2905.

The audio device location data may, for example, be (or include) coordinates of a coordinate system, such as a Cartesian, spherical or cylindrical coordinate system. The coordinate system may be referred to herein as an audio device coordinate system. In some such examples, the audio device coordinate system may be oriented with reference to one of the audio devices in the environment. In other examples, the audio device coordinate system may be oriented with reference to an axis defined by a line between two of the audio devices in the environment. However, in other examples the audio device coordinate system may be oriented with reference to another part of the environment, such as a television, a wall of a room, etc.

In some examples, block 2910 may involve the processes described above with reference to FIG. 22. According to some such examples, block 2910 may involve determining interior angles for each of a plurality of triangles based on the DOA data. In some instances, each triangle of the plurality of triangles may have vertices that correspond with audio device locations of three of the audio devices. Some such methods may involve determining a side length for each side of each of the triangles based, at least in part, on the interior angles.

Some such methods may involve performing a forward alignment process of aligning each of the plurality of triangles in a first sequence, to produce a forward alignment matrix. Some such methods may involve performing a reverse alignment process of aligning each of the plurality of triangles in a second sequence that is the reverse of the first sequence, to produce a reverse alignment matrix. Some such methods may involve producing a final estimate of each audio device location based, at least in part, on values of the forward alignment matrix and values of the reverse alignment matrix. However, in some implementations of method 2900 block 2910 may involve applying methods other than those described above with reference to FIG. 22.

In this example, block 2915 involves determining, via the control system, listener location data indicating a listener location within the environment. The listener location data may, for example, be with reference to the audio device coordinate system. However, in other examples the coordinate system may be oriented with reference to the listener or to a part of the environment, such as a television, a wall of a room, etc.

In some examples, block 2915 may involve prompting the listener (e.g., via an audio prompt from one or more loudspeakers in the environment) to make one or more utterances and estimating the listener location according to DOA data. The DOA data may correspond to microphone data obtained by a plurality of microphones in the environment. The microphone data may correspond with detections of the one or more utterances by the microphones. At least some of the microphones may be co-located with loudspeakers. According to some examples, block 2915 may involve a triangulation process. For example, block 2915 may involve triangulating the user's voice by finding the point of intersection between DOA vectors passing through the audio devices, e.g., as described above with reference to FIG. 18A. According to some implementations, block 2915 (or another operation of the method 2900) may involve co-locating the origins of the audio device coordinate system and the listener coordinate system, which is after the listener location is determined. Co-locating the origins of the audio device coordinate system and the listener coordinate system may involve transforming the audio device locations from the audio device coordinate system to the listener coordinate system.

According to this implementation, block 2920 involves determining, via the control system, listener angular orientation data indicating a listener angular orientation. The listener angular orientation data may, for example, be made with reference to a coordinate system that is used to represent the listener location data, such as the audio device coordinate system. In some such examples, the listener angular orientation data may be made with reference to an origin and/or an axis of the audio device coordinate system.

However, in some implementations the listener angular orientation data may be made with reference to an axis defined by the listener location and another point in the environment, such as a television, an audio device, a wall, etc. In some such implementations, the listener location may be used to define the origin of a listener coordinate system. The listener angular orientation data may, in some such examples, be made with reference to an axis of the listener coordinate system.

Various methods for performing block 2920 are disclosed herein. According to some examples, the listener angular orientation may correspond to a listener viewing direction. In some such examples the listener viewing direction may be inferred with reference to the listener location data, e.g., by assuming that the listener is viewing a particular object, such as a television. In some such implementations, the listener viewing direction may be determined according to the listener location and a television location. Alternatively, or additionally, the listener viewing direction may be determined according to the listener location and a television soundbar location.

However, in some examples the listener viewing direction may be determined according to listener input. According to some such examples, the listener input may include inertial sensor data received from a device held by the listener. The listener may use the device to point at location in the environment, e.g., a location corresponding with a direction in which the listener is facing. For example, the listener may use the device to point to a sounding loudspeaker (a loudspeaker that is reproducing a sound). Accordingly, in such examples the inertial sensor data may include inertial sensor data corresponding to the sounding loudspeaker.

In some such instances, the listener input may include an indication of an audio device selected by the listener. The indication of the audio device may, in some examples, include inertial sensor data corresponding to the selected audio device.

However, in other examples the indication of the audio device may be made according to one or more utterances of the listener (e.g., "the television is in front of me now." "speaker 2 is in front of me now," etc.). Other examples of determining listener angular orientation data according to one or more utterances of the listener are described below.

According to the example shown in FIG. 29, block 2925 involves determining, via the control system, audio device angular orientation data indicating an audio device angular orientation for each audio device relative to the listener location and the listener angular orientation. According to some such examples, block 2925 may involve a rotation of audio device coordinates around a point defined by the listener location. In some implementations, block 2925 may involve a transformation of the audio device location data from an audio device coordinate system to a listener coordinate system.

Figure 30:
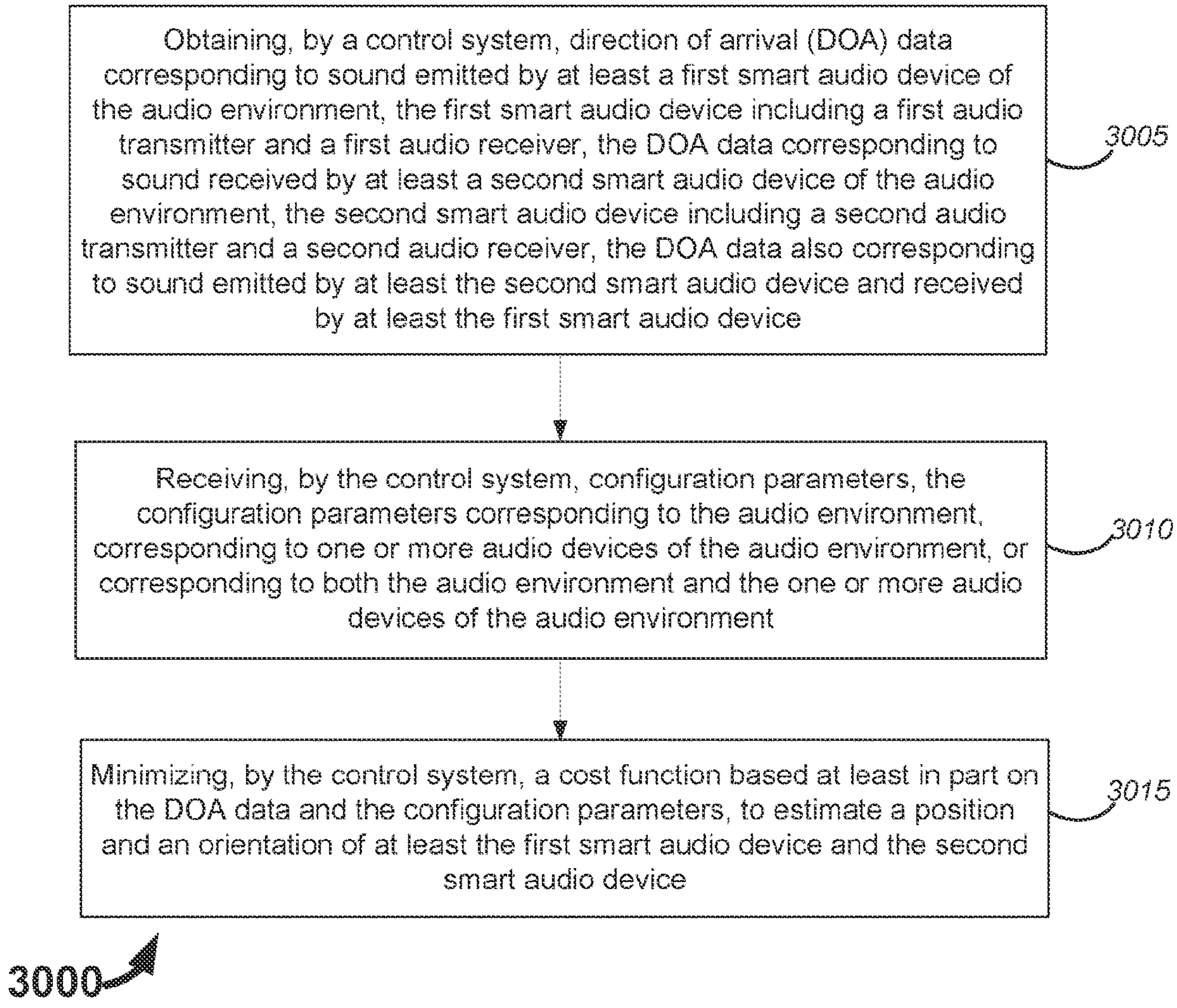
FIG. 30 is a flow diagram that outlines another example of a localization method.

FIG. 30 is a flow diagram that outlines another example of a localization method. The blocks of method 3000, like other methods described herein, are not necessarily performed in the order indicated. Moreover, such methods may include more or fewer blocks than shown and/or described. In this implementation, method 3000 involves estimating the locations and orientations of audio devices in an environment. The blocks of method 3000 may be performed by one or more devices, which may be (or may include) the apparatus 100 shown in FIG. 1.

In this example, block 3005 obtaining, by a control system, direction of arrival (DOA) data corresponding to sound emitted by at least a first smart audio device of the audio environment. The control system may, for example, be the control system 110 that is described above with reference to FIG. 1. According to this example, the first smart audio device includes a first audio transmitter and a first audio receiver and the DOA data corresponds to sound received by at least a second smart audio device of the audio environment. Here, the second smart audio device includes a second audio transmitter and a second audio receiver. In this example, the DOA data also corresponds to sound emitted by at least the second smart audio device and received by at least the first smart audio device. In some examples, the first and second smart audio devices may be two of the audio devices 1105*a*-1105*d* shown in FIG. 11.

The DOA data may be obtained in various ways, depending on the particular implementation. In some instances, determining the DOA data may involve one or more of the DOA-related methods that are described above with reference to FIG. 14 and/or in the "DOA Robustness Measures" section. Some implementations may involve obtaining, by the control system, one or more elements of the DOA data using a beamforming method, a steered powered response method, a time difference of arrival method and/or a structured signal method.

According to this example, block 3010 involves receiving, by the control system, configuration parameters. In this implementation, the configuration parameters correspond to the audio environment itself, to one or more audio devices of the audio environment, or to both the audio environment and the one or more audio devices of the audio environment. According to some examples, the configuration parameters may indicate a number of audio devices in the audio environment, one or more dimensions of the audio environment, one or more constraints on audio device location or orientation and/or disambiguation data for at least one of rotation, translation or scaling. In some examples, the configuration parameters may include playback latency data, recording latency data and/or data for disambiguating latency symmetry.

In this example, block 3015 involves minimizing, by the control system, a cost function based at least in part on the DOA data and the configuration parameters, to estimate a position and an orientation of at least the first smart audio device and the second smart audio device.

According to some examples, the DOA data also may correspond to sound emitted by third through $N^{th}$ smart audio devices of the audio environment, where N corresponds to a total number of smart audio devices of the audio environment. In such examples, the DOA data also may correspond to sound received by each of the first through $N^{th}$ smart audio devices from all other smart audio devices of the audio environment. In such instances, minimizing the cost function may involve estimating a position and an orientation of the third through $N^{th}$ smart audio devices.

In some examples, the DOA data also may correspond to sound received by one or more passive audio receivers of the audio environment. Each of the one or more passive audio receivers may include a microphone array, but may lack an audio emitter. Minimizing the cost function may also provide an estimated location and orientation of each of the one or more passive audio receivers. According to some examples, the DOA data also may correspond to sound emitted by one or more audio emitters of the audio environment. Each of the one or more audio emitters may include at least one sound-emitting transducer but may lack a microphone array. Minimizing the cost function also may provide an estimated location of each of the one or more audio emitters.

In some examples, method 3000 may involve receiving, by the control system, a seed layout for the cost function. The seed layout may, for example, specify a correct number of audio transmitters and receivers in the audio environment and an arbitrary location and orientation for each of the audio transmitters and receivers in the audio environment.

According to some examples, method 3000 may involve receiving, by the control system, a weight factor associated with one or more elements of the DOA data. The weight factor may, for example, indicate the availability and/or the reliability of the one or more elements of the DOA data.

In some examples, method 3000 may involve receiving, by the control system, time of arrival (TOA) data corresponding to sound emitted by at least one audio device of the audio environment and received by at least one other audio device of the audio environment. In some such examples, the cost function may be based, at least in part, on the TOA data. Some such implementations may involve estimating at least one playback latency and/or at least one recording latency. According to some such examples, the cost function may operate with a rescaled position, a rescaled latency and/or a rescaled time of arrival.

In some examples, the cost function may include a first term depending on the DOA data only and second term depending on the TOA data only. In some such examples, the first term may include a first weight factor and the second term may include a second weight factor. According to some such examples, one or more TOA elements of the second term may have a TOA element weight factor indicating the availability or reliability of each of the one or more TOA elements.

Figure 31:
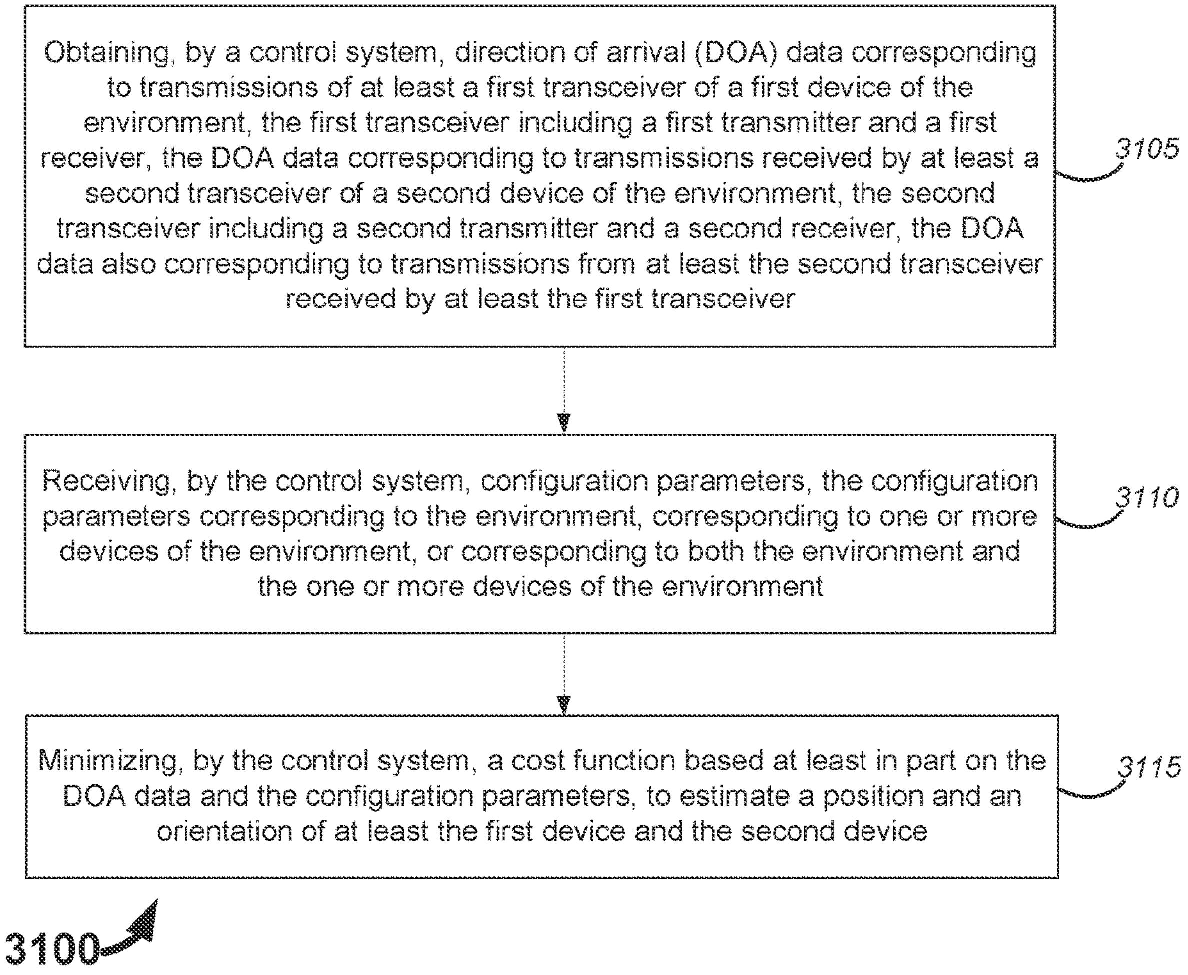
FIG. 31 is a flow diagram that outlines another example of a localization method.

FIG. 31 is a flow diagram that outlines another example of a localization method. The blocks of method 3100, like other methods described herein, are not necessarily performed in the order indicated. Moreover, such methods may include more or fewer blocks than shown and/or described. In this implementation, method 3100 involves estimating the locations and orientations of devices in an environment. The blocks of method 3100 may be performed by one or more devices, which may be (or may include) the apparatus 100 shown in FIG. 1.

In this example, block 3105 obtaining, by a control system, direction of arrival (DOA) data corresponding to transmissions of at least a first transceiver of a first device of the environment. The control system may, for example, be the control system 110 that is described above with reference to FIG. 1. According to this example, the first transceiver includes a first transmitter and a first receiver and the DOA data corresponds to transmissions received by at least a second transceiver of a second device of the environment, the second transceiver also including a second transmitter and a second receiver. In this example, the DOA data also corresponds to transmissions from at least the second transceiver received by at least the first transceiver. According to some examples, the first transceiver and the second transceiver may be configured for transmitting and receiving electromagnetic waves. In some examples, the first and second smart audio devices may be two of the audio devices 1105*a*-1105*d* shown in FIG. 11.

The DOA data may be obtained in various ways, depending on the particular implementation. In some instances, determining the DOA data may involve one or more of the DOA-related methods that are described above with reference to FIG. 14 and/or in the "DOA Robustness Measures" section. Some implementations may involve obtaining, by the control system, one or more elements of the DOA data using a beamforming method, a steered powered response method, a time difference of arrival method and/or a structured signal method.

According to this example, block 3110 involves receiving, by the control system, configuration parameters. In this implementation, the configuration parameters correspond to the environment itself, to one or more devices of the audio environment, or to both the environment and the one or more devices of the audio environment. According to some examples, the configuration parameters may indicate a number of audio devices in the environment, one or more dimensions of the environment, one or more constraints on device location or orientation and/or disambiguation data for at least one of rotation, translation or scaling. In some examples, the configuration parameters may include playback latency data, recording latency data and/or data for disambiguating latency symmetry.

In this example, block 3115 involves minimizing, by the control system, a cost function based at least in part on the DOA data and the configuration parameters, to estimate a position and an orientation of at least the first device and the second device.

According to some implementations, the DOA data also may correspond to transmissions emitted by third through $N^{th}$ transceivers of third through $N^{th}$ devices of the environment, where N corresponds to a total number of transceivers of the environment and where the DOA data also corresponds to transmissions received by each of the first through $N^{th}$ transceivers from all other transceivers of the environment. In some such implementations, minimizing the cost function also may involve estimating a position and an orientation of the third through $N^{th}$ transceivers.

In some examples, the first device and the second device may be smart audio devices and the environment may be an audio environment. In some such examples, the first transmitter and the second transmitter may be audio transmitters. In some such examples, the first receiver and the second receiver may be audio receivers. According to some such examples, the DOA data also may correspond to sound emitted by third through $N^{th}$ smart audio devices of the audio environment, where N corresponds to a total number of smart audio devices of the audio environment. In such examples, the DOA data also may correspond to sound received by each of the first through $N^{th}$ smart audio devices from all other smart audio devices of the audio environment. In such instances, minimizing the cost function may involve estimating a position and an orientation of the third through $N^{th}$ smart audio devices. Alternatively, or additionally, in some examples the DOA data may correspond to electromagnetic waves emitted and received by devices in the environment.

In some examples, the DOA data also may correspond to sound received by one or more passive receivers of the environment. Each of the one or more passive receivers may include a receiver array, but may lack a transmitter. Minimizing the cost function may also provide an estimated location and orientation of each of the one or more passive receivers. According to some examples, the DOA data also may correspond to transmissions from one or more transmitters of the environment. In some such examples, each of the one or more transmitters may lack a receiver array. Minimizing the cost function also may provide an estimated location of each of the one or more transmitters.

In some examples, method 3100 may involve receiving, by the control system, a seed layout for the cost function. The seed layout may, for example, specify a correct number of transmitters and receivers in the audio environment and an arbitrary location and orientation for each of the transmitters and receivers in the audio environment.

According to some examples, method 3100 may involve receiving, by the control system, a weight factor associated with one or more elements of the DOA data. The weight factor may, for example, indicate the availability and/or the reliability of the one or more elements of the DOA data.

In some examples, method 3100 may involve receiving, by the control system, time of arrival (TOA) data corresponding to sound emitted by at least one audio device of the audio environment and received by at least one other audio device of the audio environment. In some such examples, the cost function may be based, at least in part, on the TOA data. Some such implementations may involve estimating at least one playback latency and/or at least one recording latency. According to some such examples, the cost function may operate with a rescaled position, a rescaled latency and/or a rescaled time of arrival.

In some examples, the cost function may include a first term depending on the DOA data only and second term depending on the TOA data only. In some such examples, the first term may include a first weight factor and the second term may include a second weight factor. According to some such examples, one or more TOA elements of the second term may have a TOA element weight factor indicating the availability or reliability of each of the one or more TOA elements.

Various features and aspects will be appreciated from the following enumerated example embodiments ("EEEs"):

EEE1. An audio processing method, comprising:

receiving, by a control system that is configured for implementing a plurality of renderers, audio data;

receiving, by the control system, listening configuration data for a plurality of listening configurations, each listening configuration of the plurality of listening configurations corresponding to a listening position and a listening orientation in an audio environment;

rendering, by each renderer of the plurality of renderers and according to the listening configuration data, the audio data to obtain a set of renderer-specific loudspeaker feed signals for a corresponding listening configuration, wherein each renderer is configured to render the audio data for a different listening configuration;

decomposing, by the control system and for each renderer, each set of renderer-specific loudspeaker feed signals into a renderer-specific set of frequency bands;

combining, by the control system, the renderer-specific set of frequency bands of each renderer to produce an output set of loudspeaker feed signals; and outputting, by the control system, the output set of loudspeaker feed signals to a plurality of loudspeakers.

EEE2. The method of EEE 1, wherein decomposing each set of renderer-specific loudspeaker feed signals into each renderer-specific set of frequency bands comprises:

analyzing, by an analysis filterbank associated to each renderer, the renderer-specific set of loudspeaker feed signals to produce a global set of frequency bands; and selecting a subset of frequency bands of the global set of frequency bands to produce the renderer-specific set of frequency bands.

EEE3. The method of EEE 2, wherein the subset of frequency bands of the global set of frequency bands is selected such that when combining the renderer-specific set of frequency bands for all renderers of the plurality of renderers, each frequency band of the global set of frequency bands is represented only once in the output set of loudspeaker feed signals.

EEE4. The method of EEE2 or EEE3, wherein combining the renderer-specific set of frequency bands comprises synthesizing, by a synthesis filterbank, the output set of loudspeaker feed signals in a time domain.

EEE5. The method of any one of EEEs 2-4, wherein the analysis filterbank is selected from a group of filterbanks consisting of: a Short-time Discrete Fourier Transform (STDFT) filterbank, a Hybrid Complex Quadrature Mirror (HCQMF) filterbank and a Quadrature Mirror (QMF) filterbank.

EEE6. The method of any one of EEEs 1-5, wherein each of the renderer-specific sets of frequency bands is uniquely associated with one renderer of the plurality of renderers and uniquely associated with one listening configuration of the plurality of listening configurations.

EEE7. The method of any one of EEEs 1-6, wherein each listening configuration corresponds with a listening position and a listening orientation of a person.

EEE8. The method of claim 7, wherein the listening position corresponds with the person's head position and wherein the listening orientation corresponds with the person's head orientation.

EEE9. The method of any one of EEEs 1-8, wherein the audio data comprises at least one of spatial channel-based audio data or spatial object-based audio data.

EEE10. The method of any one of EEEs 1-9, wherein the audio data has a format selected from a group of audio formats consisting of: stereo, 3.1.2, 5.1, 5.1.2, 7.1, 7.1.2, 7.1.4, 9.1, 9.1.6 and Dolby Atmos audio format.

EEE11. The method of any one of EEEs 1-10, wherein rendering, by a renderer of the plurality of renderers, comprises performing dual-balance amplitude panning in a time domain or cross-talk cancellation in a frequency domain.

EEE12. An apparatus configured to perform the method of any one of EEEs 1-11.

EEE13. A system configured to perform the method of any of EEEs 1-11.

EEE14. One or more non-transitory media having instructions stored thereon which, when executed by a device or system, cause the device or system to perform the method of any one of EEEs 1-11.

While specific embodiments and applications have been described herein, it will be apparent to those of ordinary skill in the art that many variations on the embodiments and applications described herein are possible without departing from the scope described and claimed herein. It should be understood that while certain forms have been shown and described, the scope of the present disclosure is not to be limited to the specific embodiments described and shown or the specific methods described.

The invention claimed is:

1. An audio processing method, comprising:
- receiving, by a control system, audio data;
- receiving, by the control system, listening configuration data for a plurality of listening configurations, each listening configuration of the plurality of listening configurations corresponding to a listening position and a listening orientation;
- analyzing, by an analysis filterbank implemented via the control system, the audio data to produce a global set of frequency bands corresponding to the audio data;
- selecting, by the control system and for each renderer of a plurality of renderers implemented by the control system, a subset of the global set of frequency bands to produce a renderer-specific set of frequency bands for each renderer;
- rendering, by each renderer of the plurality of renderers and according to the listening configuration data, the renderer-specific set of frequency bands to obtain a set of renderer-specific loudspeaker feed signals for a corresponding listening configuration, wherein:
  - each renderer is configured to render frequency bands of the renderer-specific set of frequency bands for a different listening configuration;
  - a first renderer of the plurality of renderers is configured to render a first subset of frequency bands of the renderer-specific set of frequency bands for a first listening position and a first listening orientation; and
  - a second renderer of the plurality of renderers is configured to render a second subset of frequency bands of the renderer-specific set of frequency bands for a second listening position and a second listening orientation, and wherein:
    - the second subset of frequency bands is different from the first subset of frequency bands; and
    - the second listening position and orientation correspond with a second listening configuration that is different from a first listening configuration that corresponds with the first listening position and the first listening orientation;
- combining, by the control system, sets of renderer-specific loudspeaker feed signals of each renderer of the plurality of renderers, to produce an output set of loudspeaker feed signals; and
- outputting, by the control system, the output set of loudspeaker feed signals to a plurality of loudspeakers of an audio environment.

2. The method of claim 1, further comprising transforming, by a synthesis filterbank, the output set of loudspeaker feed signals from a frequency domain to a time domain.

3. The method of claim 1, wherein the analysis filterbank is selected from a group of filterbanks consisting of: a Short-time Discrete Fourier Transform (STDFT) filterbank, a Hybrid Complex Quadrature Mirror (HCQMF) filterbank and a Quadrature Mirror (QMF) filterbank.

4. The method of claim 1, wherein the first listening position corresponds to a first person's head position and wherein the listening orientation corresponds to the first person's head orientation.

5. The method of claim 1, wherein the audio data comprises at least one of spatial channel-based audio data and/or spatial object-based audio data.

6. The method of claim 1, wherein the audio data has an audio format selected from a group of audio formats consisting of: stereo, 3.1.2, 5.1, 5.1.2, 7.1, 7.1.2 7.1.4, 9.1, 9.1.6 and Dolby Atmos audio format.

7. The method of claim 1, wherein the rendering comprises performing cross-talk cancellation in a frequency domain.

8. The method of claim 1, wherein combining the sets of renderer-specific loudspeaker feed signals involves multiplexing each of the sets of renderer-specific loudspeaker feed signals.

9. The method of claim 1, wherein the listening configuration data corresponds to sensor data obtained from one or more sensors in the audio environment.

10. The method of claim 9, wherein the sensors comprise at least one of a camera, a movement sensor or a microphone.

11. The method of claim 1, wherein the first and second listening positions and the first and second listening orientations are relative to an audio environment coordinate system.

12. The method of claim 1, wherein the first and second listening positions are relative to a position of one or more loudspeakers in the audio environment.

13. The method of claim 1, wherein:
- the rendering involves producing a plurality of data structures, each data structure including a set of renderer-specific speaker activations for a corresponding listening configuration and corresponding to each of a plurality of points in a two-dimensional space or a three-dimensional space; and the combining involves combining the plurality of data structures into a single data structure.

14. An apparatus, comprising:

an interface system; and a control system configured to:

receive, via the interface system, audio data;

receive, via the interface system, listening configuration data for a plurality of listening configurations, each listening configuration of the plurality of listening configurations corresponding to a listening position and a listening orientation;

analyze, by an analysis filterbank implemented via the control system, the audio data to produce a global set of frequency bands corresponding to the audio data;

select, for each renderer of a plurality of renderers implemented by the control system, a subset of the global set of frequency bands to produce a renderer-specific set of frequency bands for each renderer;

render, by each renderer of the plurality of renderers and according to the listening configuration data, the renderer-specific set of frequency bands to obtain a set of renderer-specific loudspeaker feed signals for a corresponding listening configuration, wherein:

each renderer is configured to render frequency bands of the renderer-specific set of frequency bands for a different listening configuration;

a first renderer of the plurality of renderers is configured to render a first subset of frequency bands of the renderer-specific set of frequency bands for a first listening position and a first listening orientation; and a second renderer of the plurality of renderers is configured to render a second subset of frequency bands of the renderer-specific set of frequency bands for a second listening position and a second listening orientation, and wherein:

the second subset of frequency bands is different from the first subset of frequency bands; and the second listening position and orientation correspond with a second listening configuration that is different from a first listening configuration that corresponds with the first listening position and the first listening orientation;

combine sets of renderer-specific loudspeaker feed signals of each renderer of the plurality of renderers, to produce an output set of loudspeaker feed signals; and output the output set of loudspeaker feed signals to a plurality of loudspeakers of an audio environment.

15. A system that includes the apparatus of claim 14.

16. One or more non-transitory media having instructions stored thereon which, when executed by a device or system, cause the device or system to perform a method comprising:

receiving, by a control system, audio data;

receiving, by the control system, listening configuration data for a plurality of listening configurations, each listening configuration of the plurality of listening configurations corresponding to a listening position and a listening orientation;

analyzing, by an analysis filterbank implemented via the control system, the audio data to produce a global set of frequency bands corresponding to the audio data;

selecting, by the control system and for each renderer of a plurality of renderers implemented by the control system, a subset of the global set of frequency bands to produce a renderer-specific set of frequency bands for each renderer;

rendering, by each renderer of the plurality of renderers and according to the listening configuration data, the renderer-specific set of frequency bands to obtain a set of renderer-specific loudspeaker feed signals for a corresponding listening configuration, wherein:

each renderer is configured to render frequency bands of the renderer-specific set of frequency bands for a different listening configuration;

a first renderer of the plurality of renderers is configured to render a first subset of frequency bands of the renderer-specific set of frequency bands for a first listening position and a first listening orientation; and a second renderer of the plurality of renderers is configured to render a second subset of frequency bands of the renderer-specific set of frequency bands for a second listening position and a second listening orientation, and wherein:

the second subset of frequency bands is different from the first subset of frequency bands; and the second listening position and orientation correspond with a second listening configuration that is different from a first listening configuration that corresponds with the first listening position and the first listening orientation;

combining, by the control system, sets of renderer-specific loudspeaker feed signals of each renderer of the plurality of renderers, to produce an output set of loudspeaker feed signals; and outputting, by the control system, the output set of loudspeaker feed signals to a plurality of loudspeakers of an audio environment.

* * * * *